(12) United States Patent
Kaiya

(10) Patent No.: US 12,369,705 B2
(45) Date of Patent: *Jul. 29, 2025

(54) TERMINAL HOLDER AND TERMINAL CASE

(71) Applicant: AKEBI DOUSA NO GAKKOU CORPORATION, Tokyo (JP)

(72) Inventor: Shigetoshi Kaiya, Tokyo (JP)

(73) Assignee: AKEBI DOUSA NO GAKKOU CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,564

(22) Filed: May 23, 2024

(65) Prior Publication Data

US 2024/0365960 A1    Nov. 7, 2024

Related U.S. Application Data

(62) Division of application No. 16/973,831, filed as application No. PCT/JP2019/023788 on Jun. 17, 2019, now Pat. No. 12,022,934.

(30) Foreign Application Priority Data

Jun. 18, 2018  (JP) .................................. 2018-115656
Aug. 5, 2018   (JP) .................................. 2018-147299
Oct. 31, 2018  (JP) .................................. 2018-205799

(51) Int. Cl.
*A45F 5/00*     (2006.01)
*A45C 11/00*    (2006.01)
(Continued)

(52) U.S. Cl.
CPC ................ *A45F 5/00* (2013.01); *A45C 11/00* (2013.01); *H04M 1/04* (2013.01); *A45C 11/002* (2025.01);
(Continued)

(58) Field of Classification Search
CPC ................ A45F 5/00; A45F 2200/0516; A45F 2200/0525; A45F 2005/008; A45F 5/1516;
(Continued)

(56) References Cited

U.S. PATENT DOCUMENTS 12,022,934 B2 *  7/2024  Kaiya ..................... G06F 1/166
2002/0043545 A1  4/2002  Tang
(Continued)

FOREIGN PATENT DOCUMENTS

JP    3071421 U      9/2000
JP    2007-53603 A   3/2007
(Continued)

OTHER PUBLICATIONS

Aug. 27, 2019 International Search Report issued in International Patent Application No. PCT/JP2019/023788.
(Continued)

*Primary Examiner* — Stephen A Vu
(74) *Attorney, Agent, or Firm* — Oliff PLC

(57) ABSTRACT

A terminal holder for holding the mobile terminal includes the fixed portion and the holding portion. The fixed portion has a fixed surface fixed to the mobile terminal or the terminal case covering the mobile terminal. The holding portion has both ends connected to the fixed portion, and a finger insertion space is defined between the fixed portion and holding portion, and the mobile terminal is held by inserting a finger into the finger insertion space. The finger insertion space fails to overlap with the fixed portion as viewed from a direction perpendicular to the fixed surface of the fixed portion.

6 Claims, 26 Drawing Sheets

(51) Int. Cl.
H04M 1/04 (2006.01)
*G06F 1/16* (2006.01)

(52) U.S. Cl.
CPC .......... *A45C 11/003* (2025.01); *A45F 5/1516* (2025.01); *A45F 5/1525* (2025.01); *G06F 1/1613* (2013.01)

(58) Field of Classification Search
CPC . A45F 5/1525; A45C 11/00; A45C 2011/002; A45C 2011/003; A45C 11/002; A45C 11/003; H04M 1/04; H04M 1/185; G06F 1/1613; G06F 1/1656; G06F 1/166; G06F 1/1632; H04B 1/3888
See application file for complete search history.

(56) References Cited

U.S. PATENT DOCUMENTS

| | | |
|---|---|---|
| 2002/0104861 A1 | 8/2002 | Kerjean |
| 2007/0181620 A1 | 8/2007 | Carver |
| 2014/0084035 A1 | 3/2014 | Georges |
| 2014/0213330 A1 | 7/2014 | Oh |
| 2015/0133193 A1 | 5/2015 | Stotler |
| 2016/0036480 A1 | 2/2016 | Hirsch |
| 2016/0211879 A1 | 7/2016 | Hirsch |
| 2016/0344437 A1 | 11/2016 | Gordon |
| 2017/0231373 A1 | 8/2017 | Koren |
| 2017/0373713 A1 | 12/2017 | Hirsch |
| 2018/0007184 A1 | 1/2018 | Palacino |
| 2019/0215025 A1 | 7/2019 | Hirsch |
| 2020/0259517 A1 | 8/2020 | Hirsch |

FOREIGN PATENT DOCUMENTS

| | | |
|---|---|---|
| JP | 3178173 U | 9/2012 |
| JP | 2014-517584 A | 7/2014 |
| JP | 5915876 B2 | 5/2016 |
| JP | 2017-524313 A | 8/2017 |
| KR | 10-1585923 B1 | 1/2016 |
| WO | 2007/095427 A2 | 8/2007 |
| WO | 2016/019256 A1 | 2/2016 |
| WO | 2017/111422 A1 | 6/2017 |

OTHER PUBLICATIONS

Mar. 13, 2020 International Preliminary Report on Patentability issued in International Patent Application No. PCT/JP2019/023788.
Jul. 13, 2021 Extended European Search Report issued in European Patent Application 19823582.2.
Aug. 22, 2022 Office Action issued in Japanese Patent Application No. 2018-115656.
Oct. 4, 2022 Office Action issued in Japanese Patent Application No. 2018-147299.
Jul. 19, 2022 Office Action issued in Chinese Patent Application No. 201980053878.2.
Feb. 15, 2023 Offie Action issued in Chinese Patent Application No. 201980053878.2.
Jun. 29, 2023 Decision of Rejection issued in Chinese Patent Application No. 201980053878.2.
Feb. 1, 2023 Office Action issued in Korean Patent Application No. 10-2022-7026930.

* cited by examiner

[FIG.1]
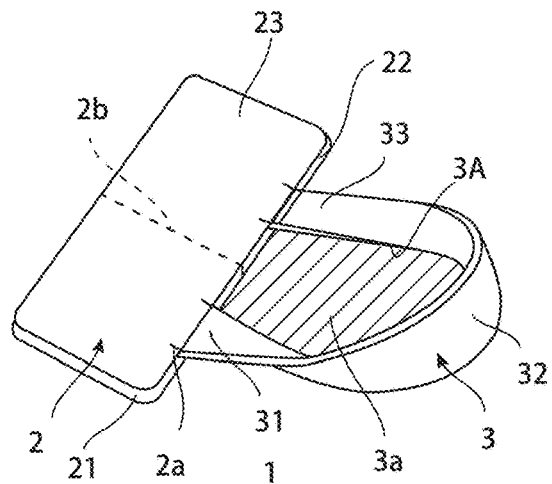
[FIG.2]
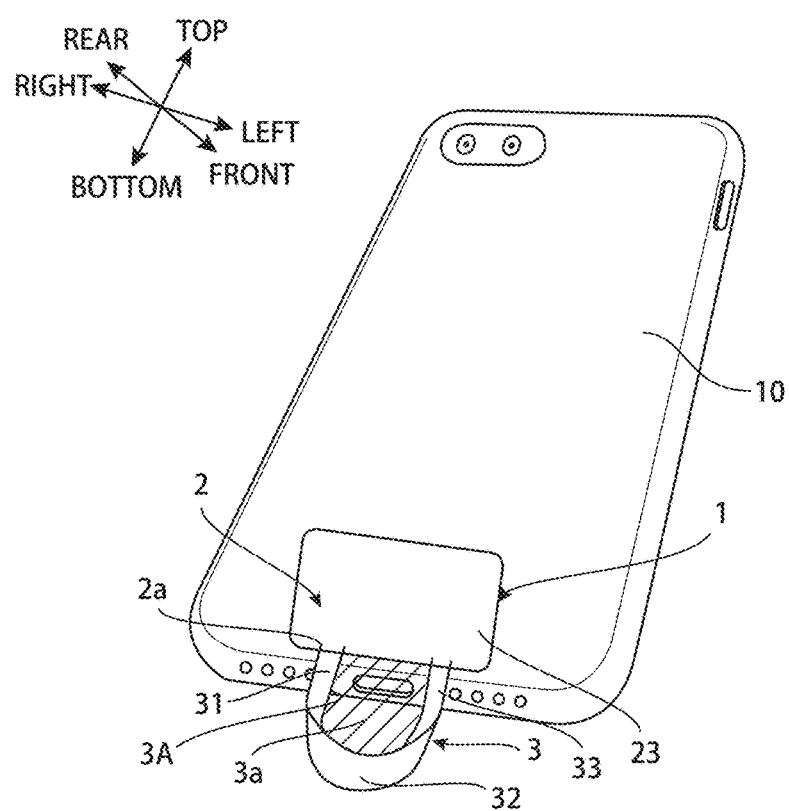

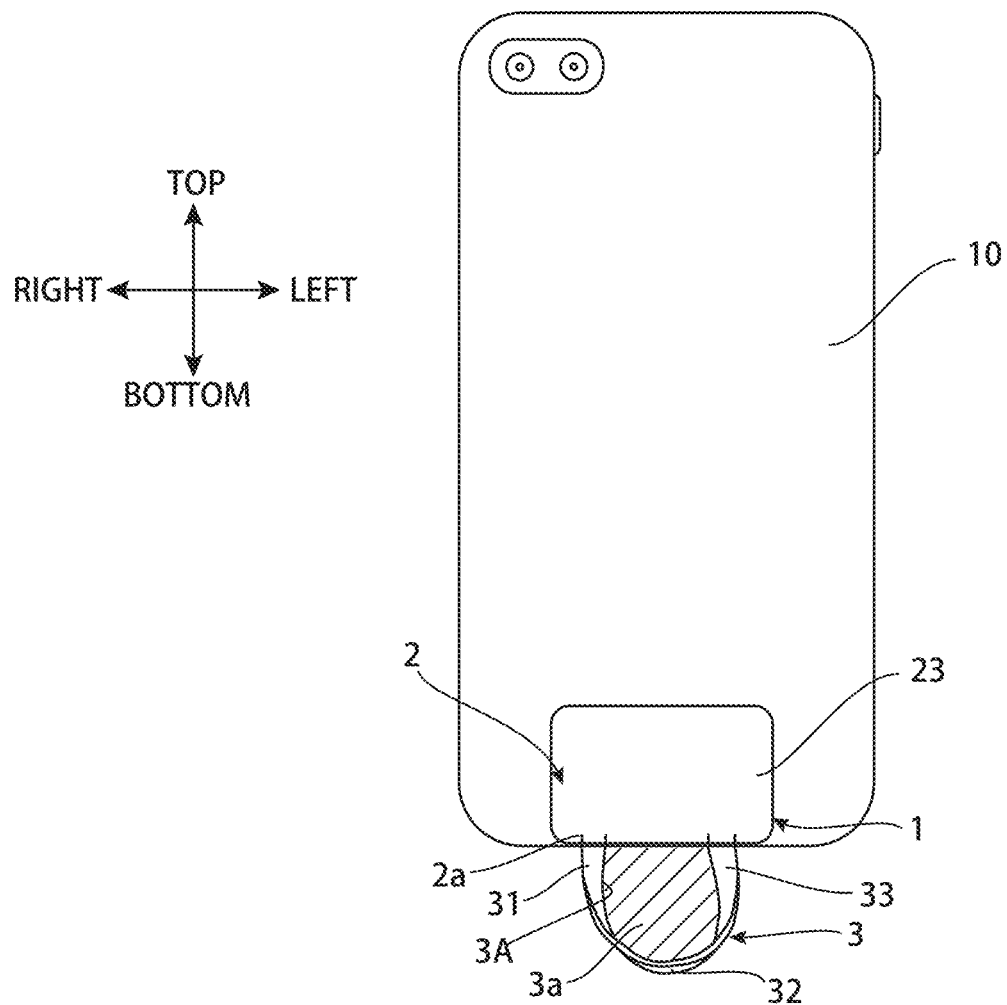
[FIG3]

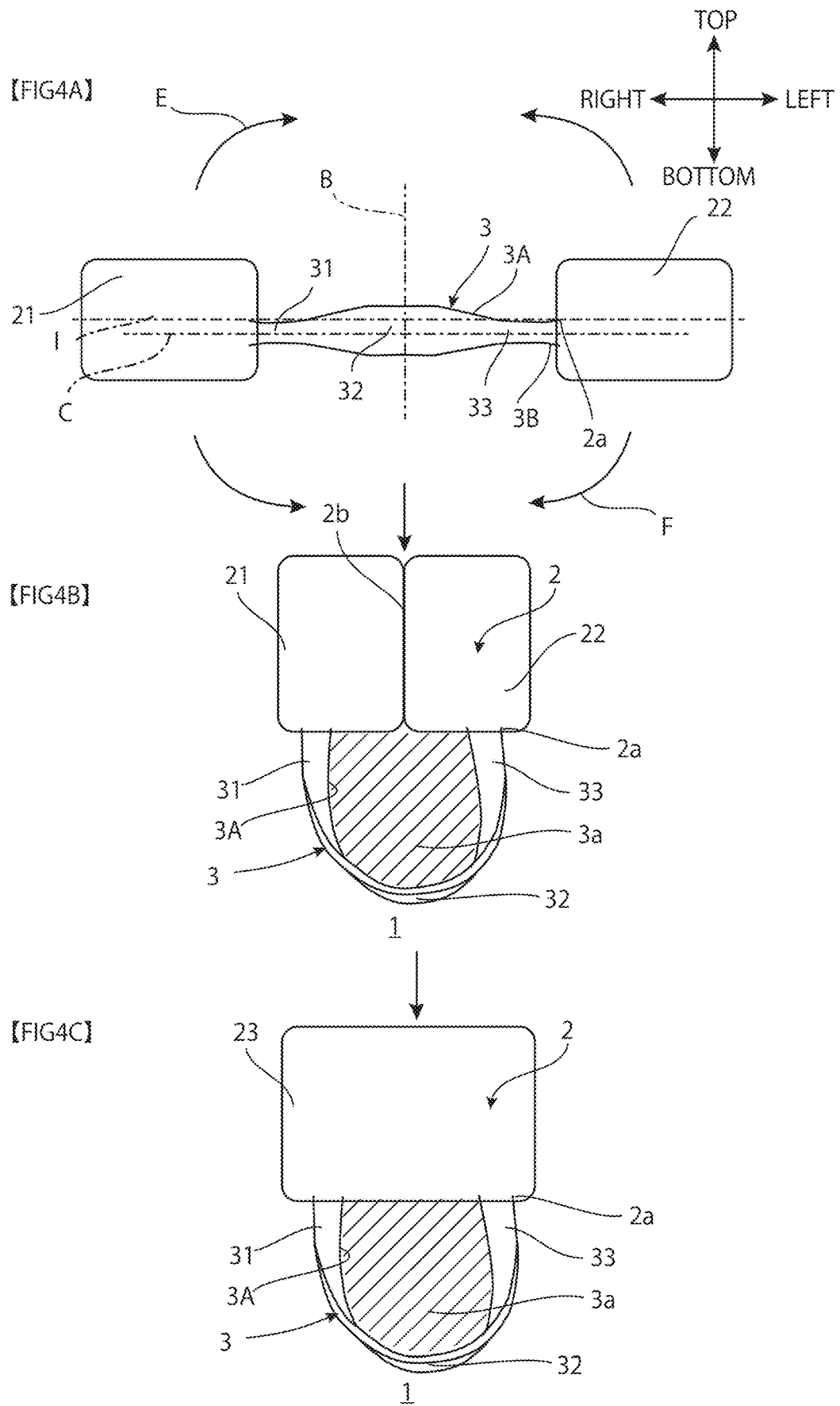

[FIG5]
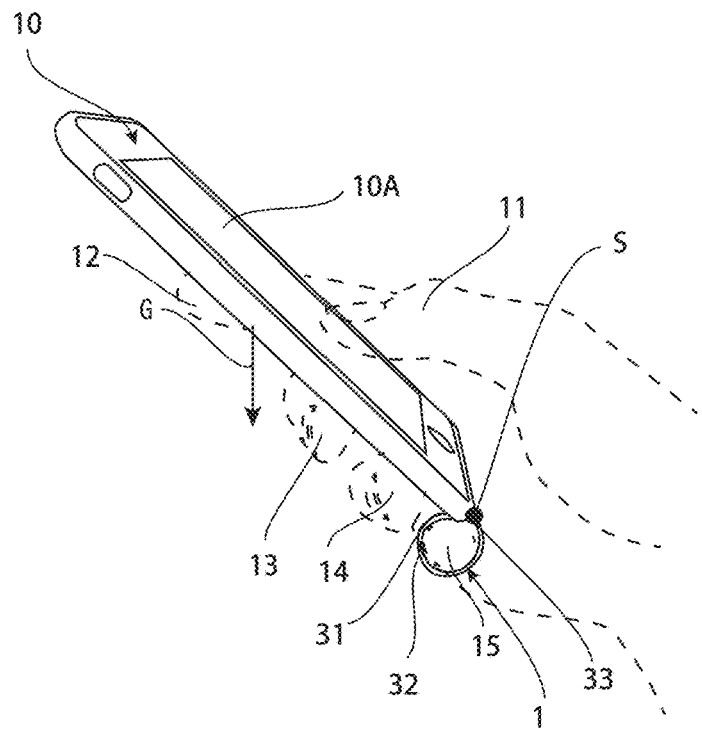
[FIG6]
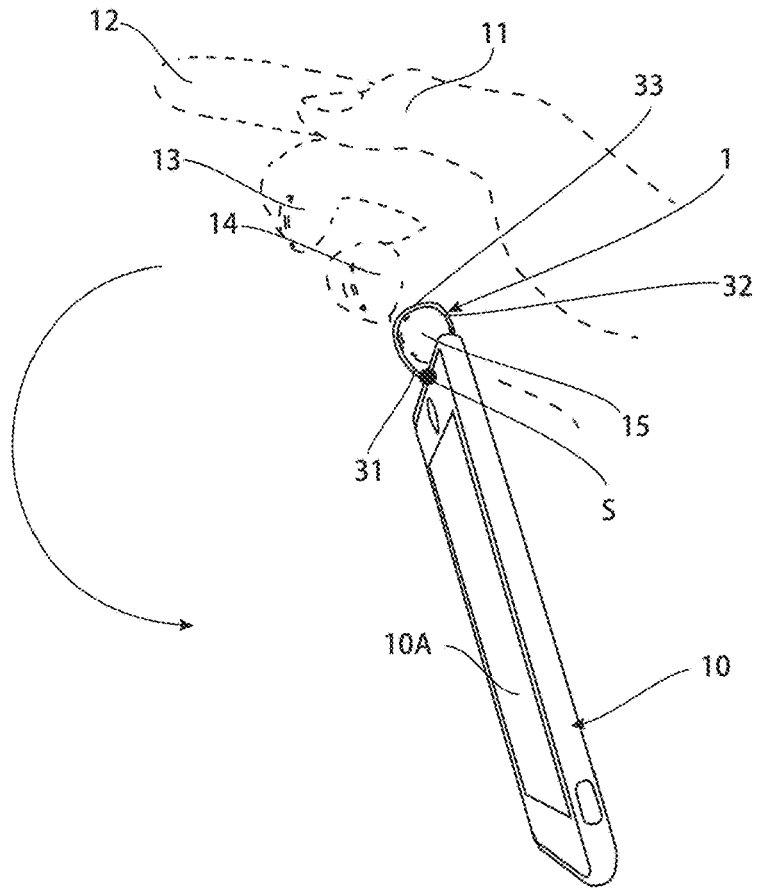

[FIG7]
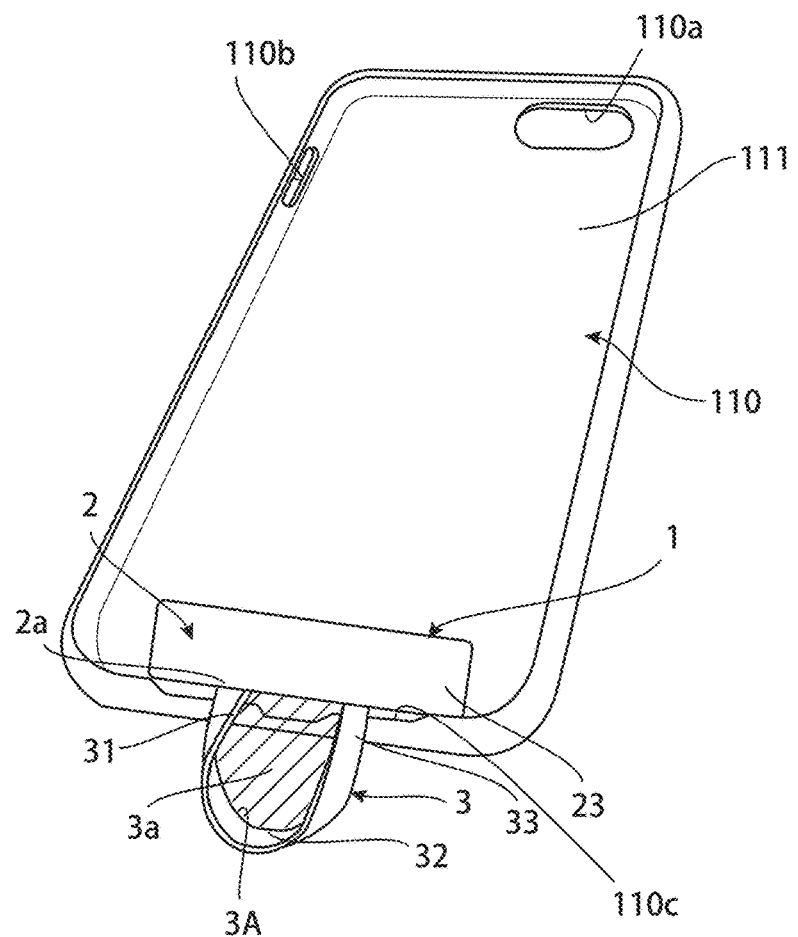
[FIG8]
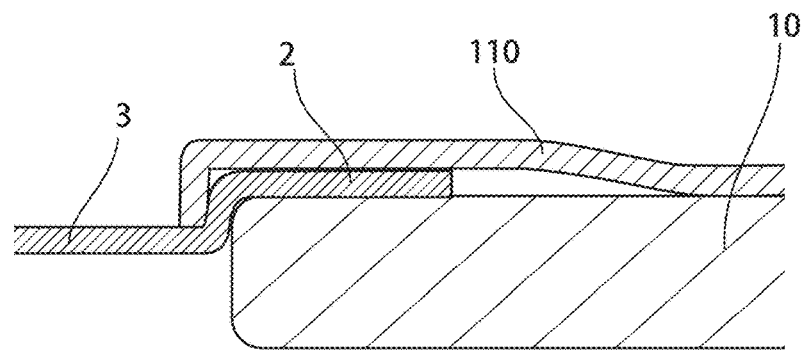

[FIG9]
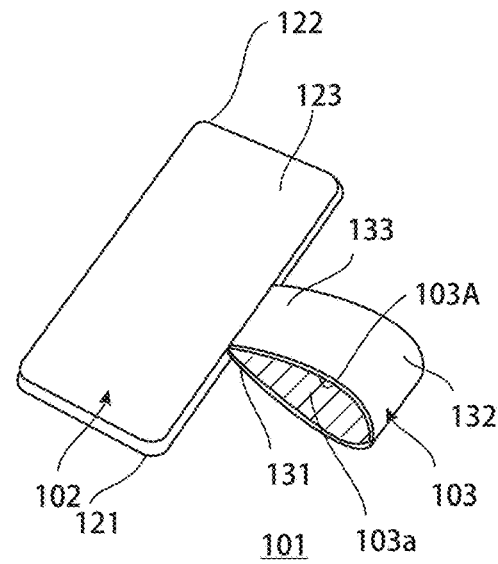
[FIG10]
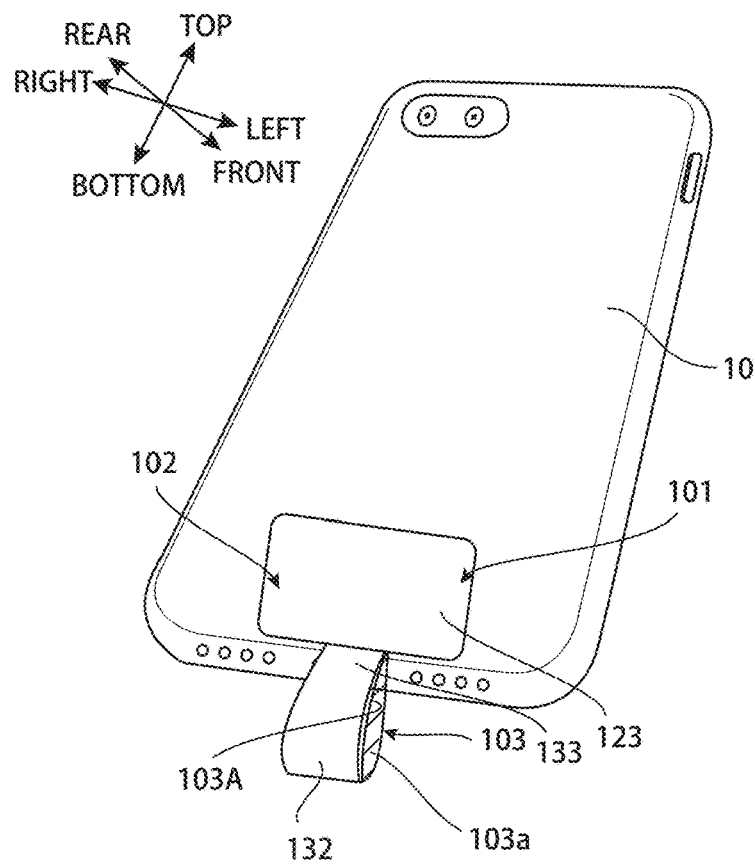

[FIG11A]
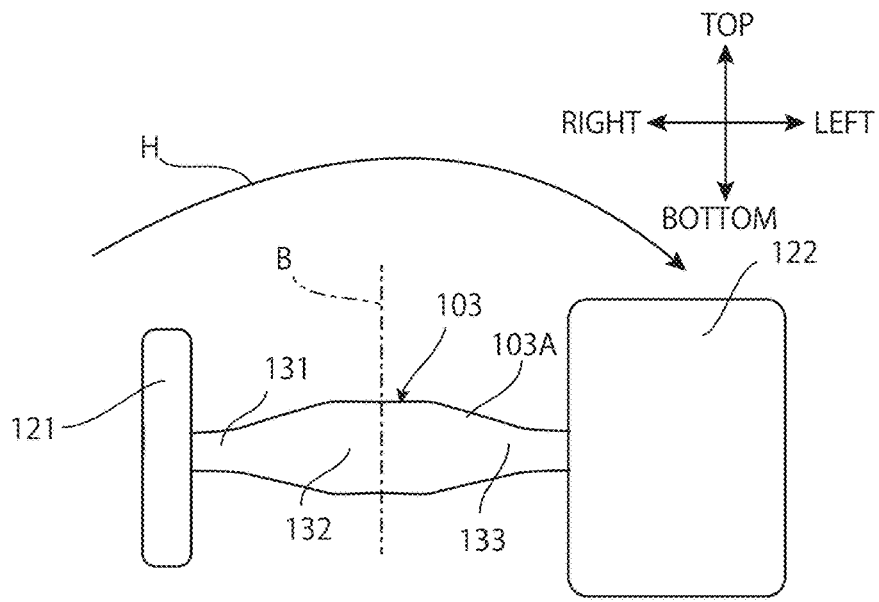
[FIG11B]
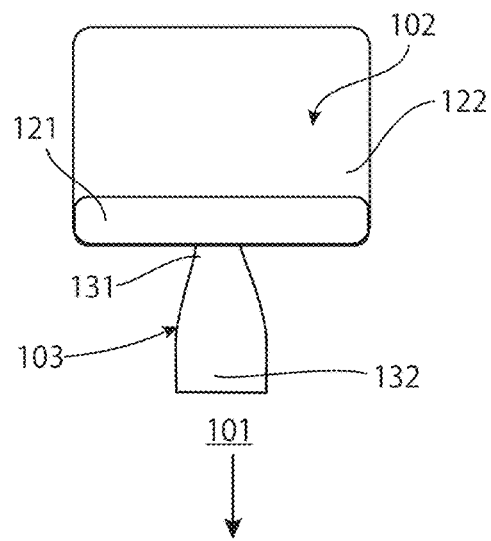
[FIG11C]
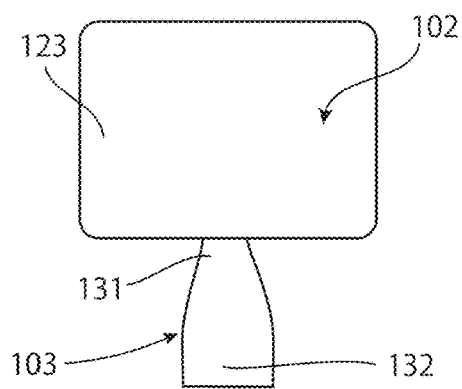

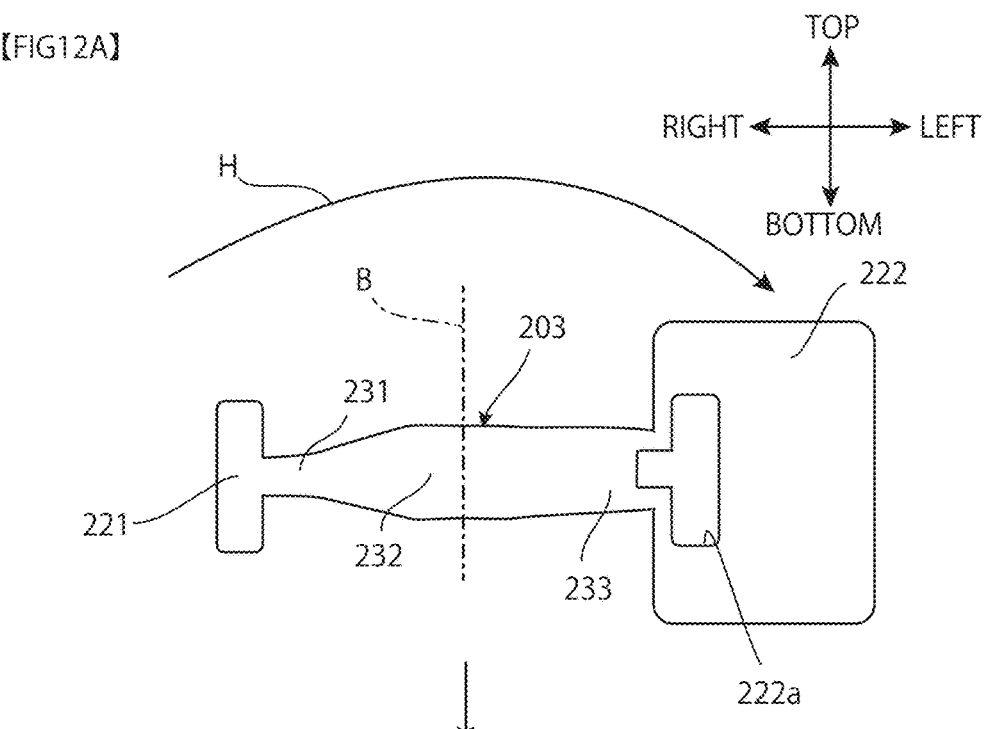
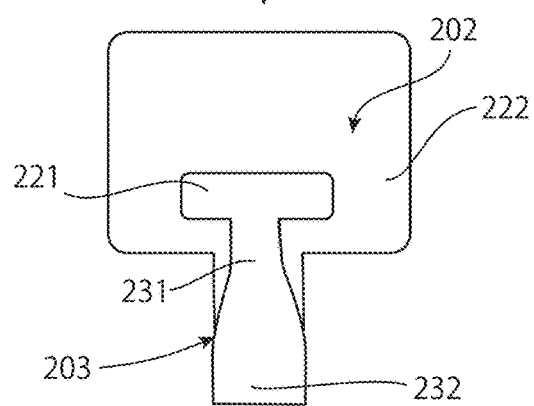
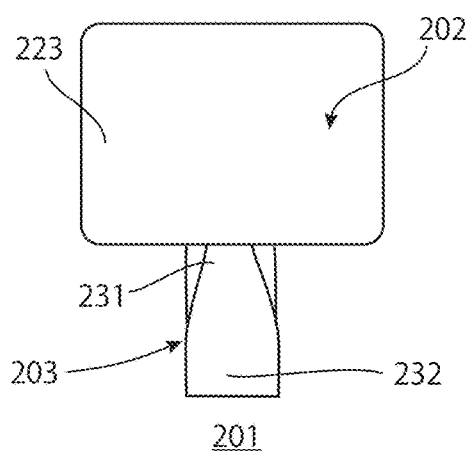

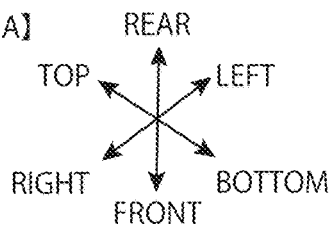
[FIG13A]
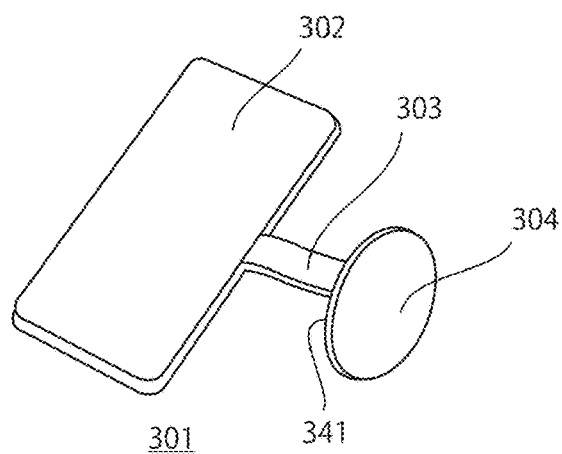
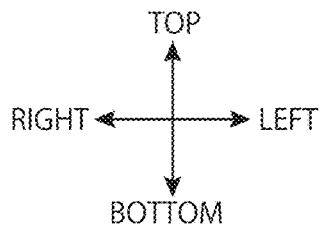
[FIG13B]
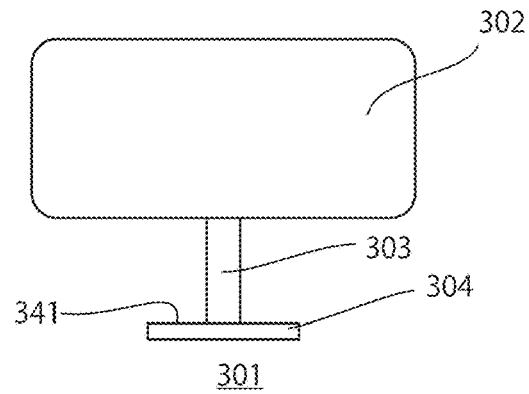
[FIG14]
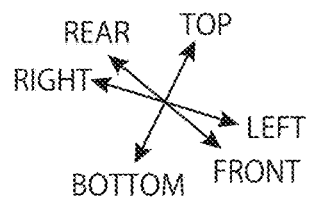
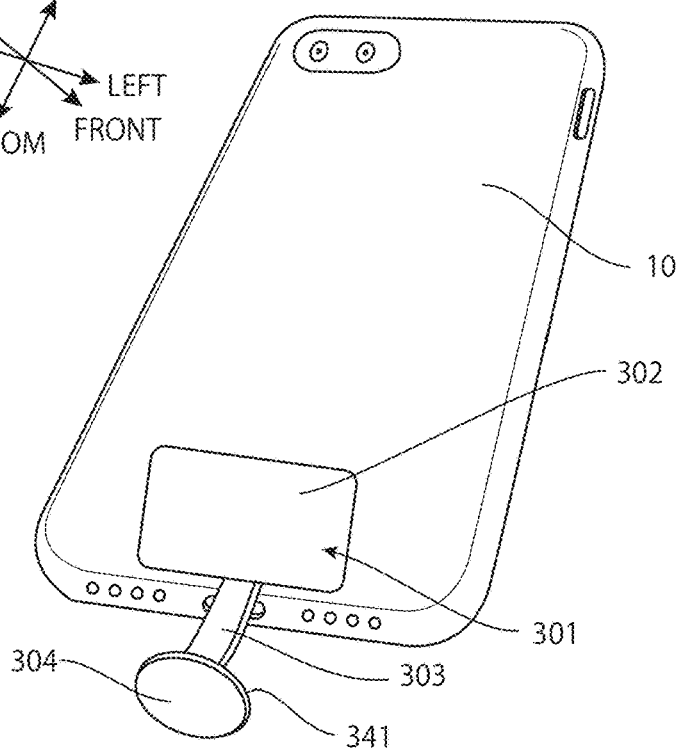

[FIG15]
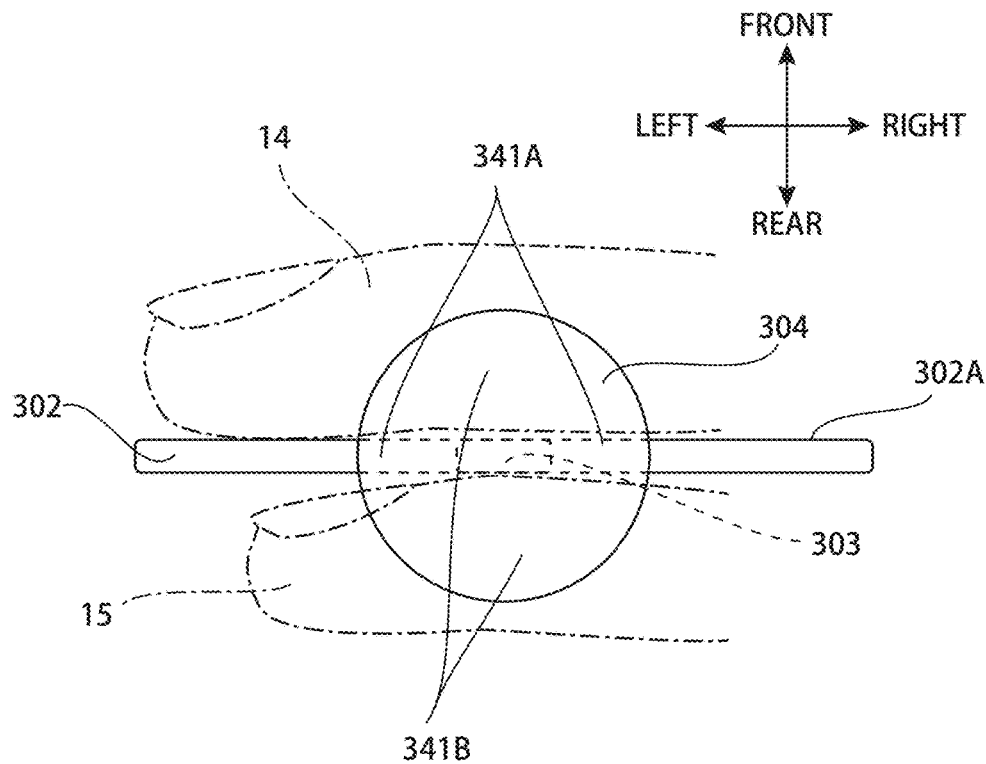
[FIG16]
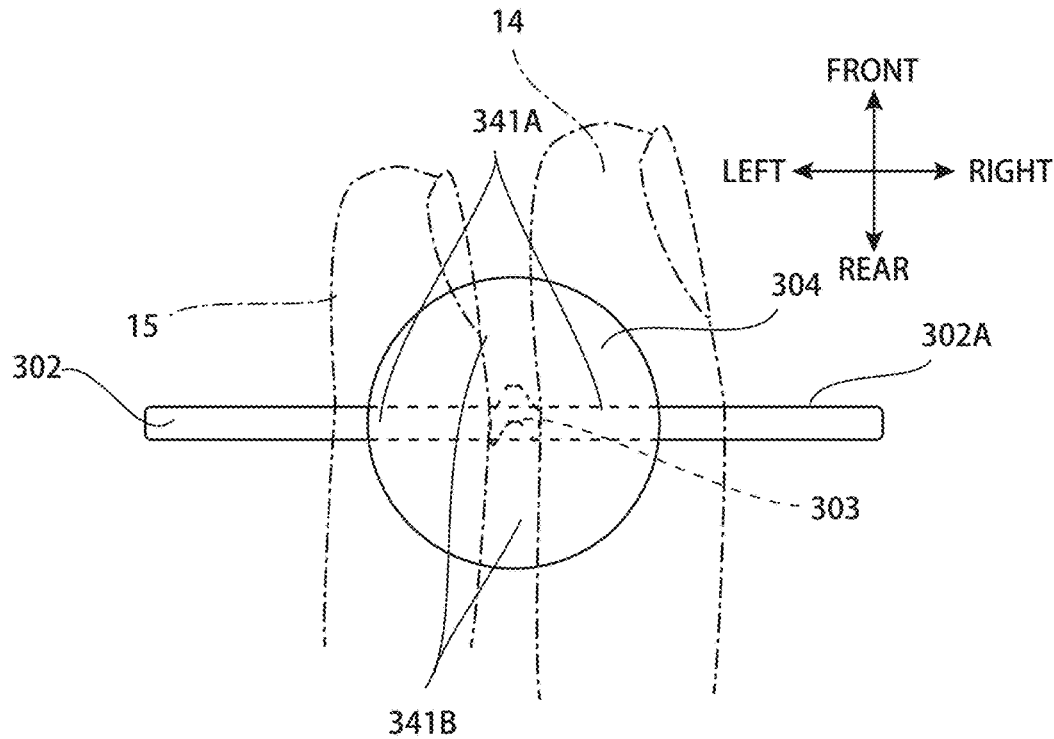

[FIG17]
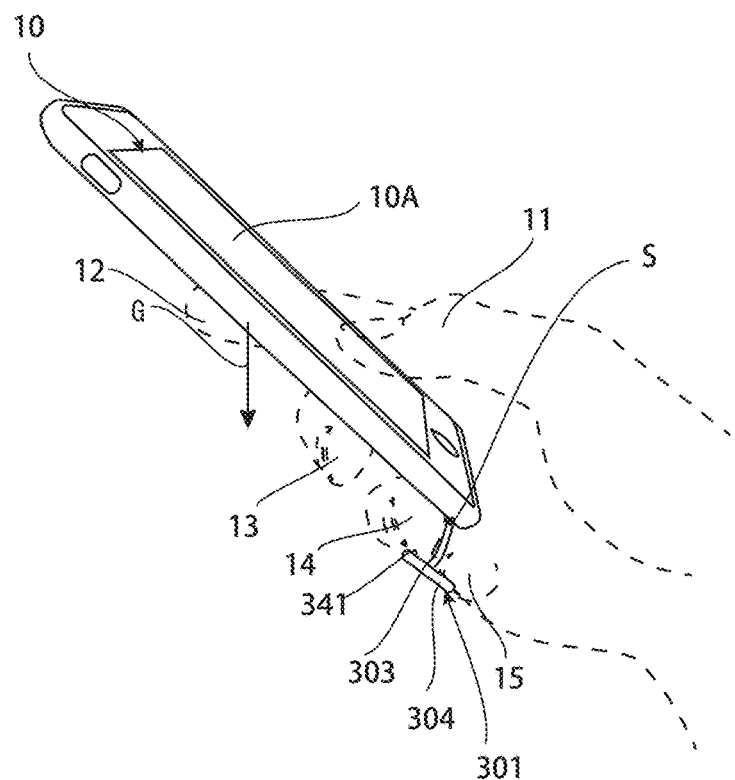
[FIG18]
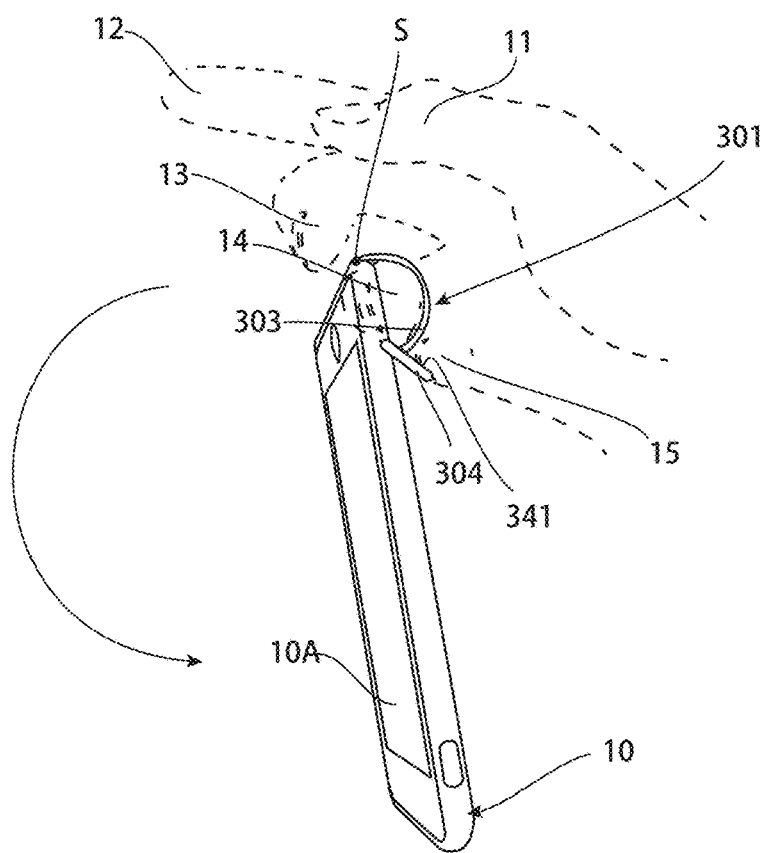

[FIG19]
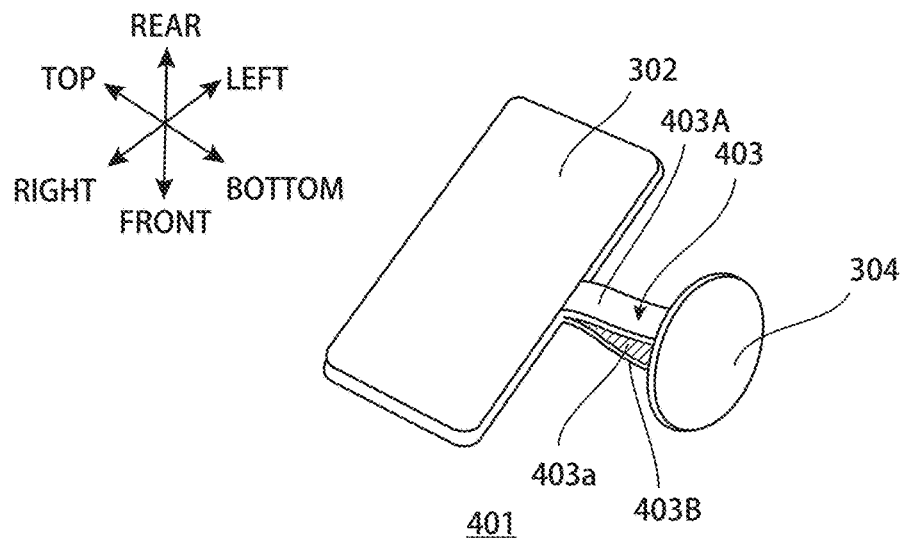
[FIG20]
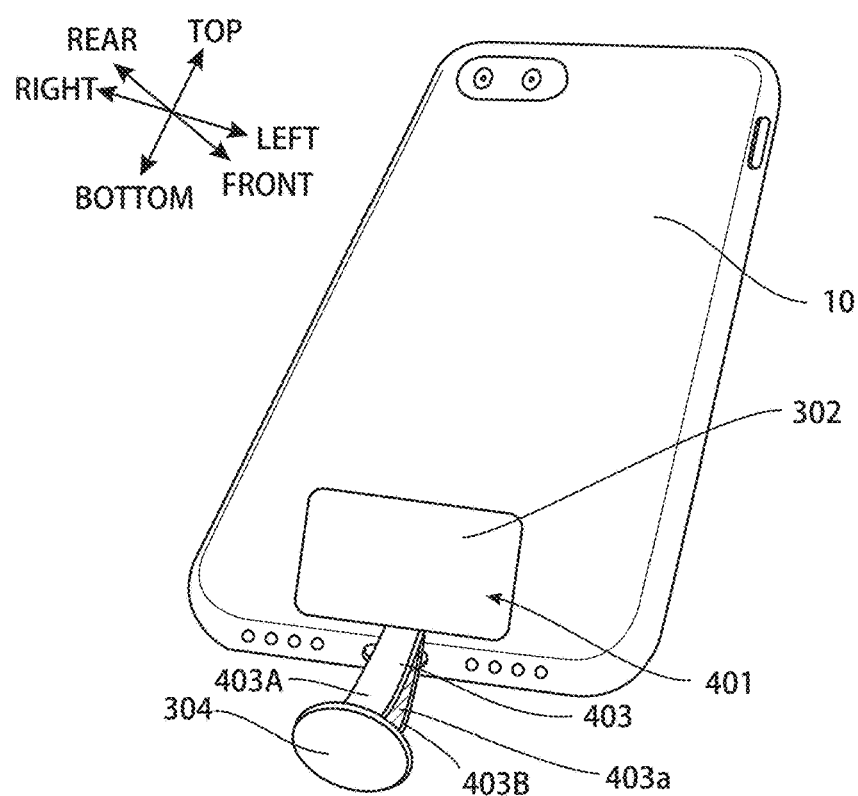

[FIG21]
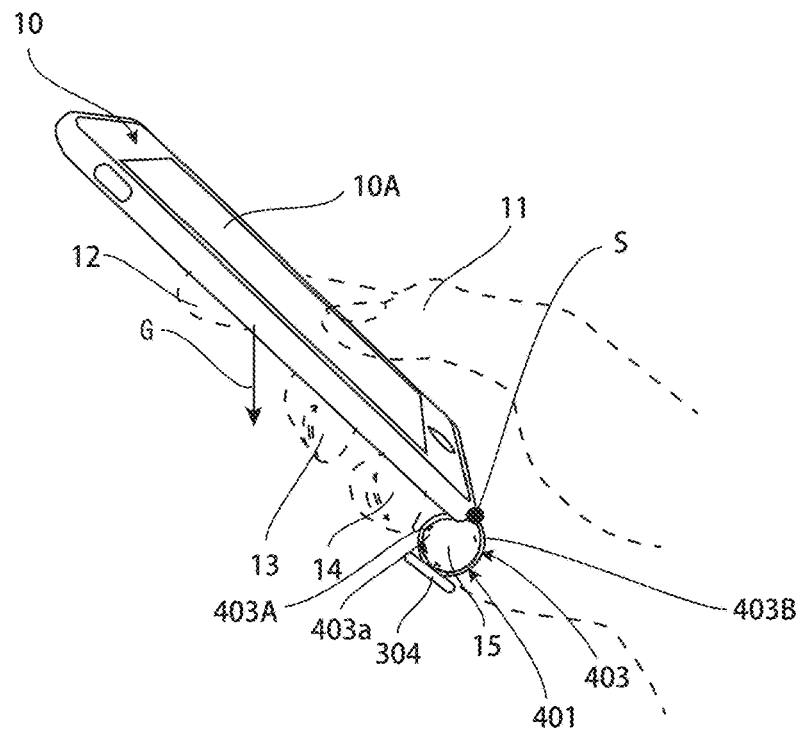
[FIG22]
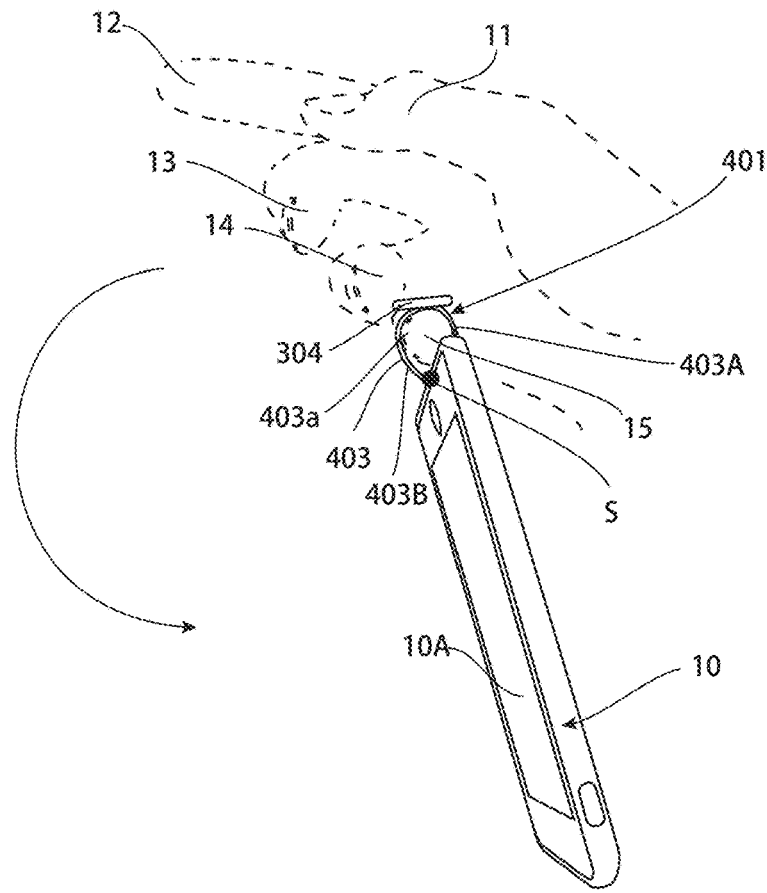

【FIG23】
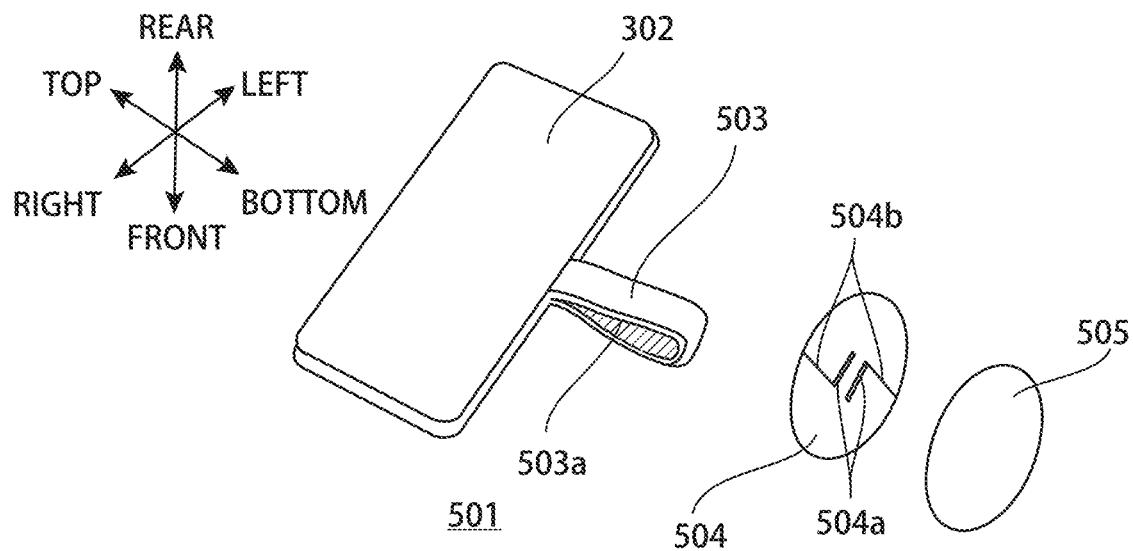
【FIG24】
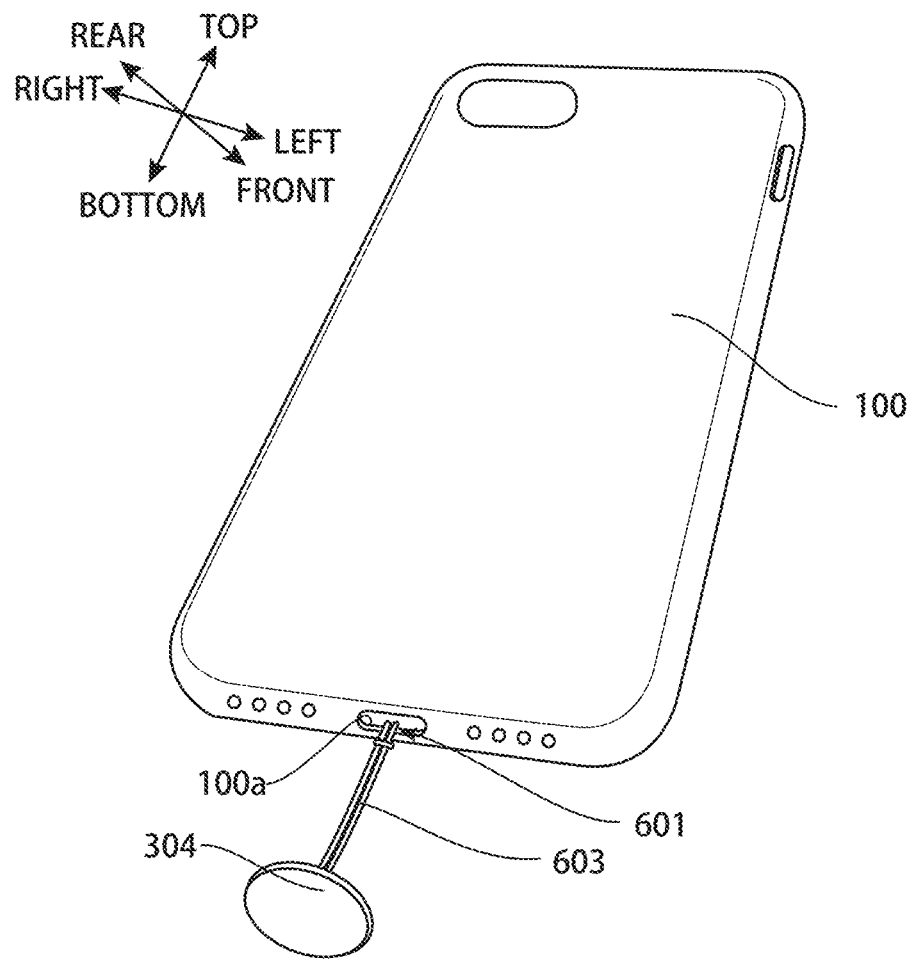

[FIG25]
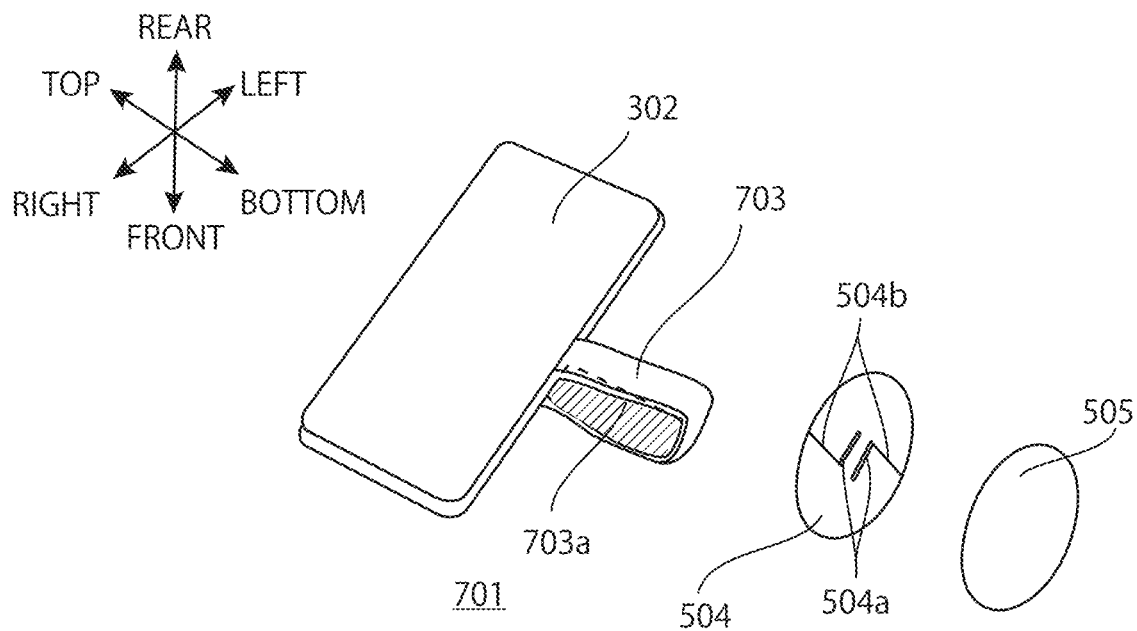
[FIG26A]
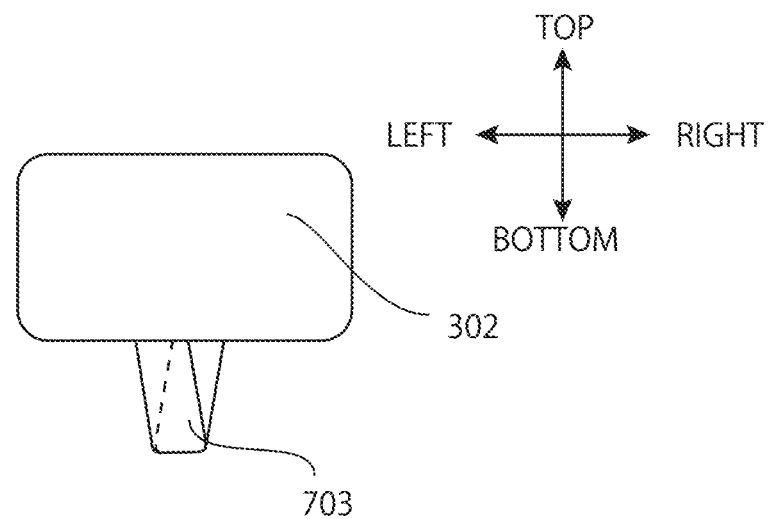
[FIG26B]
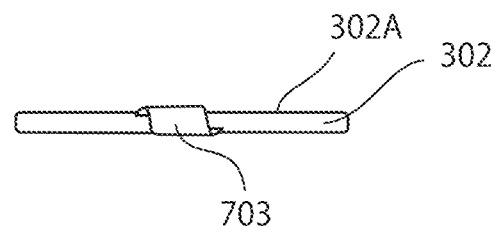

[FIG27]
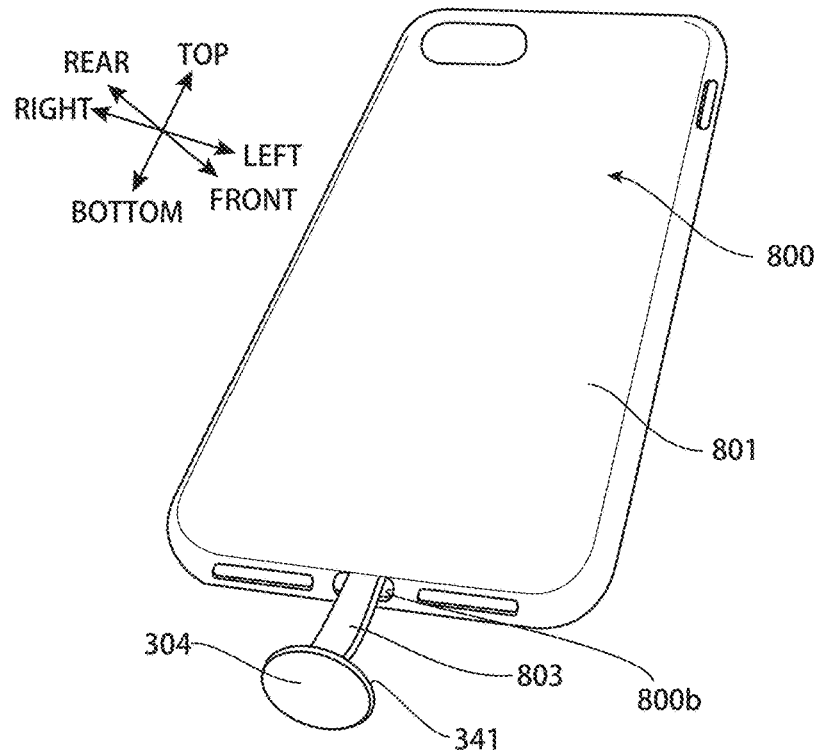
[FIG28]
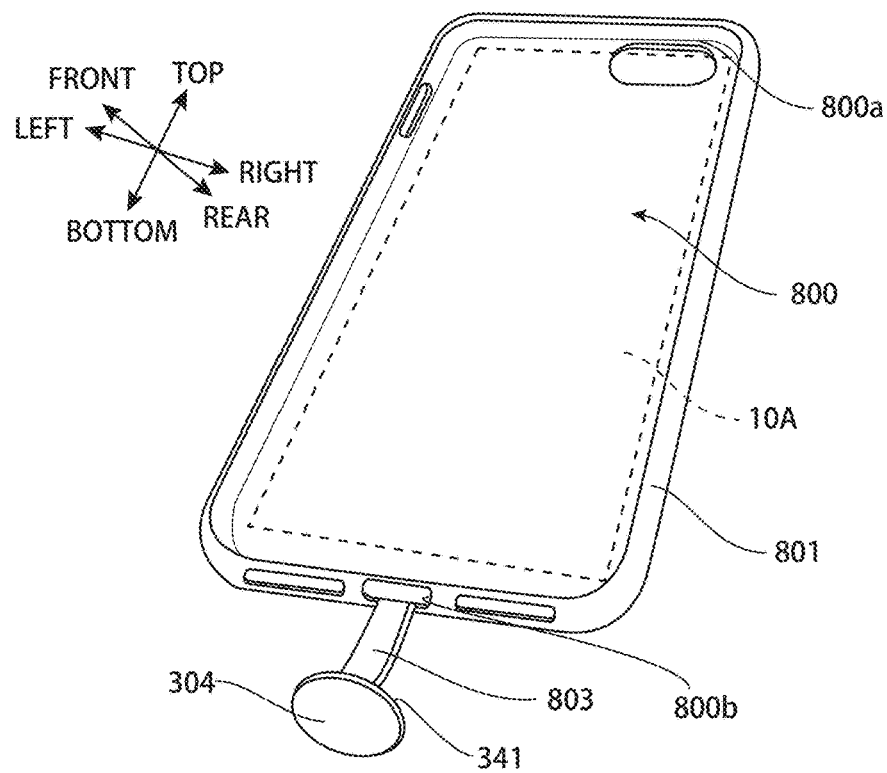

[FIG29]
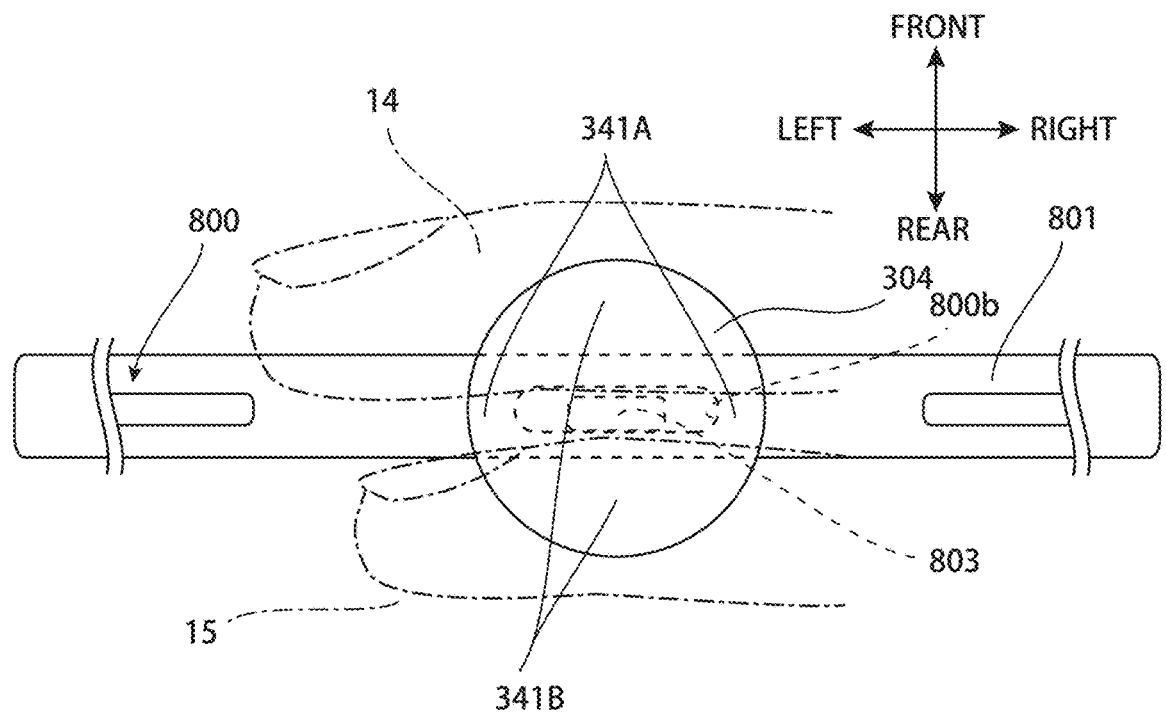
[FIG30]
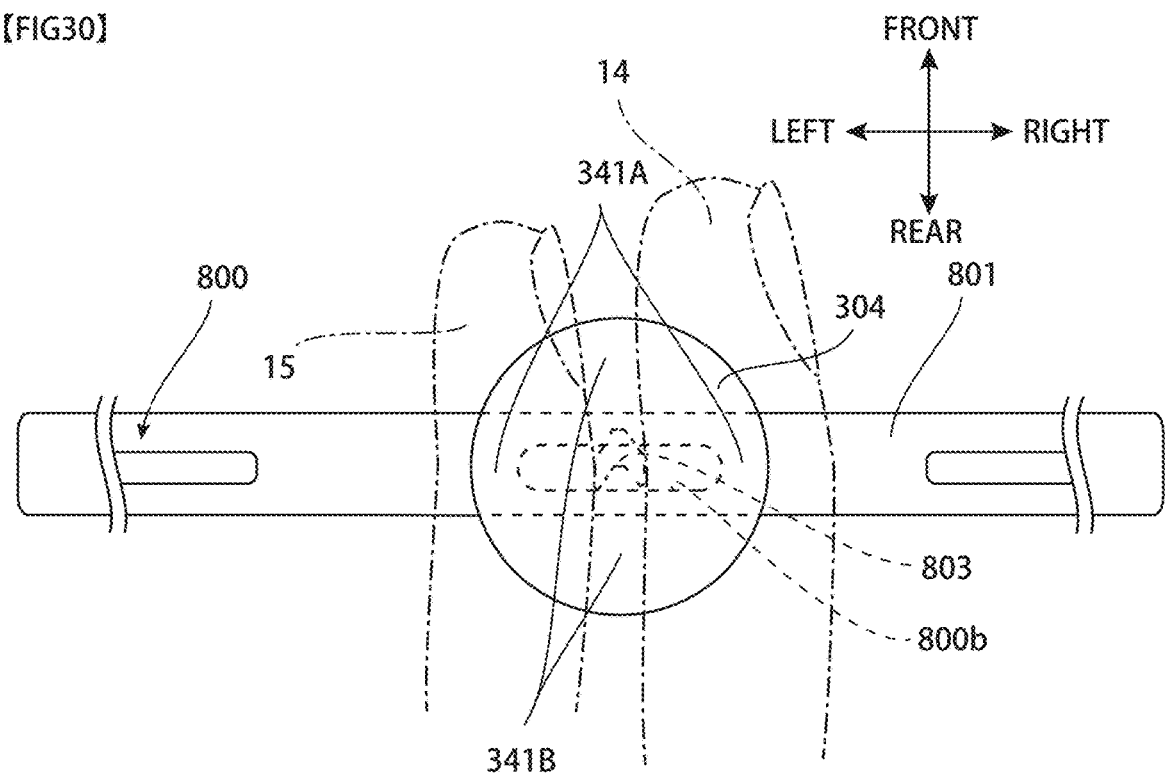

[FIG31]
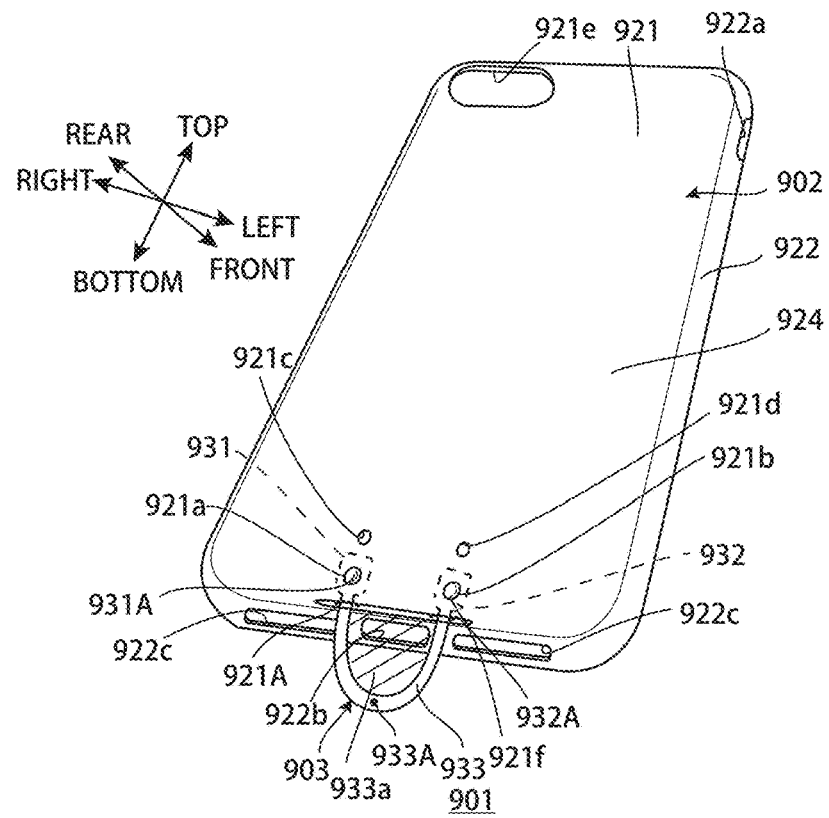
[FIG32]
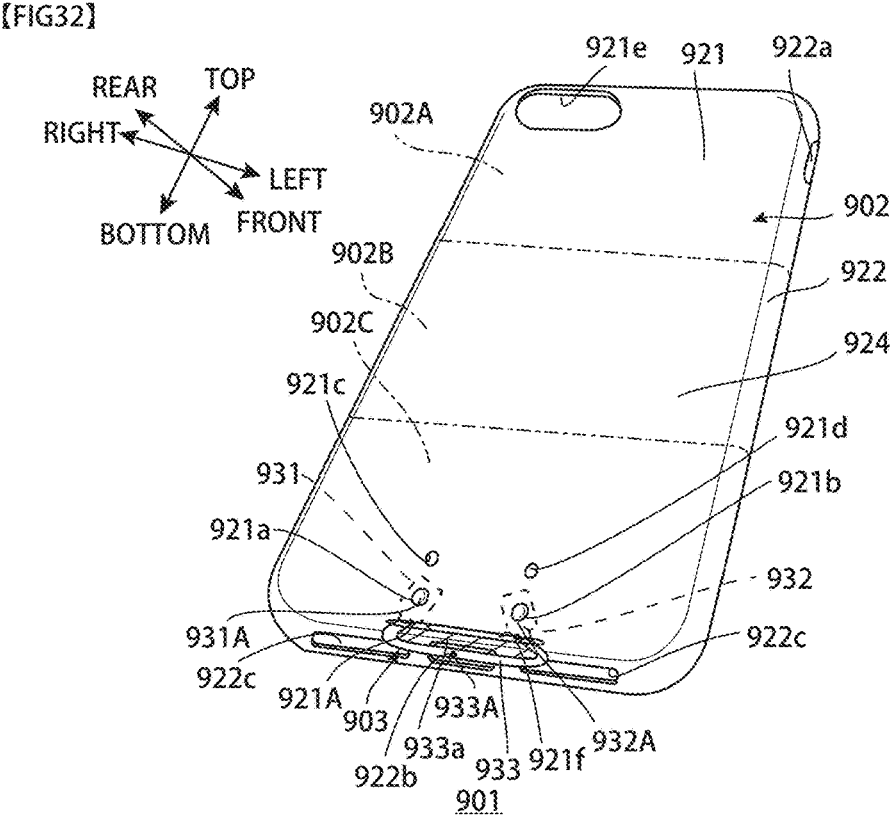

[FIG33]
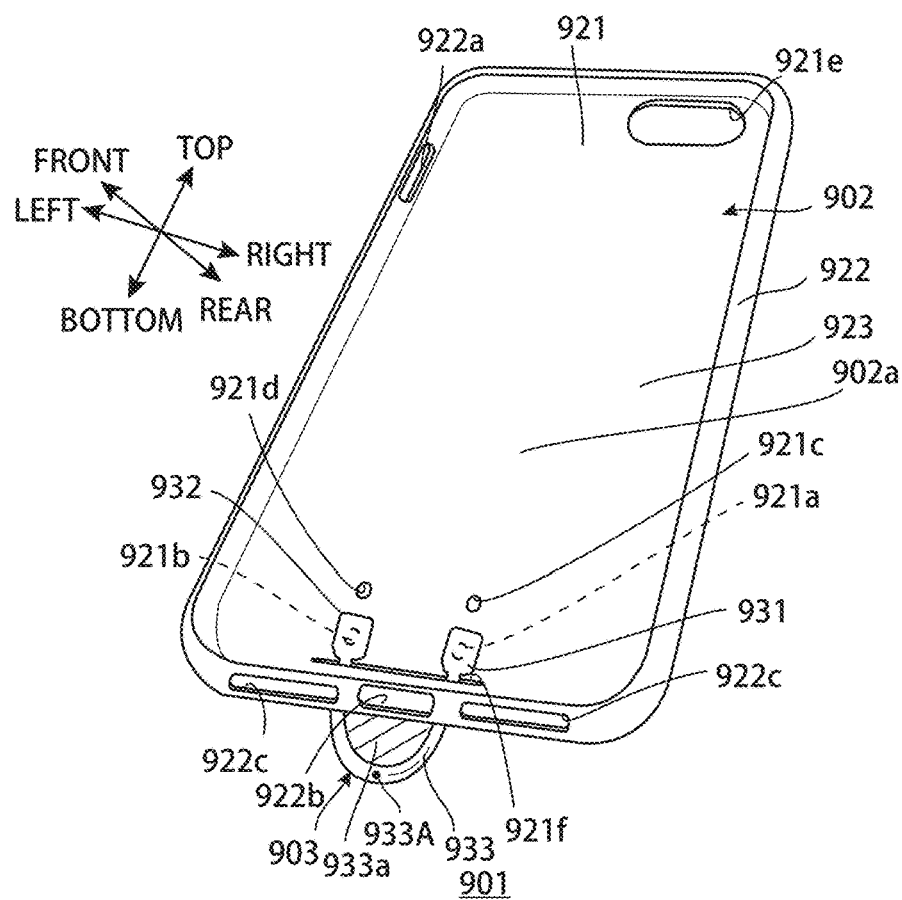
[FIG34]
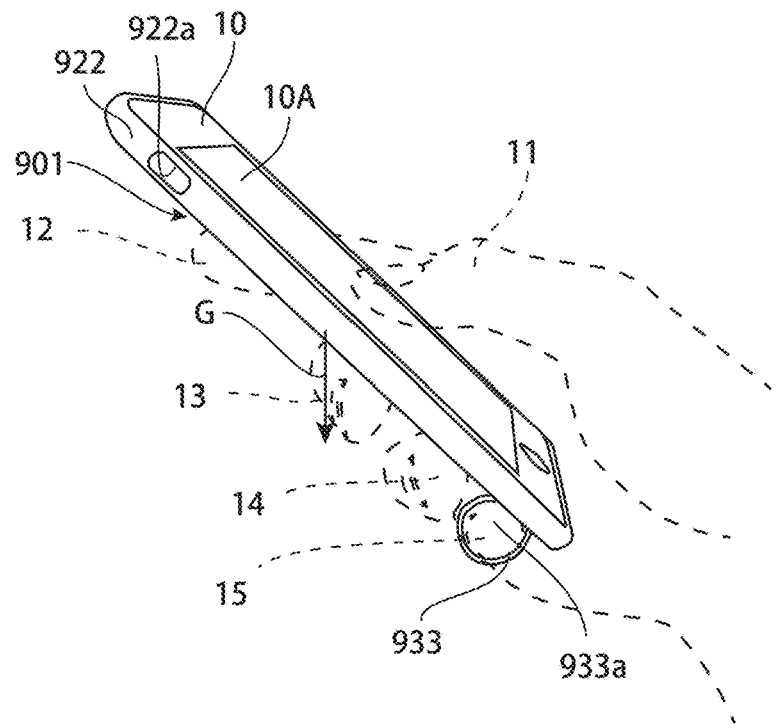

[FIG35]
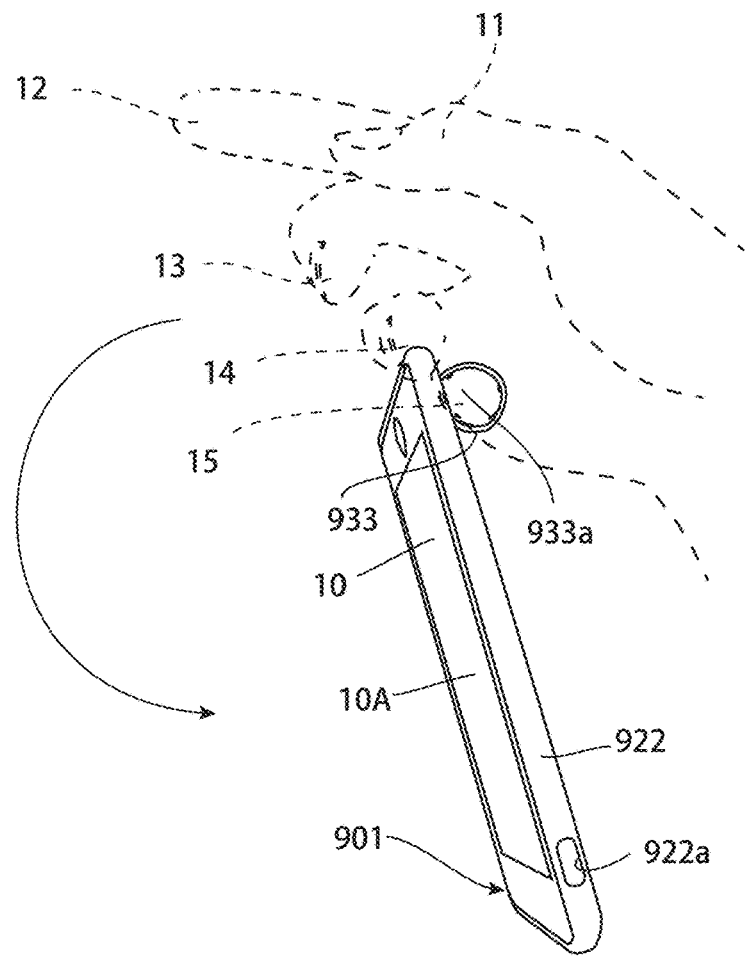
[FIG36]
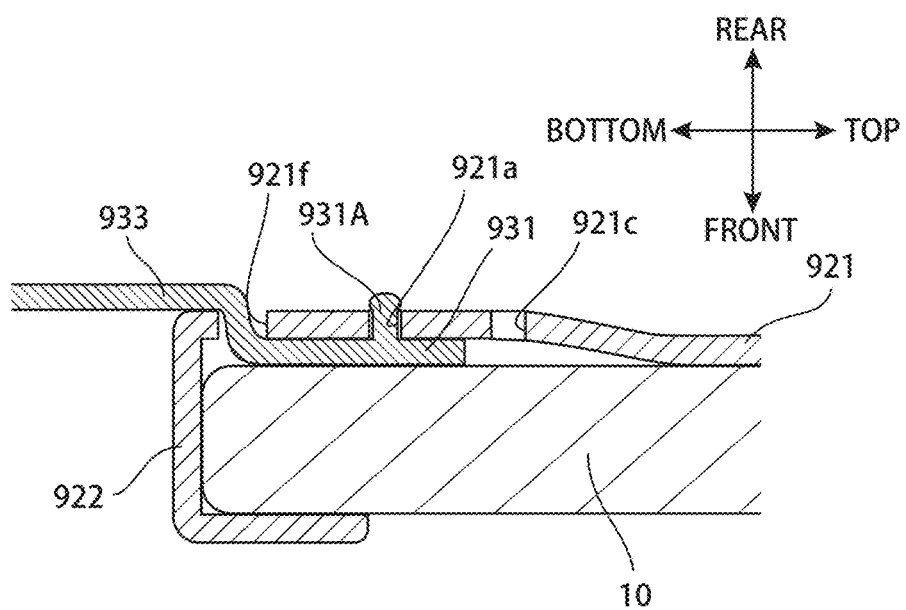

[FIG37]
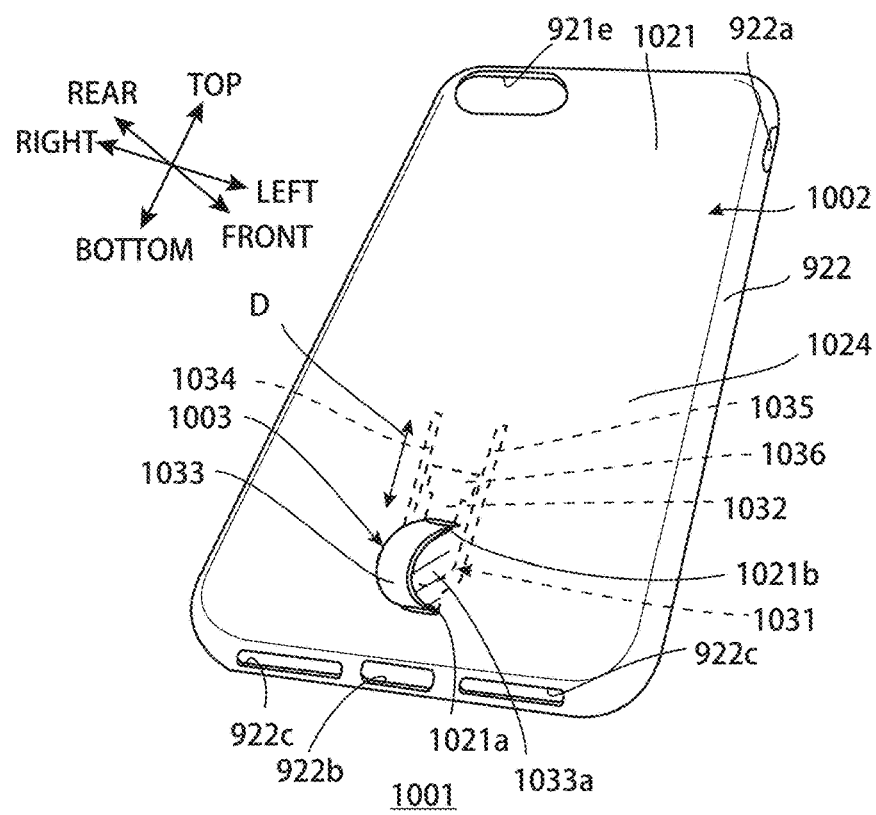
[FIG38]
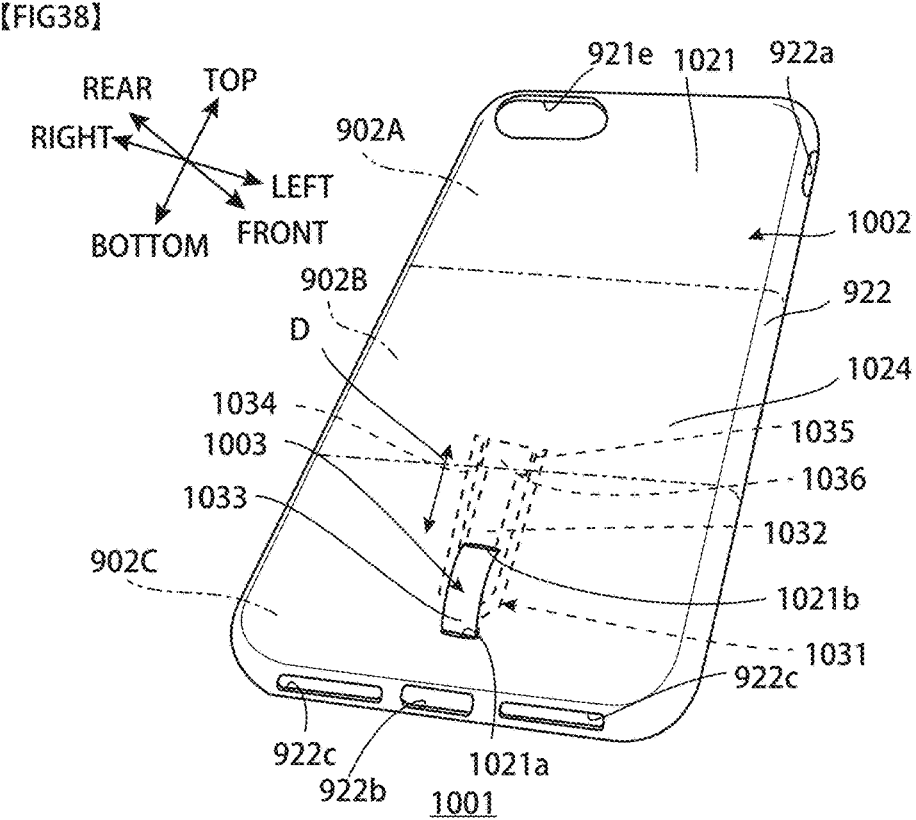

[FIG39]
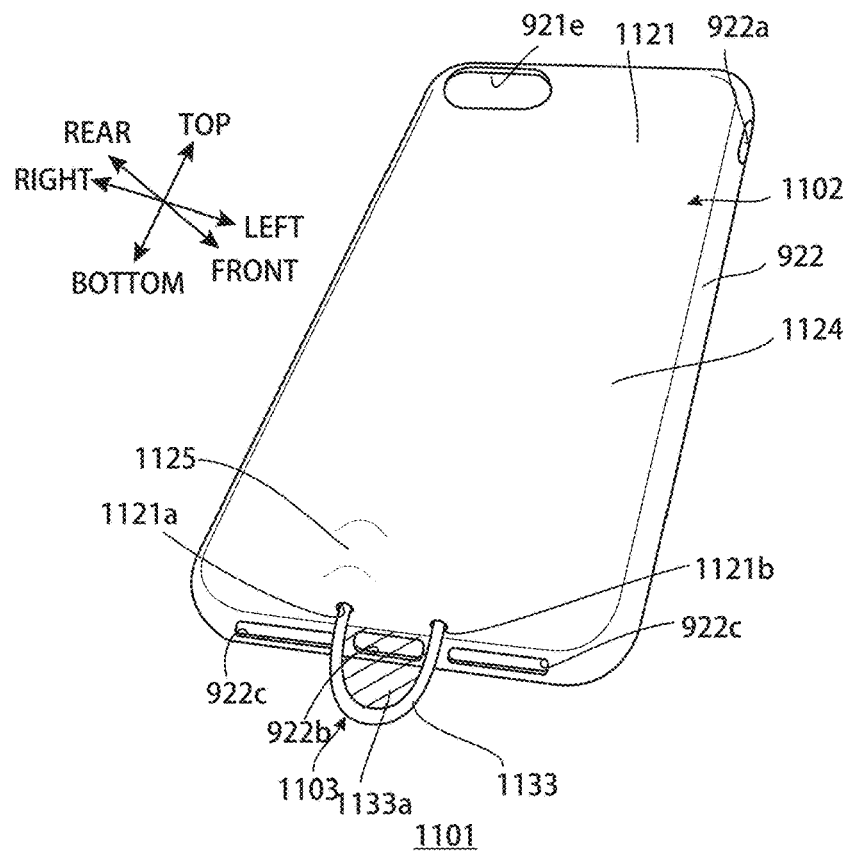
[FIG40]
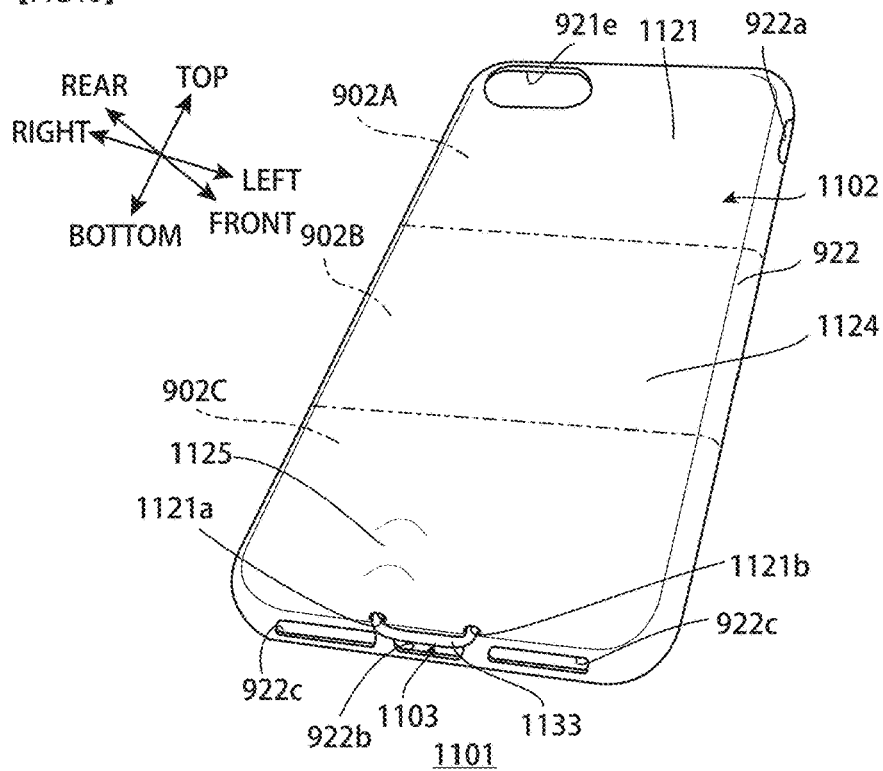

[FIG41]
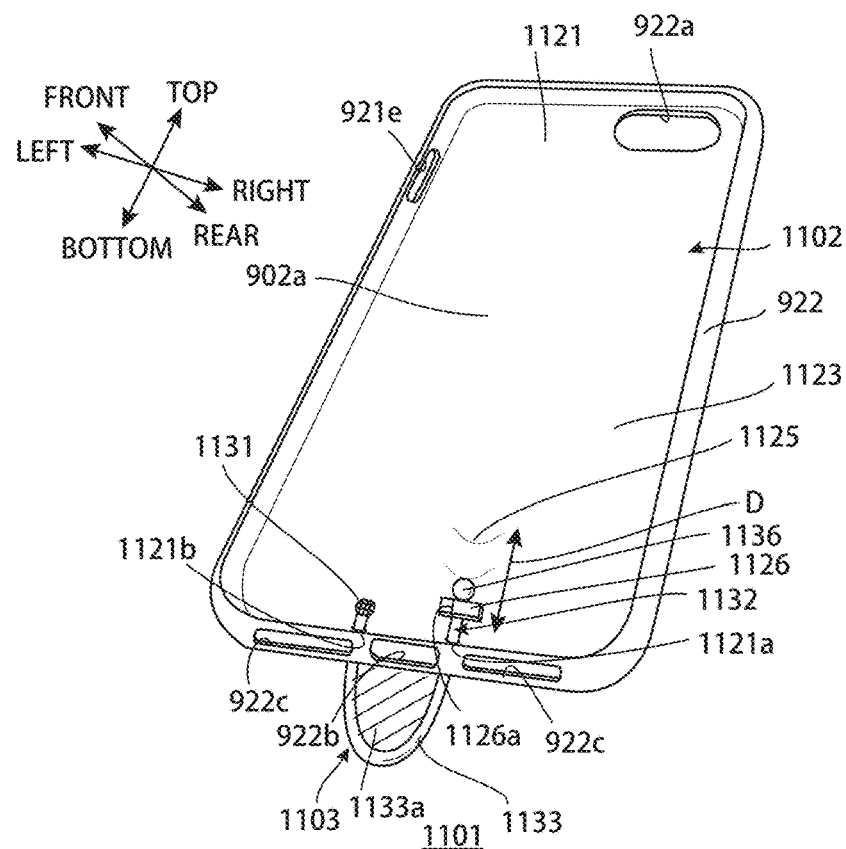
[FIG42]
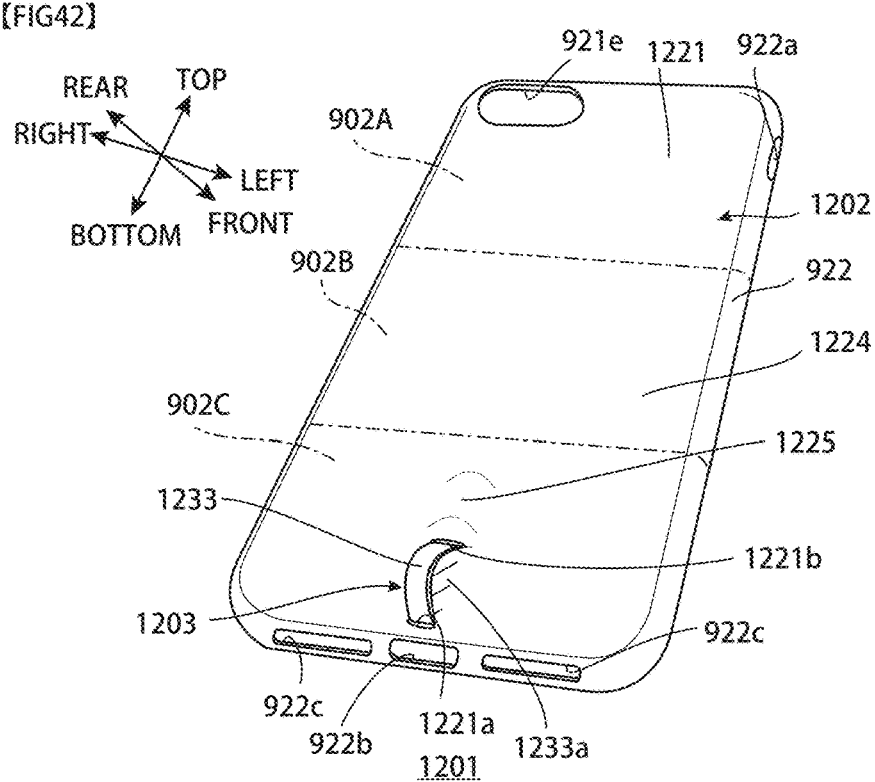

[FIG43]
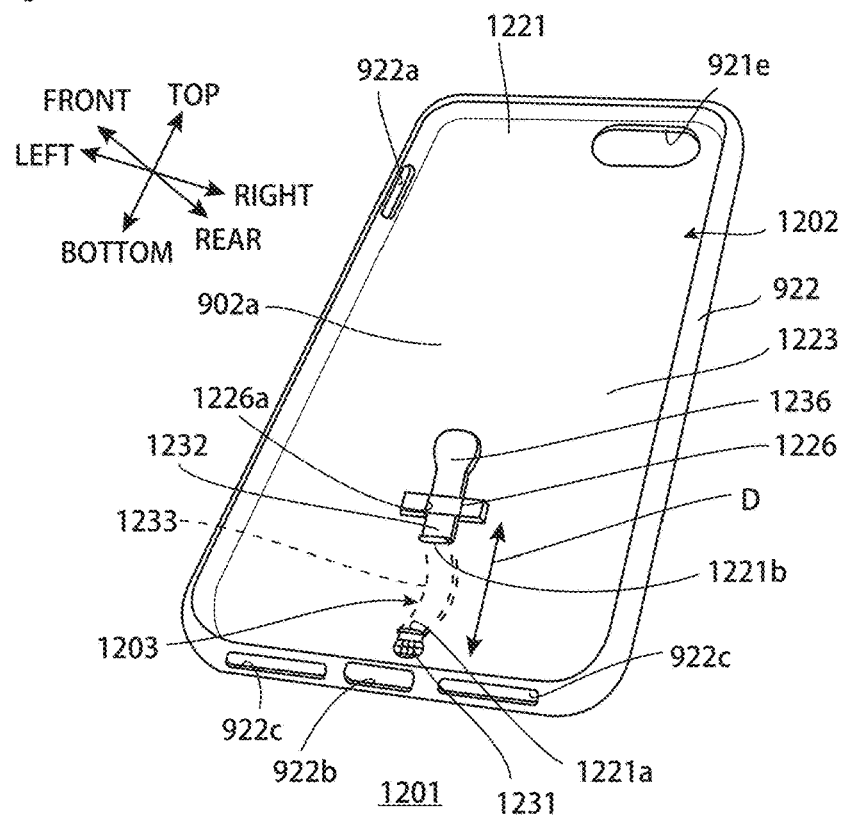
[FIG44]
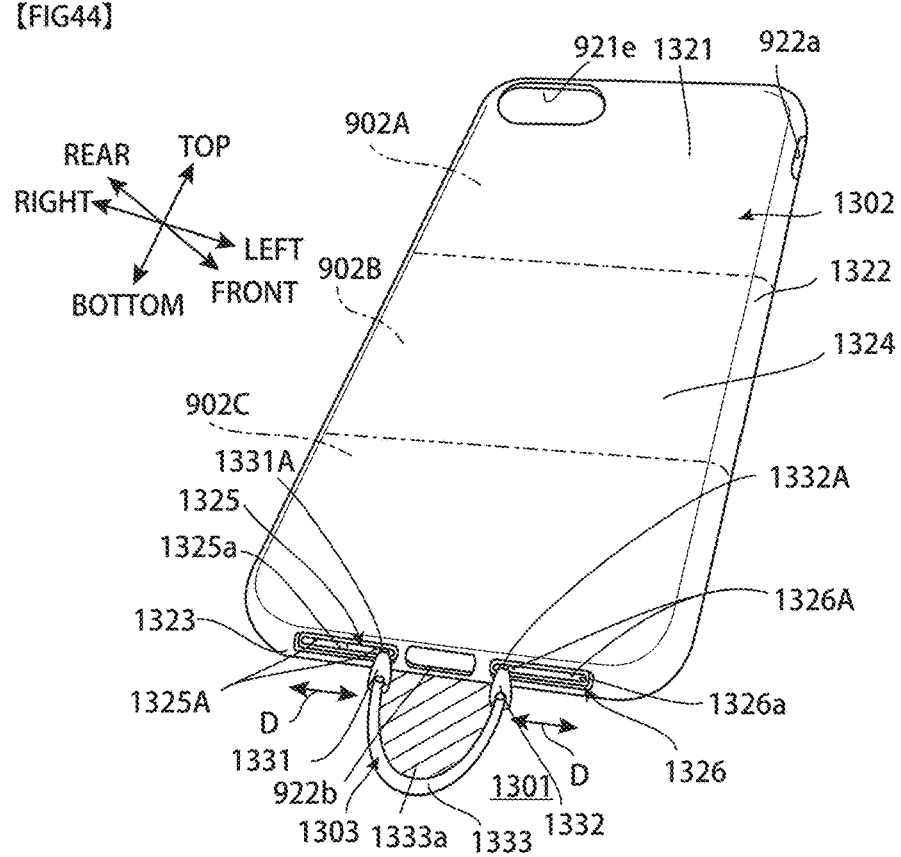

[FIG45]
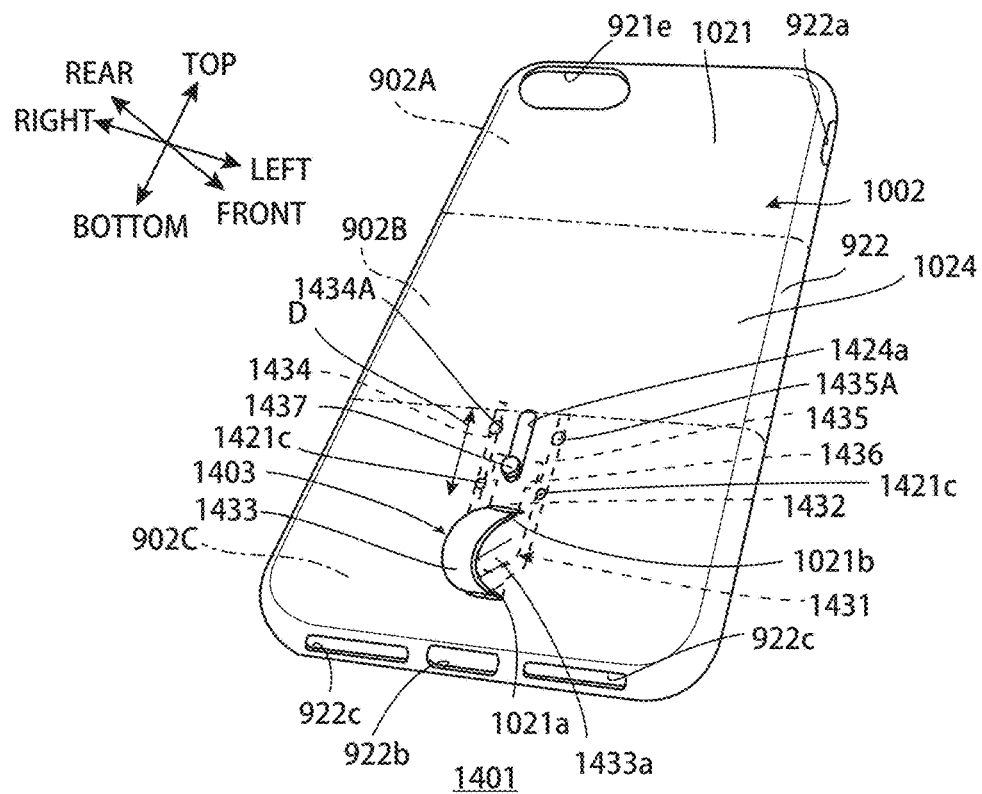
[FIG46]
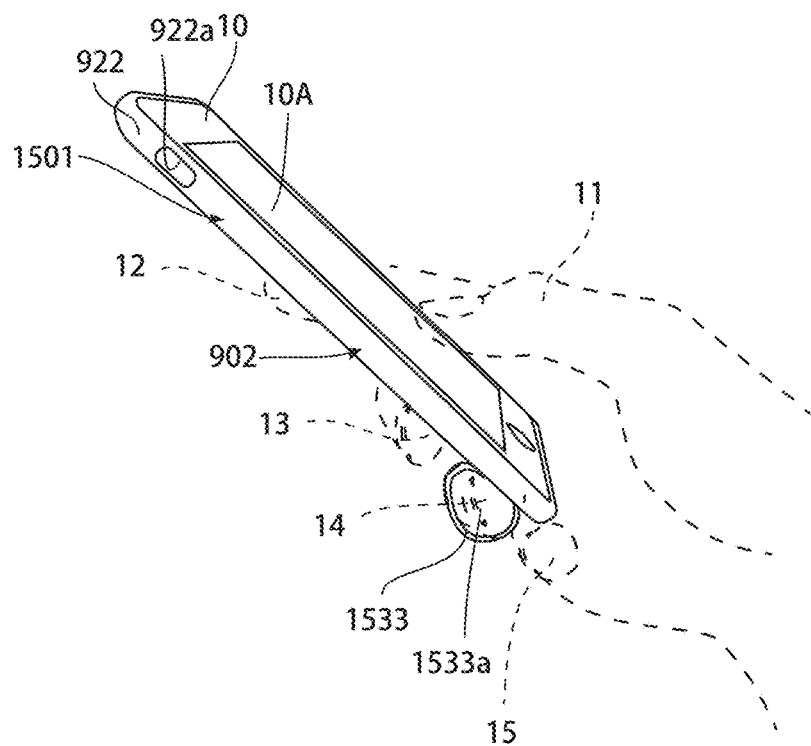

[FIG47]
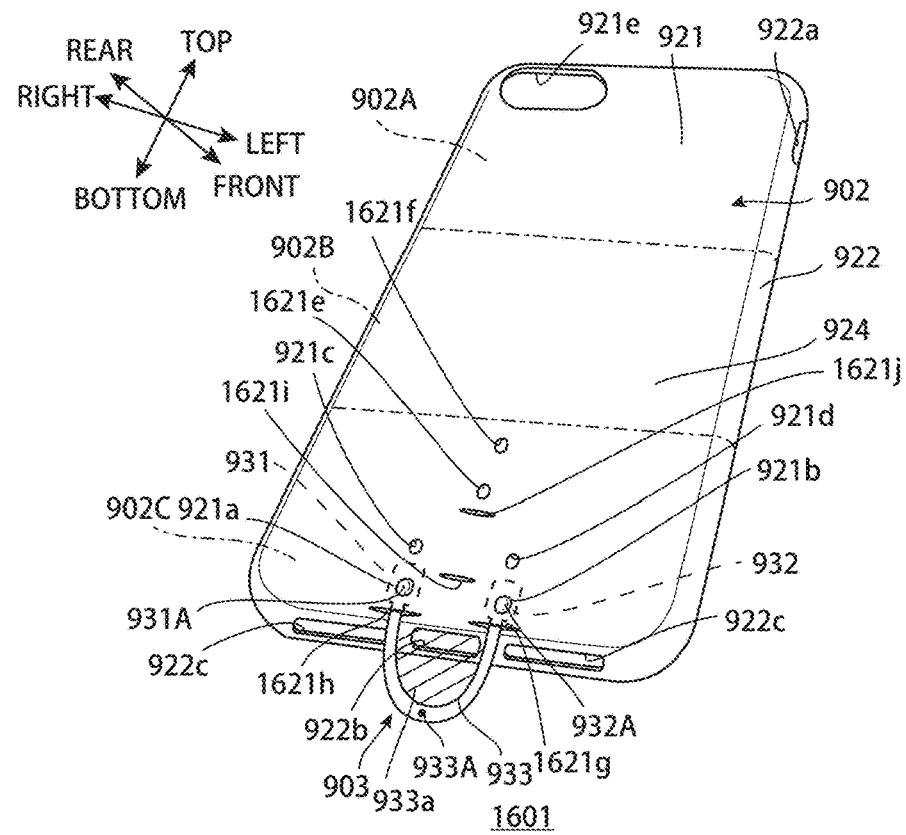
[FIG48]
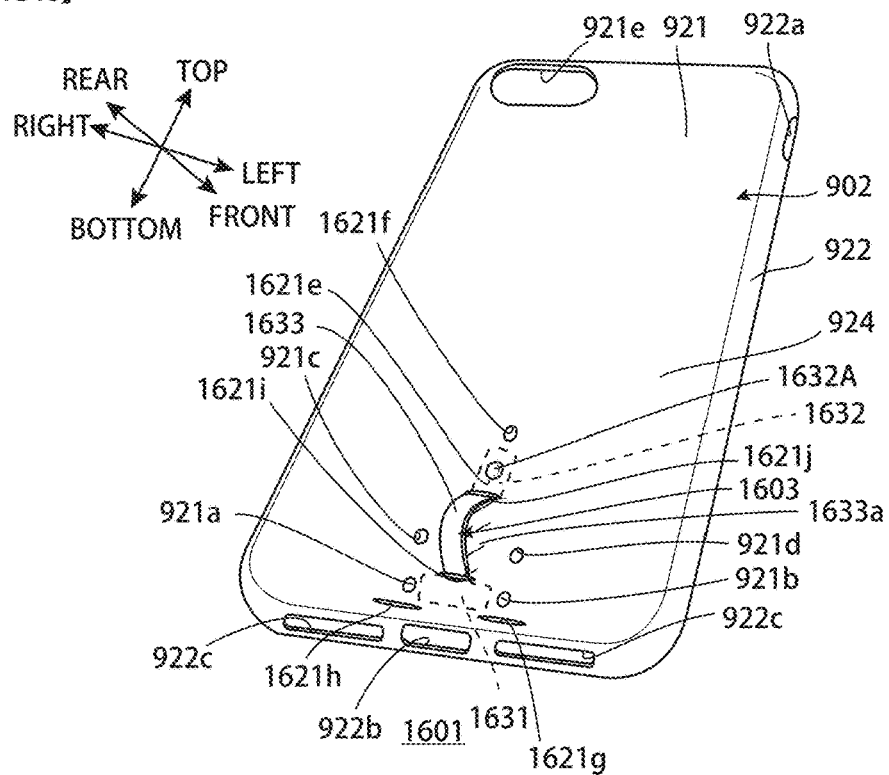

TERMINAL HOLDER AND TERMINAL CASE

TERMINAL HOLDER AND TERMINAL CASE

This application is a divisional application of U.S. patent application Ser. No. 16/973,831 filed Dec. 10, 2020, which is a U.S. National Phase of PCT/JP2019/023788 filed Jun. 17, 2019, which claims priority from Japan Patent Application No. 2018-205799 filed Oct. 31, 2018, Japan Patent Application No. 2018-115656 filed Jun. 18, 2018 and Japan Patent Application No. 2018-147299 filed Aug. 5, 2018, the entire disclosures of which are incorporated herein by reference.

TECHNICAL FIELD

This invention relates to a terminal holder and a terminal case, particularly the terminal holder for holding a mobile terminal and the terminal case for accommodating the mobile terminal.

BACKGROUND ART

Conventionally, a mobile terminal holder having two rings into which a user inserts fingers is known (e.g., Patent Literature 1). The mobile terminal holder is fixed at a center back of a mobile terminal and is held by inserting the finger into a finger retainer. The mobile terminal holder allows the mobile terminal to be propped at an angle using the finger retainer as a support.

Other mobile terminal case is configured to be used as a stand when needed (e.g., Patent Literature 2). The mobile terminal case has a back portion provided with a support leg having ring-shape and a recessed portion where the support leg is configured to be accommodated. The support leg and the recessed portion are provided at a central portion on the back portion of the mobile terminal case, and the mobile terminal case is configured to be placed diagonally on the ground by exposing the support leg from the recessed portion and bringing the same into contact with the ground.

CITATION LIST

Patent Literature

Patent Literature 1: Japanese Patent Application Publication No. 2017-69791
Patent Literature 2: Japanese Patent Application Publication No. 2010-368237

SUMMARY OF INVENTION

Technical Problem

The mobile terminal holder described in the Patent Literature 1 could not be attached to the periphery of the mobile terminal because the finger retainer and a base are overlapped in the direction perpendicular to the display surface of the mobile terminal. In other words, the base protrudes from the periphery of the mobile terminal when the mobile terminal holder is attached to the periphery of the mobile terminal. Since the finger retainer cannot be placed at the periphery of the mobile terminal, which lacks the freedom to hold the mobile terminal.

In the mobile terminal holder and the mobile terminal case, since the ring portion is provided near the center on the back of the case, the case is held in place by inserting the middle or the index finger into the ring portion. Even if the user removes the hand from the case to perform other tasks while holding the case with the middle or the index finger, the middle or the index finger is still inserted into the ring portion and the mobile terminal still remains in the palm. This makes it difficult to perform other tasks by hand, such as picking up items from a bag due to the mobile terminal case.

In addition, the ring portion is provided near the center on the back of the mobile terminal, and the mobile terminal is supported near the center of the gravity thereof, which lacks stability on the palm. In other words, when the mobile terminal is held horizontally, the mobile terminal is supported near the center of gravity and thus is unstable on the palm during the operation of the mobile terminal.

Therefore, the object of the present invention is to provide a terminal holder and a terminal case capable of stably holding a mobile terminal as well as performing other tasks while holding the mobile terminal.

Solution to Problem

To solve the above problem, the present invention provides a terminal holder for holding a mobile terminal includes a fixed portion having a fixed surface fixed to the mobile terminal or a terminal case covering the mobile terminal, and a holding portion having both ends connected to the fixed portion. The holding portion has a finger insertion space into which a finger is inserted to hold the mobile terminal or the terminal case. The finger insertion space fails to overlap with the fixed portion as viewed from a direction orthogonal to the fixed surface.

The finger insertion space is defined between the fixed portion and the holding portion. The finger inserted into the finger insertion space is a little finger. The finger insertion space and the fixed surface are roughly parallel.

The finger insertion space is defined between the fixed portion and the holding portion. The finger inserted into the finger insertion space is a little finger. The finger insertion space and the fixed surface are roughly parallel.

The finger support portion has a width wider than that of the one end portion and the other end portion. The fixed portion is formed with a notch at a connection between the fixed portion and the holding portion.

The holding portion is of roughly flat plate shape and has one end portion connected to the fixed portion, the other end portion connected to the fixed portion, and a finger support portion connecting the one end portion and the other end portion to support the finger inserted into the finger insertion space. The finger insertion space is surrounded by the one end portion, the other end portion, and the finger support portion. The finger is inserted into the finger insertion space in a direction roughly parallel to the fixed surface.

The fixed portion has a first fixed portion to which one end portion is connected and a second fixed portion to which the other end portion is connected. The second fixed portion is formed with a fitting hole with which the first fixed portion is fitted. The finger insertion space is surrounded by the one end portion, the other end portion, and the finger support portion by fitting the second fixed portion with the fitting hole.

The terminal holder further includes a contact portion provided at a tip end of the holding portion in an extending direction of the holding portion. The contact portion has a contact surface that intersects the extending direction and is in contact with the finger when the holding portion is pinched by the finger. The contact surface has a first holding area that at least partially overlaps with the fixed portion as viewed from the extending direction, and a second holding area that fails to overlap with the fixed portion as viewed from the extending direction. The first holding area is in contact with the finger when the holding portion is pinched by the finger extending in the first direction. The second holding area is in contact with the finger when the holding portion is pinched by the finger extending in a second direction intersecting the first direction. The holding portion is located between the first holding area and the second holding area as viewed from the extending direction.

The contact portion is detachable with respect to the holding portion.

The holding portion is located on the same plane as the fixed surface. The contact surface is perpendicular to the extending direction. The first direction is perpendicular to the fixed surface. The second direction is orthogonal to the first direction and the extending direction.

The present invention provides a terminal case includes a main body, and the terminal holder as claimed in any one of first to ninth inventions. The terminal holder is provided at a lower end of the main body.

A terminal storage space for accommodating the mobile terminal is defined in the main body. The holding portion has a pinched portion located in the terminal storage space and is sandwiched between the main body and the mobile terminal when the mobile terminal is accommodated in the terminal storage space. The holding portion has both ends portion connected to the pinched portion and is exposed from the terminal storage space.

The present invention provides a terminal case for protecting a mobile terminal. The terminal case includes a main body, and a terminal holder includes a fixed portion having a fixed surface fixed to the main body and a holding portion having both ends connected to the fixed portion. The holding portion has a finger insertion space into which a finger is inserted to hold the main body. The finger insertion space fails to overlap with the fixed portion as viewed from a direction orthogonal to the fixed surface. The fixed portion is sandwiched between the mobile terminal and the main body. The main body has a lower end portion from which the holding portion protrudes downwardly.

The finger inserted into the finger insertion space is a little finger. The lower end portion of the main body serves as a fulcrum to support the main body when the little finger is inserted into the finger insertion space and the main body is grasped by hand.

The present invention provides a terminal holder including a first fixed portion fixed to a mobile terminal or a terminal case covering the mobile terminal; a second fixed portion fixed to the mobile terminal or the terminal case; and a holding portion connecting the first fixed portion to the second fixed portion in the connecting direction. The holding portion has a width narrower than that of the first fixed portion and the second fixed portion in a direction orthogonal to the connecting direction. The first fixed portion, the second fixed portion, and the holding portion are located in the same plane. When the first fixed portion and the second fixed portion are fixed to the mobile terminal, a finger insertion space is defined by the holding portion. The finger insertion space fails to overlap with the first fixed portion and the second fixed portion as viewed from a direction orthogonal to the first fixed portion.

Herein, the location on the same plane means that the first fixed portion, the second fixed portion and the holding portion is formed in flat shape on a smooth plane without any unevenness.

The holding portion is of roughly flat plate shape extending in the connecting direction and has one end portion connected to the first fixed portion, the other end portion connected to the second fixed portion, and a finger support portion connecting the one end portion and the other end portion in the connecting direction. The finger support portion supports the finger inserted into the finger insertion space. A connection between the one end portion and the first fixed portion is displaced from a center line parallel to the connecting direction in the first fixed portion. A connection between the other end portion and the second fixed portion is displaced from the center line parallel to the connecting direction in the second fixed portion. The connection between the one end portion and the first fixed portion, and the connection between the other end portion and the second fixed portion are aligned on a same line in the connecting direction.

The terminal storage case for accommodating the mobile terminal of the present invention includes a main body having terminal storage space for accommodating the mobile terminal, and a holding portion connected to the main body at both ends and having a little finger holding portion having a little finger insertion space between the main body. Only the little finger of the user can be inserted into the little finger insertion space. At least a portion of the holding portion is located in the lower region when the main body is divided evenly into three regions in the vertical direction.

The holding portion is located in the terminal storage space and further have a pinched portion sandwiched between the main body and the mobile terminal when the mobile terminal is accommodated in the terminal storage space. The little finger holding portion is connected to the pinched portion at both ends and exposed from the terminal storage space.

The main body portion is formed with a first through hole formed in the lower region and a second through hole formed in the lower region with a space from the first through hole. The pinched portion includes a first base portion connected to one end of the little finger holding portion and having a first protrusion rotatably inserted into the first through hole, and a second base portion connected to the other end of the little finger holding portion and having a second protrusion rotatably inserted into the second through hole. By rotating the first protrusion and rotating the second protrusion in a direction opposite to the direction of rotation of the first protrusion, the distance between the separation point most distant from the main body and the main body at the little finger holding portion is varied.

The main body is formed with a first notch at the lower region, and a second notch at the lower region with a space from the first notch. The pinched portion includes a fixed portion connected to one end of the little finger holding portion, located in the terminal storage space via the first notch, and immovable to the main body, and a moving portion connected to the other end of the little finger holding portion, located in the terminal storage space via the second notch, and movable to the main body. The cross-sectional area of the little finger insertion space changes as the moving portion moves with respect to the main body.

The main body is formed with a plurality of through holes, and the pinched portion has a protrusion inserted into any one of the plurality of through holes. When the protrusion is changed from one of the plurality of through holes to the other, the length of the little finger holding portion is changed.

The main body is formed with a first moving groove and a second moving groove parallel to the first moving groove. The holding portion includes a first moving portion connected to one end of the little finger holding portion and moving in the first moving groove in a moving direction, and a second moving portion connected to the other end of the little finger holding portion and moving in the second moving groove in the moving direction. The cross-sectional area of the little finger insertion space changes as the first moving portion moves in the first moving groove in the moving direction and the second moving portion moves in the second moving groove in the moving direction.

Further, the terminal storage case for accommodating the mobile terminal includes a main body having a terminal storage space for accommodating the mobile terminal, a holding portion having a medicinal finger holding portion connected to the main body portion at both ends and having a medicinal finger insertion space defined between the main body. The user's medicinal finger only inserts the medicinal finger insertion space. At least a portion of the holding portion is located in the lowest lower region when the main body portion is divided evenly into three parts in the vertical direction.

The terminal holder for holding the mobile terminal or the terminal case covering the mobile terminal includes: a fixed portion having a fixed surface fixed to the mobile terminal or the terminal case; a holding portion composed of a flexible material extending in an extending direction from the fixed portion, the holding portion being pinched between the fingers when the mobile terminal or terminal storage case is held; and a contact portion having a contact surface intersecting in the extending direction and in contact with a finger when the holding portion is gripped. The holding surface has a first holding area partially that overlaps with the holding portion in the extending direction, and a second holding area that fails to overlap with the holding portion in the extending direction. The finger is in contact with the first holding area when the holding portion is pinched by the finger extending in a first direction, while the finger is in contact with the second holding area when the holding portion is pinched by the finger extending in a second direction intersecting the first direction. The holding portion is located between the first holding area and the second holding area as viewed from the extending direction. The holding portion and the contact portion fails to overlap with the fixed portion as viewed from a direction orthogonal to the fixed surface.

The holding portion has a finger insertion space into which the medicinal finger or the little finger is inserted, and the contact portion is detachable to the holding portion.

The holding portion is of looped shape, and the finger insertion space is defined by connecting one end portion and the other end portion to the fixed portion, and the one end portion and the other end portion is displaced from each other as viewed from a direction orthogonal to the fixed surface.

The holding portion is located on the same plane as the fixed surface, and the contact surface is orthogonal to the extending direction. The first direction is to the fixed surface, and the second direction is orthogonal to the first direction and the extending direction.

The terminal storage case for protecting the mobile terminal of the present invention includes: a main body; a holding portion extending from the main body in the extending direction and pinched between fingers when the main body is held; and a contact portion having a contact surface intersecting in the extending direction and in contact with the finger when the holding portion is pinched between fingers. The contact surface has a first holding area that overlaps with the main body as viewed from the extending direction and a second holding area that fails to overlap with the main body as viewed from the extending direction. The first holding area is in contact with the finger when the holding portion is pinched by the fingers in a first direction, and the second holding area is in contact with the finger when the holding portion is pinched by the fingers in a second direction different from the first direction. The holding portion is located between the first holding areas and between the second holding areas as viewed from the extending direction. The holding portion and the contact portion fail to overlap with the main body as viewed from a direction perpendicular to the display of the mobile terminal.

The holding portion is of a string shape, and the main body is formed with a through hole through which a charger for charging the mobile terminal is inserted, and the holding portion is inserted into the through hole to form a loop. The holding portion is detachably fixed to the main body by passing the contact portion and holding portion through the loop.

Advantageous Effects of Invention

With this configuration, since the finger insertion space fails to overlap with the fixed portion as viewed from a direction perpendicular to the fixed surface, the holding portion is configured to be placed at the peripheral portion of the mobile terminal without the interference with the fixed portion. The terminal holder is configured to be placed at an arbitrary position compared with the conventional terminal holder, which enhances a freedom in holding the terminal device. In other words, the terminal holder is configured to be disposed at the peripheral portion of the mobile terminal. For example, the mobile holder is configured to be disposed at a position so as not to overlap with the mobile terminal and so as to protrude from the mobile terminal as viewed from the direction perpendicular to the fixed surface. In addition, the finger can be easily inserted without the interference with the fixed portion when inserting the finger into the finger insertion space.

With this configuration, since the finger insertion space and the fixed surface are substantially parallel to each other, the holding portion is configured to be placed at the peripheral portion of the mobile terminal without the interference with the fixed portion. This configuration enhances a freedom of retention compared with the conventional mobile terminal holder. Since the little finger is inserted into the finger insertion space, the user can hold the mobile terminal by inserting only the little finger into the finger insertion space. If the user wishes to perform other tasks while holding the mobile terminal, the user releases the grasp of the mobile terminal and rotate the mobile terminal around the holding portion so as to be away from the palm while hanging the mobile terminal. Thus, the mobile terminal is away from the palm and the user can freely perform other tasks, such as picking up necessary items from the bag, while hanging the mobile terminal with the little finger. In addition, since only the little finger is used to hold the mobile terminal, the other fingers can be used relatively freely. Thus, the mobile terminal is held stably while taking selfies with a camera provided in the mobile terminal, as well as taking pictures using other fingers other than the little finger without blurring. Furthermore, since the finger inserted into the finger insertion space is the little finger, the mobile terminal is held at an angle such that the little finger supports a lower portion and the other fingers support the main body. Thus, the mobile terminal is stably held by the palm and the other fingers under its own weight. In conventional terminal cases, a ring portion is provided at the approximate center of gravity and the mobile terminal tends to be wobbled around the ring portion. In contrast, according to the present invention, by inserting the little finger into the finger insertion space, the lower portion of the mobile terminal is supported by the little finger while the weight of the mobile terminal is received by the other fingers. Therefore, the mobile terminal can be held stably.

When operated by the thumb and the index finger, user's attention is drawn to the abdomen, while when operated by the medicinal and little fingers, user's attention is drawn to the back. The middle finger is the central finger, and manipulation with the middle finger directs the attention to both the abdomen and the back. This is based on a theory discovered by the inventor that the muscles of the thumb and the index finger are in connection with the muscles of the abdomen, the muscles of the medicinal and little fingers are in connection with the muscles of the back, and the muscles of the middle finger are in connection with the muscles of the abdomen and back. The user holds the conventional terminal case with the index finger or the middle finger, and as a result, the user tends to have negative consciousness because the awareness is mainly directed to the abdomen and less directed to the back, and the user's back tends to be bent inwardly. In the present invention, since the mobile terminal is held by the little finger, the movement of the mobile terminal is naturally centered on the little finger. As a result, the awareness is directed from the shoulders to the back, and the mobile terminal is moved while using the muscles of the arms, the shoulders and the back, instead of using only the wrists. The user can operate the mobile terminal with a good posture in stretching the back muscles as the awareness is directed to the back. In addition, an outward opening force is generated at the trunk of the body by stretching the back muscles, allowing the user to have positive and outward thought instead of inward thought. Here, the inward thought means to become self-reflective, such as looking back on the past by shutting out information from the outside, while the outward thought means to take in information from the outside by raising user's vision and to think positively about the future. Using the mobile terminal of the present invention provides outward thought to the user.

With this configuration, since the holding portion is twisted in the predetermined direction from one end portion to the finger support portion and twisted again in the predetermined direction from the finger support portion to the other end portion, the little finger inserted into the finger insertion space is supported by a flat-plate shaped plane. As a result, even when the mobile terminal is hung on the little finger inserted in the finger insertion space, the plane contacts the little finger and thus the load on the little finger can be reduced. Since the holding portion is of an abbreviated flat shape and is twisted once in the predetermined direction and once again in the predetermined direction, the terminal holder can be made by arranging the fixed portion divided into two parts and the holding portion on the same plane and combining the divided fixed portions, which can fabricate the terminal holder in a simple method.

With this configuration, since the finger support portion is wider than the one end portion and the other end portion of the holding portion, the load on the little finger can be reduced by contacting the plane to the little finger even when the mobile terminal is hung on the little finger inserted in the finger insertion space. In addition, since a notch is formed at a connection between the holding portion and the fixed portion, the fixed portion is configured to be restrained from peeling off from the mobile terminal even if a strong load is applied to the holding portion while the fixed portion is attached to the mobile terminal. In other words, because the notch is formed so that the load is not concentrated on the connection between the fixed portion and the holding portion, the fixed portion is difficult to peel off from the mobile terminal.

With this configuration, the direction of inserting the finger into the finger insertion space is the same as the direction in which the little finger is directed upon holding the mobile terminal, because the direction of inserting the finger into the finger insertion space is roughly parallel to the fixed surface. The little finger can be inserted into the finger insertion space naturally without twisting the holding portion, and the mobile terminal or terminal case can be held stably.

With this configuration, since the first fixed portion is fitted with the fitting hole of the second fixed portion, the fixed portion has smooth surface without any unevenness by overlapping the first and second fixed portions to form the terminal holder. This makes it possible to realize the terminal holder that looks good in appearance.

With this configuration, the first holding area is in contact with the finger upon pinching the pinched portion with the finger extending in the first direction, and the second holding area is in contact with the finger upon pinching the pinched portion with the finger extending in the second direction, enabling the mobile terminal or the terminal case to be held in a variety of ways. In addition, since the finger and the holding portion are in contact with each other upon holding the pinched portion, the finger can be prevented from falling out from the pinched portion by the holding portion. As a result, the mobile terminal or the terminal case can be held without dropping. Furthermore, the mobile terminal or the terminal case can be held comfortably owing to the flexibility of the pinched portion without the load of the fingers even when the pinched portion is held in various directions. Since the pinched portion is located between the first and second holding areas, the two pinched fingers contact the holding surface when the pinched portion is held between the fingers, which can hold the mobile terminal or the terminal case without dropping.

With this configuration, the user can hold the mobile terminal or the terminal case in various holding methods because the holding portion is detachable with respect to the pinched portion.

With this configuration, since the fixed surface and the pinched portion are located on the same plane, the fixed portion and the pinched portion can be made by cutting out the flat material, which can make the terminal holder easily. Since the holding surface is a flat surface perpendicular to the fixed surface, the mobile terminal or the terminal case can be held even when a finger is oriented in any direction on the holding surface.

With this configuration, since the terminal holder according to any of the first to ninth inventions is provided at the lower end of the main body, the user can hold the terminal case by inserting the little finger or the medicinal finger into the finger insertion space.

With this configuration, since the pinched portion is sandwiched between the mobile terminal and the main body, the heavy mobile terminal can be held without the holding portion detaching from the main body.

With this configuration, since the finger insertion space fails to overlap with the fixed portion as viewed from the direction perpendicular to the fixed surface, the fixed portion does not become an obstacle and the holding portion is located at the edge of the periphery of the terminal case. This enhances a freedom in holding the mobile terminal compared to the conventional mobile terminal holding device. In addition, the finger can be easily inserted into the finger insertion space without the interference with the fixed portion. Since the holding portion is sandwiched between the mobile terminal and the terminal case, the holding portion is hard to be detached from the terminal case even if a load is applied to the holding portion. Since the holding portion protrudes downwardly from the lower portion of the terminal case, the little finger can be inserted into the finger insertion space to hold the terminal case. If the user wish to perform other tasks while holding the terminal case, the user releases the grasp of the terminal case, rotates the terminal case around the holding portion, and separates the terminal case from the palm while holding the terminal case. As the mobile terminal is no longer present in the palm, the user can freely perform other tasks, such as picking up necessary items from the bag, while holding the mobile terminal with the little finger. In addition, since only the little finger is used to hold the terminal case, the other fingers can be used relatively freely.

With this configuration, when the little finger is inserted into the finger insertion space to hold the main body, the lower end of the main body serves as the fulcrum, thus allowing the terminal case to be held stably. For example, if the fulcrum is located above the lower portion of the terminal case, the fulcrum is close to the center of gravity of the mobile terminal and thus the terminal case is unstable. However, since the fulcrum is located at the lower portion, i.e., at a position most remote from the center of gravity of the mobile terminal, and thus the terminal case can be held stably.

With this configuration, since the first fixed portion, the second fixed portion and the holding portion are located in the same plane, the terminal holder is made in a simple method. Specifically, the user fixes the first fixed portion and the second fixed portion to the mobile terminal such that they are both in close to each other, resulting in a terminal holder.

With this configuration, the connection between the one end portion and the first fixed portion is displaced from the center line of the first fixed portion and the connection between the other end portion and the second fixed portion is displaced from the center line of the second fixed portion, so that the cross-sectional area of the finger insertion space is configured to be changed when the terminal holder is fixed to the mobile terminal. Specifically, if the terminal holder is produced by rotating the first and second fixed portions, the finger insertion space has large cross-sectional area because the connection between the one end portion and the first fixed portion and the connection between the other end portion and the second fixed portion are displaced downwardly. Conversely, if the terminal holder is produced by rotating the first and second fixed portions, the cross-sectional area of the finger insertion space becomes small. This can adjust the cross-sectional area of the finger insertion space with one terminal holder.

BRIEF DESCRIPTION OF DRAWINGS

FIG. 1 A perspective view of a terminal holder according to the first embodiment of the present invention.

FIG. 2 A rear perspective view of the terminal holder fixed to the mobile terminal according to the first embodiment of the present invention.

FIG. 3 A rear view of the terminal holder fixed to the mobile terminal according to the first embodiment of the present invention.

FIGS. 4A-4C Schematic views illustrating a method for fabricating the terminal holder according to the first embodiment of the present invention, wherein FIG. 4A is a development view of the terminal holder, FIG. 4B is a plan view when the terminal holder is temporarily assembled, and FIG. 4C is a plan view when the terminal holder is complexly fabricated.

FIG. 5 A perspective view of the terminal holder when a little finger is inserted into a holding portion of the terminal holder to hold a terminal case according to the first embodiment of the present invention.

FIG. 6 A perspective view of the terminal holder when the terminal case is released from the hand while the little finger is inserted into the holding portion of the terminal case according to the first embodiment of the present invention.

FIG. 7 A front perspective view of the terminal case according to a second embodiment of the present invention.

FIG. 8 A partial cross-sectional view of the terminal case in the vicinity of the terminal holder according to the second embodiment of the present invention.

FIG. 9 A perspective view of the terminal holder according to a third embodiment of the present invention.

FIG. 10 A rear perspective view of the terminal holder fixed to the mobile terminal according to the third embodiment of the present invention.

FIGS. 11A-11C Schematic views illustrating a method for fabricating the terminal holder according to the third embodiment of the present invention, wherein FIG. 11A is a development view of the terminal holder, FIG. 11B is a plan view when the terminal holder is temporarily assembled, and FIG. 11C is a plan view when the terminal holder is completely fabricated.

FIGS. 12A-12C Schematic views illustrating a method for fabricating the terminal holder according to a fourth embodiment of the present invention, wherein FIG. 12A is a development view of the terminal holder, FIG. 12B is a plan view when the terminal holder is temporarily assembled, and FIG. 12C is a plan view when the terminal holder is completely fabricated.

FIGS. 13A and 13B Views of the terminal holder according to a fifth embodiment of the present invention, wherein FIG. 13A is a perspective view of the terminal holder, and FIG. 13B is a plan view of the terminal holder.

FIG. 14 A rear perspective view of the terminal holder fixed to the mobile terminal according to the fifth embodiment of the present invention.

FIG. 15 A rear view of the terminal holder held in place such that a fixed portion and the finger are parallel according to the fifth embodiment of the present invention.

FIG. 16 A rear view of the terminal holder held in place such that the fixed portion and the finger are perpendicular to each other according to the fifth embodiment of the present invention.

FIG. 17 A perspective view of the terminal holder when a pinched portion of the terminal holder is pinched between the medicinal finger and the little finger according to the fifth embodiment of the present invention.

FIG. 18 A perspective view of the terminal holder when the mobile terminal is released from the hand while the pinched portion of the terminal holder is pinched between the medicinal finger and the little finger according to the fifth embodiment of the present invention.

FIG. 19 A perspective view of the terminal holder according to a sixth embodiment of the present invention.

FIG. 20 A rear perspective view of the terminal holder fixed to the mobile terminal according to the sixth embodiment of the present invention.

FIG. 21 A perspective view of the terminal case held when the little finger is inserted into the finger insertion space of the terminal holder to hold the terminal case according to the sixth embodiment of the present invention.

FIG. 22 A perspective view of the terminal case when the terminal case is released from the hand while the little finger is inserted into the finger insertion space according to the sixth embodiment of the present invention.

FIG. 23 A perspective view of the terminal holder according to a seventh embodiment of the present invention.

FIG. 24 A perspective view of the terminal case according to an eighth embodiment of the present invention.

FIG. 25 A perspective view of the terminal holder according to a ninth embodiment of the present invention.

FIGS. 26A and 26B Views A view of the terminal holder according to the ninth embodiment of the present invention, wherein FIG. 26A is a plan view of the terminal holder and FIG. 26B is a rear view of the terminal holder.

FIG. 27 A rear perspective view of the terminal case according to a tenth embodiment of the present invention.

FIG. 28 A front perspective view of the terminal case according to the tenth embodiment of the present invention.

FIG. 29 A rear view of the terminal case held in place such that a display of the mobile terminal and the finger are parallel according to the tenth embodiment of the present invention.

FIG. 30 A rear view of the terminal case held in place such that the display of the mobile terminal and the finger are perpendicular to each other according to the tenth embodiment of the present invention.

FIG. 31 A rear perspective view of the terminal case when the holding portion is in a used state according to an eleventh embodiment of the present invention.

FIG. 32 A rear perspective view of the terminal case when the holding portion is in a retracted state according to the eleventh embodiment of the present invention.

FIG. 33 A front perspective view of the terminal case when the holding portion is in the used state according to the eleventh embodiment of the present invention.

FIG. 34 A perspective view of the terminal case when the little finger is inserted into the holding portion according to the eleventh embodiment of the present invention.

FIG. 35 A perspective view of the terminal case when the terminal case is released from the hand while the little finger is inserted into the holding portion according to the eleventh embodiment of the present invention.

FIG. 36 A partial cross-sectional view of the vicinity of the holding portion of the terminal case according to the eleventh embodiment of the present invention.

FIG. 37 A rear perspective view of the terminal case when the holding portion is in the used state according to a twelfth embodiment of the present invention.

FIG. 38 A rear perspective view of the terminal case when the holding portion is in the retracted state according to the twelfth embodiment of the present invention.

FIG. 39 A rear perspective view of the terminal case when the holding portion is in the used state according to a thirteenth embodiment of the present invention.

FIG. 40 A rear perspective view of the terminal case when the holding portion is in the retracted state according to the thirteenth embodiment of the present invention.

FIG. 41 A front perspective view of the terminal case when the holding portion is in the used state according to the thirteenth embodiment of the present invention.

FIG. 42 A rear perspective view of the terminal case when the holding portion is in the used state according to a fourteenth embodiment of the present invention.

FIG. 43 A front perspective view of the terminal case when the holding portion is in the used state according to the fourteenth embodiment of the present invention.

FIG. 44 A rear perspective view of the terminal case when the holding portion is in the used state according to a fifteenth embodiment of the present invention.

FIG. 45 A rear perspective view of the terminal case when the holding portion is in the used state according to a sixteenth embodiment of the present invention.

FIG. 46 A perspective view of the terminal case when the medicinal finger is inserted into the holding portion according to a seventeenth embodiment of the present invention.

FIG. 47 A rear perspective view of the terminal case in which the holding portion is mounted according to an eighteenth embodiment of the present invention.

FIG. 48 A rear perspective view of the terminal case in which an alternative holding portion is mounted according to the eighteenth embodiment of the present invention

DESCRIPTION OF EMBODIMENTS

Form for Implementing the Invention

The terminal holder 1 according to the first embodiment of the present invention will be described based on FIGS. 1 to 6. As shown in the figures, the front, rear, top, bottom, left and right directions are defined.

The terminal holder 1 is attached to a mobile terminal 10 having a display 10A (FIG. 5) representing various information and includes a fixed portion 2 and a holding portion 3. The mobile terminal 10 is a smartphone or a tablet, but is not limited to them, provided that a terminal is configured to display information. The fixed portion 2 and the holding portion 3 are integrally composed of a smooth material consisting of three layers of rubber layer, a glass fiber layer and a silicon layer.

The fixed portion 2 has a first fixed portion 21, a second fixed portion 22, and a surface member 23 (FIG. 1), as shown in FIG. 4A. The connection between the fixed portion 2 and the holding portion 3 is formed with notches 2a in a direction parallel to an extending direction in which the holding portion 3 extends from the fixed portion 2. The notches 2a are formed at four locations aligned in the left and right direction to prevent the fixed portion 2 from peeling off from the mobile terminal 10 even when the holding portion 3 moves intensively with respect to the fixed portion 2. In the present embodiment, the notch 2a has a depth of 2 mm, but is not limited to this configuration and can be set arbitrarily depending on the shape of the terminal holder 1. The notch 2a may be omitted in the fixed portion 2.

The first and second fixed portions 21 and 22 are substantially the same shape and have roughly rectangular shape with chamfered corners. The first and second fixed portions 21 and 22 are provided with an adhesive at the bottom surface thereof to be fixed to the back of the mobile terminal 10. In the present embodiment, the first and second fixed portions 22 and 23 have a height of 29 mm in the vertical direction and a length of 40 mm in the horizontal direction in FIG. 4A, but are not limited thereto and can be arbitrarily selected in any shape depending on the size of the mobile terminal 10. The bottom surface of the first and second fixed portions 21 and 22 corresponds to the fixed surface of the present invention. The surface member 23 covers the upper surface of the first and second fixed portions 21 and 22 with an unshown illustration or the like printed thereon. By printing an advertisement or the like of a company on the surface member 23, the terminal holder 1 can be used as a promotional item.

The holding portion 3 has a one end portion 31 connected to the first fixed portion 21, a finger support portion 32 connected to the one end portion 31, and the other end portion 33 connected to the second fixed portion 22 and to the finger support portion 32. In other words, the finger support portion 32 connects the one end portion 31 to the other end portion 33 in the developmental view shown in FIG. 4A in the left-right direction. The holding portion 3 has a linearly symmetrical shape with respect to the center line B in the center of the left-right direction, and one end portion 31 and the other end portion 33 are approximately the same shape. The connection between the one end portion 31 and the first fixed portion 21 and the connection between the finger support portion 32 and the second fixed portion 22 extend slightly in the vertical direction. The holding portion gradually widens in the vertical direction from the one end portion 31 to the finger support portion 32, has a predetermined width in the vertical direction at the finger support portion 32, and gradually narrows in the vertical direction from the finger support portion 32 to the other end portion 33. The notches 2a of the fixed portion 2 are formed at both ends of the connection between the first fixed portion 21 and the one end portion 31 and at both ends of the connection between the second fixed portion 22 and the other end portion 33 in the vertical direction. The left-right direction corresponds to the connecting direction of the present invention.

As shown in FIG. 4A, the holding portion 3 is located downwardly from the center of the vertical direction with respect to the first and second fixed portions 21 and 22. In other words, the center line C extending in the lateral direction of the holding portion 3 is located at a position lower than the center line I extending in the lateral direction of the first and second fixed portions 21 and 22. That is, the connection between the one end portion 31 and the first fixed portion 21 and the connection between the other end portion 33 and the second fixed portion 22 are displaced downwardly from the center line extending in the left-right direction in the fixed portion 2.

The finger support portion 32 supports a finger when the terminal holder 1 is fixed to the mobile terminal 10, and is thus wider in the vertical direction than the one end portion 31 and the finger support portion 32. In the space enclosed by the holding portion 3 and the fixed portion 2, a finger insertion space 3a is defined in which a little finger 15 of the user is inserted when the terminal holder 1 is fixed to the mobile terminal 10, as shown in the diagonal line of FIGS. 1 to 3. In detail, as shown in FIG. 3, the finger insertion space 3a is formed at a position such that the finger insertion space 3a fails to overlap with the fixed portion 2 as viewed from front-rear direction orthogonal to the fixed portion 2. In other words, the finger insertion space 3a is defined as a plane demarcated by the inner side 3A of the holding portion 3 and the fixed portion 2, and the finger insertion space 3a is roughly parallel to the bottom surface of the fixed portion 2 (the display 10A of the mobile terminal 10). By protruding the finger insertion space 3a from the fixed portion 2, the finger insertion space 3a is formed at a position where the finger insertion space 3a is displaced from the fixed portion 2. Furthermore, the bottom surface of the fixed portion 2 and the surface demarcated by the fixed portion 2 and the holding portion 3 (the finger insertion space 3a) are abbreviatedly parallel to each other.

The finger insertion space 3a has an area sufficient to allow insertion of the little finger 15 and is of substantially oval shape. In the present embodiment, in the state shown in FIG. 4A, the vertical width of the one end portion 31 and the other end portion 33 is of 4.5 mm, the vertical width at the finger support portion 32 is of 9 mm, and the length of the holding portion 3 in the left-right direction is of 65 mm, but the holding portion 3 is not limited to this configuration and any shape can be employed depending on the size of the mobile terminal 10.

The attachment of the terminal holder 1 to the mobile terminal 10 will be described with reference to FIGS. 2 and 3. In the terminal holder 1, the fixed portion 2 is attached to the lower end center of the mobile terminal 10 in the left-right direction so that the holding portion 3 protrudes downwardly. As shown in FIG. 3, the terminal holder 1 is desirably attached at a position such that the finger insertion space 3a fails to overlap with the mobile terminal 10 as viewed from a direction orthogonal to the bottom of the fixed portion 2 (front-rear direction).

Next, the fabricating method of the terminal holder 1 will be described with reference to FIGS. 4A-4C. As shown in FIG. 4A, in the pre-assembled state of the terminal holder 1, the first fixed portion 21, the second fixed portion 22, and the holding portion 3 form a flat plane shape. From this state, the upper end surface of the first fixed portion 21 and the upper end surface of the second fixed portion 22 are joined as shown by arrow E so that the inner side 3A is positioned inwardly as shown in the state of FIG. 4B. At this time, the holding portion 3 is twisted at 90° in a predetermined direction at the connection between the one end portion 31 and the finger support portion 32, and twisted again at 90° in the predetermined direction at the connection between the finger support portion 32 and the other end portion 33. The predetermined direction here means the clockwise direction as viewed from below. In detail, the near side plane of the paper surface of the holding portion 3 in FIG. 4A is facing the near side of the paper surface at the one end portion 31, upwardly at the finger support section 32, and again the near side at the other end portion 33 in the state shown in FIG. 4B From the state shown in FIG. 4B, the surface member 23 is attached to the upper surface of the first fixed portion 21 and the second fixed portion 22 to make the connection between the first fixed portion 21 and the second fixed portion 22 less noticeable. At this time, an advertisement or the like may be printed on the surface member 23. The terminal holder 1 has been made as shown in FIG. 4C. The terminal holder 1 may be made by rotating the first fixed portion 21 and the second fixed portion 22 in the direction indicated by the arrow F in FIG. 4A. In this case, the lower side of the holding portion 3 is defined as the inner side 3B. Since the center line C of the holding portion 3 is located lower than the center line I of the fixed portion 2, the distance between the one end portion 31 and the other end portion 33 in the lateral direction is shortened by rotating them in the direction indicated by the arrow F, and the area of the finger insertion space 3a is thus reduced compared to FIG. 4B. In other words, the area of the finger insertion space 3a is configured to be adjusted by shifting the center line C of the holding portion 3 with respect to the center line I of the fixed portion 2 upward or downward. In the present embodiment, the vertical distance between the upper end of the first and second fixed portions 21 and 22 and the center line C is of 17 mm, and the distance between the lower end of the first and second fixed portions 21 and 22 and the center line C is of 12 mm, but this is not limited to this configuration, and any shape can be arbitrarily employed depending on the area of the finger insertion space 3a.

Next, the method for holding the mobile terminal 10 by the terminal holder 1 will be described with reference to FIGS. 5 and 6. The user holds the terminal holder 1 with the thumb 11, the index finger 12, the middle finger 13, and the medicinal finger 14, and inserts only the little finger 15 into the finger insertion space 3a. As shown in FIG. 5, the user supports the back of the mobile terminal 10 by the index finger 12, the middle finger 13, and the medicinal finger 14, inserts the little finger 15 into the finger insertion space 3a, and operates the display 10A of the mobile terminal 10 with the thumb 11. The center of gravity G in the mobile terminal 10 is generated downward from the center of the mobile terminal 10, so that the mobile terminal 10 can be held stably with the index finger 12, the middle finger 13, and the medicinal finger 14. In other words, since the mobile terminal 10 is held by the little finger 15 at a fulcrum S away from the center of gravity G, the mobile terminal 10 can be held stably using its own weight by supporting the same with a plurality of fingers near the center of gravity G. Here, the fulcrum S is a point at which the terminal holder 1 supports the mobile terminal 10 and is located at the lower end of the mobile terminal 10.

If the user desires to perform other tasks while holding the mobile terminal 10, the user removes the index finger 12, the middle finger 13, and the medicinal finger 14, which support the back of the mobile terminal 10, from the mobile terminal 10, and then the mobile terminal 10 rotates in a counterclockwise direction around the little finger 15 (fulcrum S) under its own weight, as shown in FIG. 6. This allows the user to perform other tasks with fingers other than the little finger 15 without removing the mobile terminal 10 from the hand. When operating the mobile terminal 10 again, the user can use the recoil or use the other hand to rotate the mobile terminal 10 in the clockwise direction around the little finger 15 (fulcrum S) again as shown in FIG. 5.

With this configuration, since the finger insertion space 3a fails to overlap with the fixed portion 2 as viewed from the front-rear direction perpendicular to the fixed surface, the holding portion 3 is configured to be placed at the peripheral portion of the mobile terminal 10 without the interference with the fixed portion 2. The terminal holder 1 can be placed at an arbitrary position compared with the conventional terminal holder, which enhances a freedom in holding the mobile terminal 10. In other words, the terminal holder 1 is configured to be disposed at the peripheral portion of the mobile terminal 10. For example, the holding portion 3 is configured to be disposed at a position so as not to overlap with the mobile terminal 10 and so as to protrude from the mobile terminal 10 as viewed from the front-rear direction perpendicular to the fixed surface. In addition, the finger can be easily inserted without the interference with the fixed portion 2 when inserting the finger into the finger insertion space 3a.

With this configuration, since the finger insertion space 3a and the fixed surface are substantially parallel to each other, the holding portion 3 is configured to be placed at the peripheral portion of the mobile terminal 10 without the interference with the fixed portion 2. This configuration enhances a freedom of retention compared with the conventional terminal holder. Since the little finger 15 is inserted into the finger insertion space 3a, the user can hold the mobile terminal 10 by inserting only the little finger 15 into the finger insertion space 3a. If the user wishes to perform other tasks while holding the mobile terminal 10, the user releases the grasp of the mobile terminal 10 and rotate the mobile terminal 10 around the holding portion 3 so as to be away from the palm while hanging the mobile terminal 10 (FIG. 6). Thus, the mobile terminal 10 is away from the palm and the user can freely perform other tasks, such as picking up necessary items from the bag, while hanging the mobile terminal 10 with the little finger 15. In addition, since only the little finger 15 is used to hold the mobile terminal 10, the other fingers can be used relatively freely. Thus, the mobile terminal 10 is held stably while taking selfies with the camera provided in the mobile terminal 10, as well as taking pictures using other fingers other than the little finger 15 without blurring. Furthermore, since the finger inserted into the finger insertion space 3a is the little fingers 15, the mobile terminal 10 is held at an angle such that the little fingers 15 supports the lower portion and the other fingers support the main body. Thus, the mobile terminal 10 is stably supported by the palm and the other fingers under its own weight. In conventional terminal cases, a ring portion is provided at the approximate center of gravity, and the mobile terminal 10 tends to be wobbled around the ring portion. In contrast, according to the present invention, by inserting the little finger 15 into the finger insertion space 3a, the lower portion of the mobile terminal 10 is supported by the little finger 15 while the weight of the mobile terminal 10 is received by other fingers. Therefore, the mobile terminal 10 can be held stably.

When operated by the thumb 11 and the index finger 12, user's attention is drawn to the abdomen, while when operated by the medicinal finger 14 and the little finger 15, user's attention is drawn to the back. The middle finger 13 is the central finger, and manipulation with the middle finger 13 directs the attention to both the abdomen and the back. This is based on a theory discovered by the inventor that the muscles of the thumb 11 and the index finger 12 are in connection with the muscles of the abdomen, the muscles of the medicinal finger 14 and little finger 15 are in connection with to the muscles of the back, and the muscles of the middle finger 13 are in connection with the muscles of the abdomen and back side. The user holds the conventional terminal case with the index finger 12 or the middle finger 13, and as a result, the user tends to have negative consciousness because awareness is mainly directed to the abdomen and less directed to the back, and the user's back tends to be bent inwardly. In the present invention, since the mobile terminal 10 is held by the little finger 15, the movement of the mobile terminal 10 is naturally centered on the little finger 15. As a result, the awareness is directed from the shoulders to the back, and the mobile terminal 10 is moved while using the muscles of the arms, the shoulders and the back, instead of using only the wrist. The user can operate the mobile terminal 10 with a good posture in starching the back muscles as the awareness is directed to the back. In addition, an outward opening force is generated at the trunk of the body by stretching the back muscles, allowing the user to have positive and outward thought instead of inward thought. Here, the inward thought means to become self-reflective, such as looking back on the past by shutting out information from the outside, while an outward thought means to take in information from the outside by raising user's vision and to think positively about the future. Using the mobile terminal 10 of the present invention provides outward thought to the user.

With this configuration, since the holding portion 3 is twisted in a predetermined direction from one end portion 31 to the finger support portion 32 and twisted again in the predetermined direction from the finger support portion 32 to the other end portion 33, the little finger 15 inserted into the finger insertion space 3a is supported by a flat-plate shaped plane. As a result, even when the mobile terminal 10 is hung on the little finger 15 inserted in the finger insertion space 3a (FIG. 6), the plane contacts the little finger 15 and thus the load on the little finger 15 can be reduced. Since the holding portion 3 is of an abbreviated flat shape and is twisted once in the predetermined direction and once again in the predetermined direction, the terminal holder 1 can be made by arranging the first fixed portion 21, the second fixed portion 22 and the holding portion 3 on the same plane and combining the first fixed portion 21 and the second fixed portion 22 (FIGS. 4A-4C), which can fabricate the terminal holder 1 in a simple method.

With this configuration, since the finger support portion 32 is wider than the one end portion 31 and the other end portion 33, the load on the little finger 15 can be reduced by contacting the plane to the little finger 15 even when the mobile terminal 10 is hung on the little finger 15 inserted in the finger insertion space 3a (FIG. 6). In addition, since the notch 2a is formed at a connection between the holding portion 3 and the fixed portion 2, the fixed portion 2 is configured to be restrained from peeling off from the mobile terminal 10 even if a strong load is applied to the holding portion 3 while the fixed portion 2 is attached to the mobile terminal 10. In other words, because the notch 2a is formed so that the load is not concentrated on the connection between the fixed portion 2 and the holding portion 3, the fixed portion 2 is difficult to peel off from the mobile terminal 10.

With this configuration, since the first fixed portion 21, the second fixed portion 22 and the holding portion 3 are located on the same plane, the terminal holder 1 is made by a simple method. Specifically, as shown in FIG. 4A, the user fixes the first fixed portion 21 and the second fixed portion 22 to the mobile terminal 10 such that they are adjacent to each other, resulting in the terminal holder 1 as shown in FIG. 4B.

With this configuration, the connection between the one end portion 31 and the first fixed portion 21 is displaced from the center line of the first fixed portion and the connection between the other end portion and the second fixed portion is displaced from the center line of the second fixed portion, so that the cross-sectional area of the finger insertion space 3a is configured to be changed when the terminal holder 1 is fixed to the mobile terminal 10. Specifically, if the terminal holder 1 shown in FIG. 4B is produced by rotating the first and second fixed portions 21 and 22 in the direction of the arrow E shown in FIG. 4A, the finger insertion space 3a has large cross-sectional area because the connection between the one end portion 31 and the first fixed portion 21 and the connection between the other end portion 33 and the second fixed portion 22 are displaced downwardly with respect to the center line I. Conversely, if the terminal holder is produced by rotating the first and second fixed portions 21 and 22 in the direction of the arrow F shown in FIG. 4A, the cross-sectional area of the finger insertion space 3a becomes small. This can adjust the cross-sectional area of the finger insertion space 3a with one terminal holder 1.

A second embodiment of the present invention will be described with reference to FIGS. 7 and 8. The same configuration as in the above-described embodiment is appended to the same numeral and explanation will be omitted. In the second embodiment, the terminal holder 1 of the first embodiment is integrally provided in the terminal case 110 for accommodating the mobile terminal 10. The terminal case 110 includes a main body 111 and the terminal holder 1.

The main body 111 is provided with the terminal holder 1 at the lower end thereof, and is formed with a camera hole 111a, a button hole 111b, and a step 111c.

The camera hole 111a is of roughly oval-shaped and is formed at a position corresponding to the camera of the mobile terminal 10. The button hole 111b is formed at an upper portion on a left side of the main body 111, and formed at a position corresponding to a button of the mobile terminal 10. The step 111c is formed at a lower portion of the main body 111 and corresponding to a speaker or a terminal connection of the mobile terminal 10.

As shown in FIG. 8, when the mobile terminal 10 is accommodated in the main body 111 of the terminal case 110, the fixed portion 2 is sandwiched between the mobile terminal 10 and the main body 111. This configuration allows the terminal holder 1 to be firmly fixed to the terminal case 110.

With this configuration, since the finger insertion space 3a fails to overlap with the fixed portion 2 as viewed from the direction perpendicular to the fixed surface, the fixed portion 2 does not become an obstacle and the holding portion 3 is configured to be located at the edge of the peripheral of the terminal case 110. This allows greater degree of freedom in holding the mobile terminal. In addition, the finger can be easily inserted into the finger insertion space 3a without the interference with the fixed portion 2. Since the fixed portion 2 is sandwiched between the mobile terminal 10 and the terminal case 110, the fixed portion 2 is not easily detached from the terminal case 110 even if a load is applied to the holding portion 3. Since the holding portion 3 protrudes downwardly from the lower end of the terminal case 110, the little finger 15 can be inserted into the finger insertion space 3a to hold the mobile terminal 10. If the user wishes to perform other tasks while holding the mobile terminal 10, the user can release the grasp of the terminal case 110, rotate the terminal case 110 around the holding portion, and separate the terminal case 110 from the palm while hanging the terminal case 110. As the mobile terminal 10 is no longer present in the palm, the user can freely perform other tasks, such as picking up necessary items from the bag, while holding the mobile terminal 10 with the little finger 15. In addition, since only the little finger 15 is used to hold the terminal case 110, the other fingers can be used relatively freely.

With this configuration, when the little finger 15 is inserted into the finger insertion space 3a to hold the main body 111, the lower end of the main body 111 serves as the fulcrum S, thus allowing the terminal case 110 to be held stably. For example, if the fulcrum S is located above the lower end of the terminal case 110, the fulcrum is close to the center of gravity of the mobile terminal 10 and the terminal case 110 is unstable. However, since the fulcrum S is located at the lower end, i.e., at a position most remote from the center of gravity of the mobile terminal 10, and thus the terminal case 110 can be held stably.

A third embodiment of the present invention will be described with reference to FIGS. 9 to 11. The same configuration as in the above-described embodiment is appended to the same numeral and explanation will be omitted.

The terminal holder 101 includes a fixed portion 102 and a holding portion 103. The fixed portion 102 and the holding portion 103 are integrally composed of a smooth material comprising three layers of a rubber layer, a glass fiber layer and a silicon layer.

The fixed portion 102 has a first fixed portion 121, a second fixed portion 122, and a surface member 123 (FIG. 9) as shown in FIG. 11A. The first fixed portion 121 is of roughly rectangular shape having a long vertical length and the second fixed portion 122 is of roughly rectangular shape having the same vertical length as the first fixed portion 121. The first and second fixed portions 121 and 122 has a bottom surface provided with an adhesive to fix the terminal holder 101 to the back of the mobile terminal 10. The bottom surface of the first and second fixed portions 121 and 122 correspond to the fixed surface of the present invention. The surface member 123 covers the upper surface of the first fixed portion 121 and the second fixed portion 122 with an unshown illustration or the like printed thereon. The terminal holder 101 can also be used as a promotional item by printing an advertisement or the like of a company on the surface member 123.

The holding portion 103 has a one end portion 131 connected to the first fixed portion 121, a finger support portion 132 connected to the one end portion 131, and the other end portion 133 connected to the second fixed portion 122 as well as to the finger support portion 132. In other words, the finger support portion 132 connects the one end portion 131 to the other end portion 133 in the left-right direction in the development view shown in FIG. 11A. The holding portion 103 has a linearly symmetrical shape with respect to the center line B in the center of the left-right direction, and the one end portion 131 and the other end portion 133 are approximately the same shape. The connection between the one end portion 131 and the first fixed portion 121 and the connection between the finger support portion 132 and the second fixed portion 122 slightly widens in the vertical direction. The holding portion 103 has a vertical length gradually spreading in the vertical direction from the one end portion 131 to the finger support portion 132, having a vertical predetermined length at the finger support portion 132, and gradually narrowing from the finger support portion 132 to the other end portion 133. The left-right direction corresponds to the connecting direction of the present invention.

The finger support portion 132 supports a finger when the terminal holder 101 is fixed to the mobile terminal 10, and therefore the finger support portion 132 is vertically wider than the one end portion 131 and the finger support portion 132. In the space surrounded by the one end portion 131, the finger support portion 132, and the other end portion 133, a finger insertion space 103a is defined into which the little finger 15 of the user is inserted when the terminal holder 101 is fixed to the mobile terminal 10, as shown in the diagonal line of FIGS. 9 and 10. In detail, as shown in FIG. 10, the finger insertion space 103a is formed so as to insert the little finger 15 in the left-right direction, which is a direction roughly parallel to the bottom surface of the fixed portion 2. In other words, the surface into which the little finger 15 is inserted is a plane demarcated by the side 103A of the holding portion 103, and the finger insertion space 103a is a plane intersecting the bottom surface of the fixed portion 102 (the display 10A of the mobile terminal 10).

The finger insertion space 103a has an area sufficient to allow insertion of the little finger 15 and is of a liquid drop shape. The direction in which the little finger 15 is inserted into the finger insertion space 103a is in the left-right direction, which is roughly parallel to the bottom surface of the fixed portion 102. In other words, when the user inserts the little finger 15 into the finger insertion space 103a, the little finger 15 is inserted in a direction approximately the same as the left-right direction, which is the longitudinal direction of the fixed portion 102. In the present embodiment, in the state shown in FIG. 11A, the vertical length of the one end portion 131 and the other end portion 133 is of 5.5 mm, the vertical length of the finger support portion 132 is of 10 mm, and the length of the holding portion 103 in the left-right direction is of 65 mm, but this is not limited to this configuration, and any shape can be employed depending on the size of the mobile terminal 10.

The attachment of the terminal holder 101 to the mobile terminal 10 will be described with reference to FIG. 10. In the terminal holder 101, the fixed portion 102 is attached to the center lower end of the mobile terminal 10 in the left-right direction so that the holding portion 103 protrudes downwardly. The fixed portion 102 is desirably located at a position where the finger insertion space 103a fails to overlap with the mobile terminal 10 as viewed from a direction orthogonal to the bottom surface of the fixed portion 102 (front-rear direction).

Next, the fabricating method of the terminal holder 101 will be described with reference to FIG. 11. As shown in FIG. 11A, the first fixed portion 121, the second fixed portion 122, and the holding portion 103 form a flat plane shape in the pre-assembled state of the terminal holder 101. From this state, the first fixed portion 121 is aligned with the left end of the second fixed portion 122 along the arrow H, so that the state of FIG. 11B is achieved. The finger insertion space 103a enclosed by the holding portion 103 is defined.

From the state shown in FIG. 11B, the connection step between the first fixed portion 121 and the second fixed portion 122 is made less noticeable by attaching the surface member 123 on the upper surface of the first fixed portion 121 and the second fixed portion 122. At this time, the advertisement or the like may be printed on the surface member 123. Thus, the terminal holder 101 is completely made as shown in FIG. 11C.

With this configuration, the direction of inserting the little finger 15 into the finger insertion space 103a is the same as the direction in which the little finger 15 is directed upon holding the mobile terminal 10, because the direction of inserting the little finger 15 into the finger insertion space 103a is parallel to the bottom surface of the fixed portion 102. The little finger 15 can be inserted into the finger insertion space 103a naturally without twisting the holding portion 103, and the mobile terminal 10 or the terminal case 110 can be held stably.

A fourth embodiment of the present invention will be described with reference to FIGS. 12A-12C. The same configuration as in the above-described embodiment is appended to the same numeral and explanation will be omitted.

The terminal holder 201 includes a fixed portion 202 and a holding portion 203. The fixed portion 202 and the holding portion 203 are integrally composed of a smooth material comprising three layers of a rubber layer, a glass fiber layer and a silicon layer.

The fixed portion 202 includes a first fixed portion 221, a second fixed portion 222, and a surface member 223 as shown in FIGS. 12A-12C. The first fixed portion 221 is of roughly rectangular shape having a long vertical length and the second fixed portion 222 is of roughly rectangular shape having longer vertical and lateral lengths than the first fixed portion 221. The second fixed portion 222 is formed with a fitting hole 222a having the same shape as the first fixed portion 221. The first fixed portion 221 has a surface provided with an adhesive and the second fixed portion 222 has a bottom surface provided with an adhesive to fix the terminal holder 201 to the back of the mobile terminal 10. The surface of the first fixed portion 221 and the bottom surface of the second fixed portion 222 correspond to the fixed surfaces of the present invention. The surface member 223 covers the upper surface of the first fixed portion 221 and the second fixed portion 222 with an unshown illustration or the like printed thereon. The terminal holder 201 can be used as a promotional item by printing an advertisement or the like of a company on the surface member 223.

The holding portion 203 has a one end portion 231 connected to the first fixed portion 221, a finger support portion 232 connected to the one end portion 231, and the other end portion 233 connected to the second fixed portion 222 and the finger support portion 232. In other words, the finger support portion 232 connects the one end portion 231 and the other end portion 233 in the left-right direction in the development view shown in FIG. 12A. The one end portion 231 is narrower than the other end portion 233 in the vertical direction. The connection between the one end portion 231 and the first fixed portion 221 slightly widens in the vertical direction. The holding portion 203 has a vertical length gradually spreading in the vertical direction from the one end portion 231 to the finger support portion 232, having a predetermined length in the vertical direction at the finger support portion 232, and having almost the same length from the finger support portion 232 to the other end portion 233. The left-right direction corresponds to the connecting direction of the present invention.

The finger support portion 232 supports the finger when the terminal holder 201 is fixed to the mobile terminal 10, and therefore the finger support portion 232 is wider than the one end portion 231 in the vertical direction. In the space surrounded by the one end portion 231, the finger support portion 232, and the other end portion 233, a finger insertion space is defined into which the little finger 15 of the user is inserted when the terminal holder 201 is fixed to the mobile terminal 10. In detail, similarly to the third embodiment, the finger insertion space is formed to insert the little finger 15 in the left-right direction parallel to the bottom surface of the fixed portion 202.

Next, the fabricating method of the terminal holder 201 will be described. As shown in FIG. 12A, the first fixed portion 221, the second fixed portion 222, and the holding portion 203 form a flat plane shape in the pre-assembled state of the terminal holder 201. From this state, the first fixed portion 221 is fitted with the fitting hole 222a of the second fixed portion 222 along the arrow H, so that the state shown in FIG. 12B is achieved. The finger insertion space demarcated by the holding portion 203 is defined. Since the first and second fixed portions 221 and 222 have the same thickness, there are no steps at the boundary between the first and second fixed portions 221 and 222.

From the state shown in FIG. 12B, the connection between the first fixed portion 221 and the second fixed portion 222 is made less noticeable by attaching the surface member 223 on the upper surface of the first fixed portion 221 and the second fixed portion 222. At this time, the advertisement or the like may be printed on the surface member 223. The terminal holder 201 is completely made as shown in FIG. 12C.

With this configuration, since the first fixed portion 221 is fitted with the fitting hole 222a of the second fixed portion 222, the terminal holder 201 has smooth surface without any unevenness when the first fixed portion 221 is overlapped with the second fixed portion 222 to form the terminal holder 201. The terminal holder 201 having good appearance can be achieved.

The terminal holder 1 according to the fifth embodiment of the present invention will be described with reference to FIGS. 13A to 18. As shown in the figures, the front, rear, top, bottom, left, and right directions are defined.

The terminal holder 301 is configured to be attached to the mobile terminal 10 having the display 10A (FIG. 17) for displaying various information, and includes a fixed portion 302, a holding portion 303, and a contact portion 304. The mobile terminal 10 is a smartphone or tablet, but is not limited to a thin terminal capable of displaying information. The terminal holder 1 may be directly attached to the mobile terminal 10 or may be attached to the terminal case 100 (FIG. 24) for accommodating the mobile terminal 10.

The fixed portion 302 and the holding portion 303 are composed of flexible material and may be made of any material such as cloth, synthetic fibers, leather, artificial leather, resin, or the like. As shown in FIG. 15, the fixed portion 302 has a bottom surface provided with a fixed surface 302A fixed to the mobile terminal 10 or the terminal case 100. The fixed surface 302A is provided with an adhesive tape to be fixed to the mobile terminal 10 or the terminal case 100. The fixed portion 302 is of a short rectangular shape with chamfered corners and is integrally formed with the holding portion 303. The fixed portion 302 and the holding portion 303 may be separately formed.

The holding portion 303 is located on the same plane as the fixed portion 302 and extends downwardly from the center lower end of the fixed portion 302 in the left-right direction and fails to overlap the fixed portion 302 as viewed from the front-rear direction (in the direction orthogonal to the paper surface) as shown in FIG. 13B. The holding portion 303 is of roughly flat shape having a width in the left-right direction, and is provided with the contact portion 304 at its lower end (tip). The length from the connection between the holding portion 303 and the fixed portion 302 to the contact portion 304 is preferably about one finger as shown in FIG. 17. This length can be arbitrarily set according to the size of the terminal holder 301. The holding portion 303 is held by the medicinal finger 14 and the little finger 15 when the user holds the terminal holder 301 as shown in FIGS. 15 to 18.

The contact portion 304 is of roughly thin circular shape, and has a center portion to which the end of the holding portion 303 is fixed as shown in FIG. 15. The contact portion 304 may be made of a hard resin, a metal or the like. The contact portion 304 has a contact surface 341 perpendicular to the vertical direction which is the extending direction of the holding portion 303. In other words, the contact surface 341 is an upper surface of the contact portion 304. As shown in FIG. 17, the contact surface 341 is brought into contact with the medicinal finger 14 and the little finger 15 when the user holds the terminal holder 301.

The contact surface 341 has a first holding area 341A and a second holding area 341B as shown in FIGS. 15 and 16. In FIGS. 15 and 16, the positions of the medicinal finger 14 and the little finger 15 when the fixed portion 302 is held are shown by a chain line. The first holding area 341A is a region located on both sides in the left-right direction with respect to the holding portion 303 as viewed from the rear of the terminal holder 301. As shown by the dotted line in the figure, the fixed portion 302 has middle portion in the front-rear direction overlapped with the fixed portion 302. In other words, the first holding area 341A has a region where the medicinal finger 14 and the little finger 15 come into contact with the contact surface 341 when the holding portion 303 is pinched in the left-right direction so as to extend the medicinal finger 14 and the little finger 15 in the front-rear direction as shown in FIG. 16. In other words, the holding portion 303 is positioned between the first holding areas 341A in the left-right direction. The holding portion 303 is compressed by the medicinal finger 14 and the little finger 15 in the left-right direction due to its flexibility. The front-rear direction corresponds to the first direction of the invention. The first direction is not limited to the front-rear direction, and even when the medicinal finger 14 and the little finger 15 are inclined in the left-right direction from the state shown in FIG. 16, these directions are included in the first direction, provided that the medicinal finger 14 and the little finger 15 are in contact with the first holding area 341A.

The second holding area 341B is a region located on both sides in the front-rear direction with respect to the holding portion 303 and fails to overlap with the fixed portion 302 as viewed from the rear of the terminal holder 301. In other words, the second holding area 341B has a region where the medicinal finger 14 and the little finger 15 come into contact with the contact surface 341 when the holding portion 303 is pinched in the front-rear direction so as to extend the medicinal finger 14 and the little finger 15 in the left-right direction as shown in FIG. 15. In other words, the holding portion 303 is positioned between the second holding area 341B in the front-rear direction. The left-right direction corresponds to the second direction of the present invention. The second direction is not limited to the left-right direction, and even when the medicinal finger 14 and the little finger 15 are inclined in the front-rear direction from the state shown in FIG. 15, these directions are included in said second direction, provided that the medicinal finger 14 and the little finger 15 are in contact with the second holding area 341B.

The terminal holder 301 is fixed at a position such that the lower end of the mobile terminal 10 is roughly aligned with the lower end of the fixed portion 302 to extend the holding portion 303 from the mobile terminal 10 upon the attachment to the mobile terminal 10, as shown in FIG. 14. The attachment position of the terminal holder 301 is not limited thereto, and user can attach the terminal holder 301 at a desired location. However, the holding portion 303 is preferably pinched between the medicinal finger 14 (FIG. 15) and the little finger 15 in the terminal holder 301. The terminal holder 301 is preferably attached to the bottom area of the mobile terminal 10, e.g., to the lowest region when the mobile terminal 10 is divided evenly into three regions in the vertical direction. The terminal holder 301 may be attached to the terminal case for holding the mobile terminal 10.

Next, the method for holding the mobile terminal 10 using the terminal holder 301 will be described with reference to FIGS. 17 and 18. The user holds the mobile terminal 10 with the thumb 11, the index finger 12, and the middle finger 13, and pinches the holding portion 303 with the medicinal finger 14 and the little finger 15 while supporting the back of the mobile terminal 10 with the medicinal finger 14. At this time, the user pinches the holding portion 303 with the medicinal finger 14 and the little finger 15 in the front-rear direction as shown in FIG. 15. As shown in FIG. 17, the back of the mobile terminal 10 is supported by the index finger 12, the middle finger 13, and the medicinal finger 14, and the holding portion 303 is pinched with the medicinal finger 14 and the little finger 15 while the medicinal finger 14 and the little finger 15 are in direct contact with the contact surface 341, thereby holding the mobile terminal 10 on the palm.

The user operates the display 10A of the mobile terminal 10 with the thumb 11. The center of gravity G of the mobile terminal 10 is generated downward from the center of the mobile terminal 10 so that the mobile terminal 10 can be held stably with the index finger 12, the middle finger 13, and the medicinal finger 14. In other words, the mobile terminal 10 is held by the medicinal finger 14 and the little finger 15 at the fulcrum S away from the center of gravity G. Therefore, the mobile terminal 10 can be held stably by its own weight by the support with a plurality of fingers near the center of gravity G. Here, the fulcrum S serves as a point at which the terminal holder 301 supports the mobile terminal 10 and is located at the lower end of the mobile terminal 10. In other words, the terminal holder 301 is attached at the lower end of the mobile terminal 10 and the terminal holder 301 is held by the medicinal finger 14 and the little finger 15 to be able to locate the fulcrum S at the lower end of the mobile terminal 10.

If the user desires to perform other tasks while holding the mobile terminal 10, the user removes the index finger 12 and the middle finger 13, which support the back of the mobile terminal 10, from the mobile terminal 10 and then mobile terminal 10 rotates in the counterclockwise direction around the medicinal finger 14 by its own weight, as shown in FIG. 18. At this time, the holding portion 303 is sandwiched between the medicinal finger 14 and the little finger 15 while the medicinal finger 14 and the little finger 15 are in contact with the contact surface 341. This allows the user to perform other tasks with fingers other than the medicinal finger 14 and the little finger 15 without removing the mobile terminal 10 from the hand. When operating the mobile terminal 10 again, the user can use the recoil or with the other hand to rotate the mobile terminal 10 in the clockwise direction around the medicinal finger 14 as shown in FIG. 17.

With this configuration, as shown in FIG. 16, the first holding area 341A contacts the medicinal finger 14 and the little finger 15 when the holding portion 303 is pinched by the medicinal finger 14 and the little finger 15 extending in the front-rear direction, as shown in FIG. 16. The second holding area 341B contacts the medicinal finger 14 and little finger 15 when the holding portion 303 is pinched by the medicinal finger 14 and the little finger 15 extending in the left-right direction, as shown in FIG. 15. Thus, the mobile terminal 10 or the terminal case 100 is configured to be held in a variety of ways. In addition, since the medicinal finger 14 and the little finger 15 are in contact with the contact portion 304 when the holding portion 303 is pinched in place, the contact portion 304 prevents the medicinal finger 14 and the little finger 15 from falling out from the holding portion 303. As a result, the mobile terminal 10 or the terminal case 100 is held without dropping. Furthermore, the mobile terminal 10 or the terminal case 100 can be held comfortably owing to the flexibility of the holding portion 303 without straining the fingers even when the holding portion 303 is pinched from various directions. Since the holding portion 303 and the contact portion 304 fail to overlap with the fixed portion 302 as viewed from the front-rear direction perpendicular to the fixed surface 302A, the holding portion 303 and the contact portion 304 can be positioned at the peripheral portion of the mobile terminal 10 without the interference with the fixed portion 302. The terminal holder 301 can be disposed at an arbitrary position compared to the conventional terminal holder, which enhances a freedom of retention. In other words, the terminal holder 301 can be disposed at a peripheral portion of the mobile terminal 10 or the terminal case 100. For example, the holding portion 303 and the contact portion 304 can be disposed at a position so as not to overlap with the mobile terminal 10 and so as to protrude from the mobile terminal 10 as viewed from a direction orthogonal to the fixed surface 302A. Furthermore, since the holding portion 303 is located between the first holding area 341A and the second holding area 341B, the two pinched fingers contact the contact surface 341 upon pinching the holding portion 303. The mobile terminal 10 or the terminal case 100 can be held without dropping the same.

With this configuration, since the fixed surface 302A and the holding portion 303 are located on the same plane, the fixed portion 302 and the holding portion 303 are configured to be made by cutting out the flat material. Thus, the terminal holder 301 can be made easily. Since the contact surface 341 is a flat surface orthogonal to the fixed surface 302A, the mobile terminal 10 or the terminal case 100 can be held even if the fingers are oriented in any direction on the contact surface 341.

A sixth embodiment of the present invention will be described with reference to FIGS. 19 to 22. A terminal holder 401 includes the fixed portion 302, a holding portion 403, and the contact portion 304. The same configuration as in the above-described embodiment is appended to the same numeral and explanation will be omitted.

The holding portion 403 includes a first holding portion 403A and a second holding portion 403B. The first holding portion 403A has an upper end extending downwardly at the front side of the center lower end of the fixed portion 302 in the lateral direction and the lower end fixed to the contact portion 304. The second holding portion 403B has an upper end extending downwardly at the rear side of the center lower end of the fixed portion 302 in the lateral direction and the lower end fixed to the contact portion 304 at a distance forward from the lower end of the first holding portion 403A. Similarly to the first embodiment, the holding portion 403 fails to overlap with the fixed portion 302 as viewed from the front-rear direction (direction perpendicular to the paper). The first holding portion 403A overlaps with the second holding portion 403B as viewed from the front-rear direction.

The first and second holding portions 403A and 403B are of roughly flat plate shape having a width in the left-right direction and has a lower end (tip) provided with the contact portion 304. The first holding portion 403A, the second holding portion 403B, and the contact portion 304 forms a finger insertion space 403*a* into which the medicinal finger 14 or the little finger 15 is inserted in the right-left direction as shown in the diagonal line of FIGS. 19 and 20. In other words, the space surrounded by the first holding portion 403A, the second holding portion 403B, and the contact portion 304 is defined as the finger insertion space 403*a*.

The terminal holder 401 is attached to the mobile terminal 10 such that the lower end of the mobile terminal 10 is roughly aligned with the lower end of the fixed portion 302, and the holding portion 403 extends from the mobile terminal 10 as shown in FIG. 20. The terminal holder 401 can be attached at a desired location of the user. However, the medicinal finger 14 or the little finger 15 is preferably inserted into the finger insertion space 403*a* in the terminal holder 401. The terminal holder 401 is preferably attached to the lower portion of the mobile terminal 10, specifically to the lower region of three regions into which the mobile terminal 10 is divided evenly in the vertical direction. The terminal holder 401 may be attached to the terminal case for accommodating the mobile terminal 10.

Next, the method for holding the mobile terminal 10 using the terminal holder 401 will be described. Similarly to the first embodiment, the terminal holder 401 may hold the mobile terminal 10 by holding the holding portion 403 between the medicinal finger 14 and the little finger 15 as shown in FIGS. 17 and 18. In another holding method, as shown in FIGS. 21 and 22, the user holds the mobile terminal 10 with the thumb 11, the index finger 12, the middle finger 13, and the medicinal finger 14, inserts the little finger 15 into the finger insertion space 403*a*, and operates the display 10A of the mobile terminal 10 with the thumb 11. The center of gravity G of the mobile terminal 10 is generated downwardly from the center of the mobile terminal 10, so that the mobile terminal 10 can be held stably with the index finger 12, the middle finger 13, and the medicinal finger 14. In other words, the mobile terminal 10 is held by the little finger 15 at the fulcrum S away from the center of gravity G. Therefore, the mobile terminal 10 can be held stably by its own weight with a plurality of fingers near the center of gravity G. Here, the mobile terminal 10 is supported by the terminal holder 401 at the fulcrum S located at the lower end of the mobile terminal 10. That is, by attaching the terminal holder 401 to the lower end of the mobile terminal 10 and holding the terminal holder 401 with the little finger 15, the fulcrum S can be positioned at the lower end of the mobile terminal 10.

When the user desires to perform other tasks while holding the mobile terminal 10, the user removes the index finger 12, the middle finger 13, and the medicinal finger 14 supporting the back of the mobile terminal 10 from the mobile terminal 10, and the mobile terminal 10 rotates in the counterclockwise direction around the little finger 15 under its own weight, as shown in FIG. 22. At this time, the little finger 15 still remains the insertion of the finger insertion space 403*a*. This allows the user to perform other tasks with fingers other than the little finger 15 without removing the mobile terminal 10 from the hand. To operate the mobile terminal 10 again, the user can use the recoil or, with the other hand, rotate the mobile terminal 10 in the clockwise direction around the little finger 15 in the state shown in FIG. 21 again. The user can insert the medicinal finger 14 into the finger insertion space 403*a* to perform the same operation as above.

With this configuration, since the finger insertion space 403*a* in which the medicinal finger 14 or little finger 15 is to be inserted is defined in the holding portion 403, the mobile terminal 10 or terminal case 100 can be held by inserting the finger. Further, since the fingers inserted into the finger insertion space 403*a* are the medicinal finger 14 or the little finger 15, the user can hold the mobile terminal 10 or the terminal case 100 by inserting only the medicinal finger 14 or the little finger 15 into the finger insertion space 403*a*.

A seventh embodiment of the present invention will be described with reference to FIG. 23. The same configuration as in the above-described embodiment is appended to the same numeral and explanation will be omitted.

The terminal holder 501 includes the fixed portion 302, a holding portion 503, a contact portion 504, and a cover portion 505. The holding portion 503 extends downwardly from the lower center end of the fixed portion 302 in the left-right direction. As shown in the oblique line of FIG. 23, the holding portion 503 has a finger insertion space 503*a* into which the medicinal finger 14 or the little finger 15 is inserted in the lateral direction. The holding portion 503 is of looped shape, and has one end and the other end fixed to the fixed portion 302. The space enclosed by the loop is defined as the finger insertion space 503*a*.

The contact portion 504 is detachable with respect to the holding portion 503 and is formed with two insertion holes 504a and two slits 504b. The insertion holes 504a penetrate the contact portion 504 in the vertical direction and are formed at the center of the contact portion 504 with a distance therebetween in the front-rear direction. The insertion hole 504a extends in the left-right direction and has one end connected to the end of the slit 504b. The contact portion 504A has the first and the second holding areas, similarly to the above-described embodiment.

When attaching the contact portion 504 to the holding portion 503, the contact portion 504 is placed in the finger insertion space 503a, and the holding portion 503 is inserted into the insertion hole 504a through the slit 504b. When removing the contact portion 504 from the holding portion 503, the holding portion 503 is released from the contact portion 504 via the slit 504b.

The cover portion 505 is attached to the contact portion 504 to conceal the holding portion 503 partially exposed from the lower surface of the contact portion 504. The cover portion 505 may be printed with an advertisement of a company or the like and use the terminal holder 501 as a novelty. The cover portion 505 is configured as a thin seal, but it may also be diamond-shaped synthetic resin or the like for decoration.

With this configuration, since the contact portion 504 is detachable to the holding portion 503, the user can hold the mobile terminal 10 or the terminal case 100 in a variety of holding methods.

The eighth embodiment of the present invention will be described with reference to FIG. 24. The same configuration as in the above-described embodiment is appended to the same numeral and explanation will be omitted.

The terminal holder 601 is detachably fixed to a through hole 100a through which a charger is passed in the terminal case 100. The terminal holder 601 includes a holding portion 603 and the contact portion 304. The holding portion 603 is a ring-shaped string extending from the contact portion 304, and the space between the two strings is the finger insertion space. In other words, the finger insertion space is defined by opening the holding portion 603 positioned between the terminal case 100 and the contact portion 304 in the lateral direction.

The terminal holder 601 is detachable to the terminal case 100. When the holding portion 603 is attached to the terminal case 100, the holding portion 603 is passed through the through hole 100a, and the holding portion 603 and the contact portion 304 are passed through the loop of the tip portion of the holding portion 603, which is shown in FIG. 24. When removing the holding portion 603 from the terminal case 100, the holding portion 603 is widened in the left-right direction to form a loop, and then the contact portion 304 is passed through the loop.

When holding the terminal holder 601, the holding portion 603 is pinched between the medicinal finger 14 and the little finger 15, or the little finger 15 is inserted into the finger insertion space between the holding portion 603.

With this configuration, since the holding portion 603 is in the form of the string, the holding portion 603 and the contact portion 304 can be made with a simple configuration.

The ninth embodiment of the present invention will be described with reference to FIGS. 25 and 26. The same configuration as in the above-described embodiment is appended to the same numeral and explanation will be omitted.

The terminal holder 701 includes the fixed portion 302, a holding portion 703, the contact portion 504, and the cover portion 505. The holding portion 703 extends downwardly from the center lower end of the fixed portion 302 in the left-right direction. The holding portion 703 is of roughly flat plate shape having a width in the lateral direction and has a tip end portion detachably provided with the contact portion 504. As shown in the diagonal line of FIG. 25, a finger insertion space 703a is defined in the holding portion 703, and the finger is inserted in the left-right direction. The holding portion 703 is of loop shape and has one end fixed to the fixed portion 302 and the other end fixed to a position displaced in the left-right direction from the position where the one end is fixed. In other words, as shown in FIG. 26A and FIG. 26B, the holding portion 703 is of roughly V-shape so as to be displaced in the lateral direction.

With this configuration, the finger insertion space 703a is easily formed because the one end and the other end of the holding portion 703 are displaced as viewed from the direction orthogonal to the fixed surface 302A. For example, when one end and the other end completely overlap in the direction orthogonal to the fixed surface 302A similarly to the sixth embodiment, the finger insertion space 403a is hard to be formed because grasping either the one end or the other end is difficult. However, since one end and the other end are displaced in the present embodiment, the finger insertion space 703a can be easily formed by holding the displaced portion and separating the one end and the other end from each other.

The tenth embodiment of the present invention will be described with reference to FIGS. 27 to 30. The same configuration as in the above-described embodiment is appended to the same numeral and explanation will be omitted.

The terminal case 800 includes a main body 801, a holding portion 803, and the contact portion 304. The main body 801 has a terminal storage space 800a for accommodating the mobile terminal 10 and is formed with a terminal hole 800b through which a charging terminal is inserted. FIG. 28 shows the display 10A as a dotted line when the mobile terminal 10 is accommodated in the terminal storage space 800a. The holding portion 803 extends downwardly from the lower center end of the main body 801 in the left-right direction. The upper end of the holding portion 803 is fixed to the terminal case 800, and the contact portion 304 is fixed to the lower end.

The holding portion 803 is of roughly flat plate shape having a width in the left-right direction and has a tip end provided with the contact portion 304. The length from the connection between the holding portion 303 and the terminal case 800 to the contact portion 304 is preferably about one finger. This length may be arbitrarily set depending on the size of the terminal case 800. The holding portion 803 is held by the medicinal finger 14 and the little finger 15 when the user holds the terminal case 800.

The contact portion 304 has the contact surface 341 perpendicular to the vertical direction i.e., the extending direction of the holding portion 803. In other words, the contact surface 341 is an upper surface of the contact portion 304. As shown in FIGS. 29 and 30, the contact surface 341 is brought into contact with the medicinal finger 14 and the little finger 15 when the user holds the terminal holder 301.

As shown in FIGS. 29 and 30, the first holding area 341A and the second holding area 341B are defined in the contact portion 304 similarly to the above-described embodiment. The first holding area 341A is located at both ends in the left-right direction with respect to the holding portion 803 as viewed from below, and overlaps with the main body 801 in the middle portion of the front-rear direction, as shown by the dotted line. In other words, the first holding area 341A overlaps with the terminal case 800 as viewed from below. In other words, the first holding area 341A is the region where the medicinal finger 14 and the little finger 15 come into contact with the contact surface 341 when the holding portion 303 is laterally pinched by the medicinal finger 14 and the little finger 15 extending in the front-rear direction as shown in FIG. 30.

The second holding area 341B is located at both ends in the front-rear direction with respect to the holding portion 803 and fails to overlap with the main body 801 as viewed from the rear of the terminal case 800. In other words, the second holding area 341B has a region where the medicinal finger 14 and the little finger 15 come into contact with the contact surface 341 when the holding portion 303 is pinched in the front-rear direction by the medicinal finger 14 and the little finger 15 extending in the left-right direction, as shown in FIG. 29.

With this configuration, when the holding portion 803 is pinched by the medicinal finger 14 and little finger 15 extending in the front-rear direction, the first holding area 341A comes into contact with the medicinal finger 14 and the little finger 15, and when the holding portion 803 is pinched by the medicinal finger 14 and the little finger 15 extending in the left-right direction, the second holding area 341B comes into contact with the medicinal finger 14 and the little finger 15. This allows the terminal case 800 to be held in a variety of ways. Since the medicinal finger 14 and the little finger 15 come into contact with the contact portion 304, the contact portion 304 prevents the medicinal finger 14 and the little finger 15 from falling out from the holding portion 803. This makes it possible to hold the terminal case 800 without dropping from the hand. Furthermore, the user can hold the terminal case 800 comfortably owing to the flexibility of the holding portion 803 without straining the fingers even when the holding portion 803 is pinched from various directions.

Next, the terminal case 901 according to the eleventh embodiment of the present invention will be described with reference to FIGS. 31 to 36. As shown in the figures, the front-rear, top-bottom, left-right directions are defined.

The terminal case 901 is a case for accommodating the mobile terminal 10 (FIG. 34) having the display 10A representing various information and includes a main body 902 and a holding portion 903. The main body 902 may be made from hard synthetic resin such as polyethylene, polypropylene, polystyrene, polyvinyl chloride, polyester, or the like, or it may have flexibility, such as silicon. The main body 902 has a flat portion 921 as a bottom surface and a side portion 922 erected forwardly from the flat portion 921. A terminal storage space 902a (FIG. 33) for accommodating the mobile terminal 10 is defined by the flat portion 921 and the side portion 922. The flat portion 921 has a front portion 923 facing the mobile terminal 10 when the mobile terminal 10 is accommodated in the terminal storage space 902a, and a back portion 924 opposite to the front portion 923 and as a back of the main body 902. In other words, when the mobile terminal 10 is accommodated, the surface opposite to the display 10A is the back portion 924.

The flat portion 921 is formed with a first through hole 921a, a second through hole 921b, a third through hole 921c, a fourth through hole 921d, a camera hole 921e, and a notch 921f. The first through hole 921a to the fourth through hole 921d are all approximately the same circular shape and penetrate the flat portion 921 in the front-rear direction. The first through hole 921a is formed at the lower part of the main body 902, the second through hole 921b is formed at a position spaced to the left of the first through hole 921a, the third through hole 921c is formed at a position spaced upwardly from the first through hole 921a, and the fourth through hole 921d is formed at a position spaced upwardly from the second through hole 921b. As shown in the chain line of FIG. 32, when the main body 902 (the entire body including the flat portion 921 and the side portion 922) is divided evenly in the vertical direction into three regions, an upper region 902A, a middle region 902B, and a lower region 902C, the first through hole 921a to the fourth through hole 921d are all formed in the lower region 902C.

The camera hole 921e is of oval shape and formed at a position corresponding to the camera of the mobile terminal 10. The notch 921f extends in the lateral direction and is formed at the lower center of the main body 902. The notch 921f has a width in the lateral direction wider than that of the holding portion 903. The notch 921f has four engaging protrusions 921A projecting downwardly from its top end. The four engaging protrusions 921A are arranged in the left-right direction to temporarily fix the position of the holding portion 903. The notch 921f is formed in the flat portion 921, but may be formed as a notch from the side portion 922 to the flat portion 921.

The side portion 922 is provided over the entire circumference of the flat portion 921 to cover a periphery of the mobile terminal 10 accommodated in the terminal storage space 902a. The side portion 922 is formed with a button hole 922a formed at a position corresponding to a button of the mobile terminal 10, a terminal hole 922b formed at a position corresponding to a terminal of the mobile terminal 10, and two speaker holes 922c formed at a position corresponding to speakers of the mobile terminal 10.

The holding portion 903 includes a first base portion 931, a second base portion 932, and a little finger holding portion 933. The first base portion 931, the second base portion 932, and the little finger holding portion 933 are integrally formed of a synthetic resin such as polyethylene, polypropylene, polystyrene, polyvinyl chloride, polyester, and the like. The first base portion 931 and the second base portion 932 correspond to the pinched portion of the invention.

The first base portion 931 has a first protrusion 931A configured to be rotatably inserted into the first through hole 921a or the third through hole 921c. As shown in FIG. 36, the tip of the first protrusion 931A has a slightly widened diameter slightly larger than the inner diameter of the first through hole 921a or the third through hole 921c. The first base portion 931 is of rectangular shape, located in the terminal storage space 902a, and sandwiched between the main body 902 and the mobile terminal 10 when the mobile terminal 10 is accommodated in the terminal storage space 902a. The first protrusion 931A is engaged with the first through hole 921a and the third through hole 921c with a resistance sufficient to allow the first base portion 931 to be maintained in a rotated state. The first through hole 921a, the second through hole 921b, the third through hole 921c, and the fourth through hole 921d correspond to the through holes of the present invention.

The second base portion 932 has a second protrusion 932A configured to be rotatably inserted into the second through hole 921b or the fourth through hole 921d. Similarly to the first protrusion 931A, the tip of the second protrusion 932A has a slightly widened diameter slightly larger than the inner diameter of the second through hole 921b or the fourth through hole 921d. The second base portion 932 is of rectangular shape, located in the terminal storage space 902a, and sandwiched between the main body 902 and the mobile terminal 10 when the mobile terminal 10 is stored in the terminal storage space 902a. The second protrusion 932A is engaged with the second through hole 921b and the fourth through hole 921d with a resistance sufficient to allow the second base portion 932 to be maintained in a rotated state. The first and second protrusions 931A and 932A correspond to the protrusions of the present invention.

The little finger holding portion 933 is of roughly circular shape in cross section and has flexibility. The little finger holding portion 933 has one end connected to the first base portion 931 and the other end connected to the second base portion 932, and is externally exposed from the terminal storage space 902a via the notch 921f. In other words, the first base portion 931 and the second base portion 932 are located within the terminal storage space 902a, and the little finger holding portion 933 is located out of the terminal storage space 902a. As shown in the diagonal line of FIG. 31, the terminal case 901 has a little finger insertion space 933a demarcated by the little finger holding portion 933 and the main body 902. At least a portion of the holding portion 903 is located in the lower region 902C. In other words, the first base portion 931, the second base portion 932, and a portion of the little finger holding portion 933 of the holding portion 903 are located in the lower region 902C, and the little finger holding portion 933 is provided at a position where the little finger is naturally placed upon holding the terminal case 901. By engaging the first protrusion 931A with the third through hole 921c and the second protrusion 932A with the fourth through hole 921d, the area of the little finger insertion space 933a can be reduced. In other words, the user inserts the protrusion into the desired through hole, the area of the little finger insertion space 933a can be adjusted according to the size of the little finger.

The holding portion 903 is switchable between a used state in which the user can hold the terminal case 901 as shown in FIG. 31, and a retracted state in which the little finger holding portion 933 is folded as shown in FIG. 32. When the holding portion 903 is in the used state, the first base portion 931 and the little finger holding portion 933 are positioned in an abbreviated straight line in the vertical direction and the second base portion 932 and the little finger holding portion 933 are also positioned in an abbreviated straight line. That is, in the vicinity of the notch 921f, the first base portion 931 and the little finger holding portion 933 are in the abbreviated vertical straight line, and the second base portion 932 and the little finger holding portion 933 are also in the abbreviated vertical straight line. In the vicinity of the notch 921f of the little finger holding portion 933, the little finger holding portion 933 is difficult to move in the left-right direction within the notch 921f because the engaging protrusion 921A is located on both sides of the little finger holding portion 933 in the left-right direction.

When switching from the used state to the retracted state, the user presses a separation point 933A, which is the point of the little finger holding portion 933 farthest from the main body 902, toward the main body 902. Then, the first protrusion 931A rotates in the first through hole 921a in the clockwise direction in FIG. 31, and the second protrusion 932A rotates in a counterclockwise direction in the second through hole 921b. As shown in FIG. 32, the little finger holding portion 933 passes over the engaging protrusion 921A and the holding portion 93 becomes retracted state, and the distance between the separation point 933A and the main body 902 is closer than that in the used state. At this time, since a predetermined resistance is provided between the first protrusion 931A and the first through hole 921a and between the second protrusion 932A and the second through hole 921b, the retracted state is configured to be maintained unless the user touches the holding portion 3. In the little finger holding portion 933 vicinity of the notch 921f, the little finger holding portion 933 is difficult to move inwardly within the notch 921f because the engaging protrusion 21A is located inside the little finger holding portion 933.

When the holding portion 903 is in the retracted state, near the notch 921f, the first base portion 931 and the little finger holding portion 933 are tilted diagonally in the upper left direction and the second base portion 932 and the little finger holding portion 933 are tilted diagonally in the upper right direction. In the retracted state, the user is unable to insert the little finger into the little finger insertion space 933a because the little finger insertion space 933a is narrow. When returning the holding portion 903 to the used state again, the separation point 933A is grasped and pulled in a direction away from the main body 902. The little finger holding portion 933 overcomes the engaging protrusion 921A, and the first protrusion 931A rotates in the first through hole 921a in the counterclockwise direction and the second protrusion 932A rotates in the second through hole 921b in the clockwise direction. As a result, the holding portion 903 is in the used state as shown in FIG. 31.

Next, the method for holding the terminal case 901 will be described with reference to FIGS. 34 and 35. The user holds the terminal case 901 with the thumb 11, the index finger 12, the middle finger 13, and the medicinal finger 14 while the holding portion 903 in the used state, and inserts only the little finger 15 into the little finger insertion space 933a. As shown in FIG. 34, the user supports the back portion 24 with the index finger 12, the middle finger 13, and the medicinal finger 14, holds the holding portion 903 with the little finger 15, and operates the display 10A of the mobile terminal 10 with the thumb 11. Because the center of gravity G of the terminal case 901 is generated from the center of the terminal case 901 downwardly, the terminal case 901 can be held stably with the index finger 12, the middle finger 13, and the medicinal finger 14. In other words, since the holding portion 903 is held by the little finger 15 at a position away from the center of gravity G, the terminal case 901 can be held stably by supporting the vicinity of the center of gravity G with a plurality of fingers by its own weight.

If the user desires to perform other tasks while holding the terminal case 901, the user can remove the index finger 12, the middle finger 13, and the medicinal finger 14, which support the back portion 924 of the terminal case 901, from the terminal case 901. As a result, the terminal case 901 is turned around the little finger 15 by its own weight in the clockwise direction, as shown in FIG. 35. This allows the user to perform other tasks with fingers other than the little finger 15 without removing the terminal case 901 from hand. When operating the terminal case 10 again, the terminal case 901 is rotated in the clockwise direction with the recoil or the other hand around the little finger 15, as shown in FIG. 34.

With this configuration, at least a portion of the holding portion 903 having the little finger holding portion 933 into which the little finger 15 is inserted is located at the lower region 902C of the main body 902, so that the user can hold the terminal case 901 by inserting the little finger 15 into the little finger insertion space 933a. When the user desires to perform other tasks while holding the terminal case 901, user holds the terminal case 901 while separating the terminal case 901 from the palm by releasing the grasp of the terminal case 901 and rotating the terminal case 901 around the little finger holding portion 933.

With this configuration, the distance between the separation point 933A of the little finger holding portion 933 and the main body 902 is configured to be changed by turning the first and second protrusion 931A and 932A, so that when the holding portion 903 is not used, the distance between the separation point 933A and the main body 902 can be minimized to put the little finger holding portion 933 in the retracted state. Also, since the first base portion 931 and the second base portion 932 are sandwiched between the mobile terminal 10 and the main body 902, even a heavy mobile terminal 10 can be held without detaching the holding portion 903 from the main body 902.

With this configuration, the length of the little finger holding portion 933 is configured to be changed by inserting the first protrusion 931A or the second protrusion 932A into any through hole. This allows the length of the little finger holding portion 933 to be set to match the size of the user's little finger 15. Because the user keeps the hold of the terminal case 901 by rotating the terminal case 901 around the little finger holding portion 933 to separate the terminal case 901 from the palm, the little finger holding portion 933 preferably has a length enough to form a slight gap between the little finger 15 and the little finger holding portion 933 when the little finger 15 is inserted into the little finger insertion space 933a.

The twelfth embodiment will be described with reference to FIGS. 37 and 38. The same configuration as in the above-described embodiment is appended to the same numeral and explanation will be omitted.

The terminal case 1001 includes a main body 1002 and a holding portion 1003. The main body 1002 may be made from hard synthetic resin such as polyethylene, polypropylene, polystyrene, polyvinyl chloride, polyester, or the like, or it may have flexibility, such as silicon. The main body 1002 has a flat portion 1021 and the side portion 922, wherein the flat portion 1021 and the side portion 922 form a terminal storage space in which the mobile terminal is accommodated. The flat portion 1021 has a back portion 1024 opposite to the display of the mobile terminal when the mobile terminal is accommodated in the terminal storage space.

The flat portion 1021 is formed with a first notch 1021a extending in the lateral direction and a second notch 1021b located above the first notch 1021a and having the same shape as the first notch 1021a. As shown in the chain line of FIG. 38, when the main body 1002 is divided evenly in the vertical direction into three regions, the upper region 902A, the middle region 902B, and the lower region 902C, the first notch 1021a and the second notch 1021b are both formed in the lower region 902C.

The holding portion 1003 includes a fixed portion 1031, a moving portion 1032, and a little finger holding portion 1033. The fixed portion 1031, the moving portion 1032, and the little finger holding portion 1033 are integrally formed of a synthetic resin such as polyethylene, polypropylene, polystyrene, polyvinyl chloride, polyester, and the like. The fixed portion 1031 and the moving portion 1032 correspond to the pincered portion of the present invention.

The fixed portion 1031 has a first guide portion 1034 extending in the vertical direction and located to the right of the moving portion 1032, and a second guide portion 1035 extending parallel to the first guide portion 1034 and located to the left of the moving portion 1032. The fixed portion 1031 is positioned in the terminal storage space. When the mobile terminal is accommodated in the terminal storage space, the fixed portion 1031 is sandwiched between the main body 1002 and the mobile terminal. The fixed portion 1031 is immovable with respect to the main body 1002 because the fixed portion 1031 is sandwiched between the mobile terminal and the main body 1002.

The moving portion 1032 has the same thickness as the fixed portion 1031 and has a hooked portion 1036 wider than the second notch 1021b at the top. The hooked portion 1036 is caught in the second notch 1021b, preventing the moving portion 1032 from falling out from the second notch 1021b. The moving portion 1032 is positioned in the terminal storage space. When the mobile terminal is accommodated in the terminal storage space, the moving portion 1032 is sandwiched between the main body 1002 and the mobile terminal. The moving portion 1032 is configured to vertically move up and down along the moving direction D. Specifically, the moving portion 1032 moves through the space between the mobile terminal and the main body 1002 formed by the thickness of the first guide portion 1034 and the second guide portion 1035. The moving portion 1032 is sandwiched between the mobile terminal stored in the terminal storage space and the main body 1002. The moving portion 1032 has enough resistance so as to be immovable unless the user grasps and moves the little finger holding portion 1033 once the moving portion 1032 is positioned. Since the first guide portion 1034 is located on the right side of the moving portion 1032 and the second guide portion 1035 is located on the left side of the moving portion 1032, the moving portion 1032 is configured to move along the terminal storage space in the moving direction D while being guided by the first guide portion 1034 and the second guide portion 1035. The distance between the first guide portion 1034 and the second guide portion 1035 in the left-right direction is slightly larger than the width of the hooked portion 1036 in the left-right direction.

The little finger holding portion 1033 is of roughly flat plate shape with flexibility and has one end connected to the fixed portion 1031 and the other end connected to the moving portion 1032. The little finger holding portion 1033 is exposed externally from the terminal storage space via the first and second notches 1021a and 1021b. In other words, the fixed portion 1031 and the moving portion 1032 are located in the terminal storage space, and the little finger holding portion 1033 is not located in the terminal storage space. As shown in the diagonal line of FIG. 37, the terminal case 1001 has a little finger insertion space 1033a demarcated by the little finger holding portion 1033 and the back portion 1024 of the main body 1002. The little finger holding portion 1033 is located in the lower region 902C, and the little finger holding portion 1033 is provided at a position where the little finger is naturally placed upon holding the terminal case 1001. The little finger insertion space 1033a corresponds to the finger insertion space of the present invention.

The holding portion 1003 is switchable between the used state in which the user can hold the terminal case 1001 as shown in FIG. 37 and the retracted state in which the little finger holding portion 1033 is retracted as shown in FIG. 38. When the holding portion 1003 is in the used state, the moving portion 1032 is located downwardly, and the hooked portion 1036 and the second notch 1021b are adjacent to each other.

When switching from the used state to the retracted state, the user presses the little finger holding portion 1033 toward the main body 102, so that the hooked portion 1036 is guided by the first guide portion 1034 and the second guide portion 1035 to move upwardly through the terminal storage space along the moving direction D. The cross-sectional area of the little finger insertion space 1033a gradually decreases as the hooked portion 1036 moves upwardly, and eventually the little finger insertion space 1033a disappears when the little finger holding portion 1033 and the back portion 1024 come into contact with each other. Then, the holding portion 1003 is in the retracted state shown in FIG. 38. In the retracted state, the user is unable to insert the little finger into the little finger insertion space 1033a. To return the holding portion 1003 to the used state again, the little finger holding portion 1033 is plucked and pulled in the direction (backward) away from the back portion 1024. This causes the moving portion 1032 to move downwardly along the moving direction D guided by the first and second guide portions 1034 and 1035, increasing the cross-sectional area of the little finger insertion space 1033a and causing the holding portion 1003 to be in the used state shown in FIG. 37. The first and second notches 1021a and 1021b are arranged in the vertical direction, but is not limited to this configuration, and they may be arranged in the left-right direction. In this case, the little finger holding portion 1033 is arranged to extend in the left-right direction. In other words, the holding portion 1003 is attached to the main body 1002 with an abbreviated 90° rotation.

The user can hold the terminal case 1001 similarly to the eleventh embodiment by inserting the little finger through the little finger insertion space 1033a and can perform other tasks by rotating the terminal case 1001 around the little finger.

With this configuration, the cross-sectional area of the little finger insertion space 1033a is configured to be changed by moving the moving portion 1032 with respect to the main body 1002. When the holding portion 1003 is not used, the cross-sectional area of the little finger insertion space 1033a is set minimum as in the retracted state, thereby avoiding the interference with the little finger holding portion 1033.

With this configuration, since the moving portion 1032 has the hooked portion 1036 wider than the second notch 1021b, the moving portion 1032 is configured to be restrained from accidentally pulling out of the second notch 1021b. Since the fixed portion 1031 has the first guide portion 1034 and the second guide portion 1035 for guiding the moving portion 1032, the moving portion 1032 can move smoothly between the main body 1002 and the mobile terminal.

A thirteenth embodiment of the present invention will be described based on FIGS. 39 to 41. The same configuration as in the above-described embodiment is appended to the same numeral and explanation will be omitted.

The terminal case 1101 includes a main body 1102 and a holding portion 1103. The main body 1102 may be made from hard synthetic resin such as polyethylene, polypropylene, polystyrene, polyvinyl chloride, polyester, or the like, or it may be flexible, such as silicon. The main body 1102 has a flat portion 1121 and the side portion 922, and the terminal storage space 902a (FIG. 41) for accommodating the mobile terminal is defined by the flat portion 1121 and the side portion 922. The flat portion 1121 has a front portion 1123 facing the mobile terminal and a back portion 1124 opposite to the display of the mobile terminal when the mobile terminal is accommodated in the terminal storage space 902a.

The flat portion 1121 is formed with a first notch 1121a and a second notch 1121b. The second notch 1121b is located to the left of the first notch 1121a and has roughly the same shape as the first notch 1121a. The flat portion 1121 has a relief portion 1125 located above the first notch 1121a and projecting backwardly in a semicircular manner, and a stopper portion 1126 located immediately below the relief portion 1125 as shown in FIG. 41. The stopper portion 1126 is formed with a slit 1126a extending in the vertical direction, allowing the holding portion 1103 to be removed from the stopper portion 1126. As shown in the chain line of FIG. 40, when the main body 1102 is divided evenly into three regions, the upper region 902A, the middle region 902B, and the lower region 902C, the first and second notches 1121a and 1121b are both formed in the lower region 902C. The stopper portion 1126 is detachably provided at the front portion 1123, and the length of the holding portion 1103 is configured to be changed by replacing the stopper portion with a longer stopper portion in the vertical direction.

The holding portion 1103 includes a fixed portion 1131, a moving portion 1132, and a little finger holding portion 1133 as shown in FIG. 41. The fixed portion 1131, the moving portion 1132, and the little finger holding portion 1133 are integrally formed of a synthetic resin such as polyethylene, polypropylene, polystyrene, polyvinyl chloride, polyester, and the like. The fixed portion 1131 and the moving portion 1132 correspond to the pincered portion of the present invention.

The fixed portion 1131 is adhered to the front portion 1123 by welding. The fixed portion 1131 is located in the terminal storage space 902a and is sandwiched between the main body 1102 and the mobile terminal when the mobile terminal is accommodated in the terminal storage space 902a.

The moving portion 1132 is provided with a roughly spherical-shaped hooked portion 1136 at its end for preventing the moving portion 1132 from falling out from the first notch 1121a by catching the hooked portion 1136 at the stopper portion 1126. The moving portion 1132 is located in the terminal storage space 902a and is sandwiched between the main body 1102 and the mobile terminal when the mobile terminal is accommodated in the terminal storage space 902a. The relief portion 1125 allows the hooked portion 1136 to move in the moving direction D (up and down) along the relief portion 1125 without being excessively pinched by the main body 1102 and the mobile terminal. In other words, the relief portion 1125 serves as a guide to guide the moving portion 1132.

The little finger holding portion 1133 is of an abbreviated circular cross-sectional shape and has flexibility. The little finger holding portion 1133 has one end connected to the fixed portion 1131 and the other end connected to the moving portion 1132 and is exposed externally from the terminal storage space 902a via the first and second notches 1121a and 1121b. In other words, the fixed portion 1131 and the moving portion 1132 are located in the terminal storage space 902a, while a portion of the holding portion 1103 that is not located in the terminal storage space 902a serves as the little finger holding portion 1133. As shown in the diagonal line of FIG. 39, the terminal case 1101 has a little finger insertion space 1133a demarcated by the little finger holding portion 1133 and the main body 1102. At least a portion of the holding portion 1103 is located in the lower region 902C, and the little finger holding portion 1133 is provided at a position where the little finger is naturally placed upon holding the terminal case 1101. By replacing the stopper portion 1126 with a longer one in the vertical direction, the little finger holding portion 1133 is shortened, while by replacing the stopper portion 1126 with a shorter one in the vertical direction, the little finger holding portion 1133 is lengthened. This allows the length of the little finger holding portion 1133 to be adjusted according to the size of the little finger.

The holding portion 1103 is switchable between the used state in which the user can hold the terminal case 1101 as shown in FIG. 39, and the retracted state in which the little finger holding portion 1133 is stored as shown in FIG. 40. When the holding portion 1103 is in the used state, the moving portion 1132 is positioned downwardly and hooked portion 1136 contacts the stopper portion 1126 as shown in FIG. 41.

When switching from the used state to the retracted state, the user presses the little finger holding portion 1133 toward the main body 1102, causing the moving portion 1132 and the hooking portion 1136 to be guided by the relief portion 1125 and move upwardly along the moving direction D. The cross-sectional area of the little finger insertion space 1133a gradually decreases as the moving portion 1132 moves upwardly, and eventually the little finger insertion space 1133a disappears when the little finger holding portion 1133 and the back portion 1124 come into contact with each other. This causes the holding portion 1103 to be in the retracted state as shown in FIG. 40. In the retracted state, the user is unable to insert the little finger into the little finger insertion space 1133a. To return the holding portion 1103 to the used state again, the little finger holding portion 1133 is plucked and pulled in the direction away from the back portion 1124 (downward). This causes the moving portion 1132 and the hooking portion 1136 to be guided by the relief portion 1125 and move downwardly along the moving direction D, increasing the cross-sectional area and placing the holding portion 1103 in the state of use shown in FIG. 39.

The user can hold the terminal case 1101 similarly to the eleventh embodiment by inserting the little finger through the little finger insertion space 1133a and can perform other tasks by rotating the terminal case 1101 around the little finger.

With this configuration, since the cross-sectional area of the little finger insertion space 1133a is configured to be changed by moving the moving portion 1132 with respect to the main body 1102. When the holding portion 1103 is not used, the cross-sectional area of the little finger insertion space 1133a is set minimum, thereby avoiding the interference with the little finger holding portion 1133.

The fourteenth embodiment will be described with reference to FIGS. 42 and 43. The same configuration as in the above-described embodiment is appended to the same numeral and explanation will be omitted.

The terminal case 1201 includes a main body 1202 and a holding portion 1203. The main body 1202 may be made from hard synthetic resin such as polyethylene, polypropylene, polystyrene, polyvinyl chloride, polyester, or the like, or it may be flexible, such as silicon. The main body 1202 includes a flat portion 1221 and a side portion 922. The terminal storage space 902a (FIG. 43) in which the mobile terminal is accommodated is defined by the flat portion 1221 and the side portion 922. The flat portion 1221 has a front portion 1223 opposite to the mobile terminal when the mobile terminal is accommodated in the terminal storage space 902a, and a back portion 1224 opposite to the display of the mobile terminal.

The flat portion 1221 is formed with a first notch 1221a extending in the lateral direction, and a second notch 1221b disposed above the first notch 1221a and having the same shape as the first notch 1221a. The flat portion 1221 includes a relief portion 1225 located above the second notch 1221b and protruding backwardly as shown in FIG. 42, and a stopper portion 1226 located directly below the relief portion 1225 as shown in FIG. 43. The stopper portion 1226 is formed with a slit 1226a extending vertically, allowing the holding portion 1203 to be removed from the stopper portion 1226. The stopper portion 1226 is detachable from the front portion 1223, and the length of the holding portion 1203 can be changed by replacing the stopper portion with a longer stopper portion in the vertical direction. As shown in the chain line of FIG. 42, when the main body 1202 is evenly divided into three regions, the upper region 902A, the middle region 902B, and the lower region 902C, the first and second notches 1221a and 1221b are both formed in the lower region 902C.

The holding portion 1203 includes a fixed portion 1231, a moving portion 1232, and a little finger holding portion 1233. The fixed portion 1231, the moving portion 1232, and the little finger holding portion 1233 are integrally formed of a synthetic resin such as polyethylene, polypropylene, polystyrene, polyvinyl chloride, polyester, and the like. The fixed portion 1231 and the moving portion 1232 correspond to the pincered portions of the present invention.

The fixed portion 1231 is adhered to the front portion 1223 by welding. The fixed portion 1231 is located in the terminal storage space 902a and is sandwiched between the main body 1202 and the mobile terminal when the mobile terminal is accommodated in the terminal storage space 902a.

The moving portion 1232 has a hooked portion 1236 wider than the second notch 1221b. The hooked portion 1236 is caught on the stopper portion 1226 to prevent the moving portion 1232 from falling out from the second notch 1221b. The moving portion 1232 is located in the terminal storage space 902a, and when the mobile terminal is accommodated in the terminal storage space 902a, the moving portion 1232 is sandwiched between the main body 1202 and the mobile terminal. The relief portion 1225 allows the hooked portion 1236 to move in the moving direction D (up and down) along the relief portion 1225 without the hooked portion 1236 being excessively pinched by the main body 1202 and the mobile terminal. In other words, the relief portion 1225 serves as a guide to guide the moving portion 1232.

The little finger holding portion 1233 is of a short flat shape and has flexibility. The little finger holding portion 1233 has one end connected to the fixed portion 1231 and the other end connected to the moving portion 1232 and is exposed externally from the terminal storage space 902a via the first and second notches 1221a and 1221b. In other words, the fixed portion 1231 and the moving portion 1232 are located in the terminal storage space 902a, while a portion of the holding portion 1203 that is not located in the terminal storage space 902a serves as the little finger holding portion 1233. As shown in the diagonal line of FIG. 42, the terminal case 1201 has a little finger insertion space 1233a demarcated by the little finger holding portion 1233 and the back portion 1224 of the main body 1202. The little finger holding portion 1233 is located in the lower region 902C and is provided at a position where the little finger is naturally placed upon holding the terminal case 1201. By replacing the stopper portion 1226 with a longer one in the vertical direction, the little finger holding portion 1233 is shortened, while by replacing the stopper portion 1226 with a shorter one in the vertical direction, the little finger holding portion 1233 is lengthened. This allows the little finger holding portion 1233 to be adjusted according to the size of the little finger.

The holding portion 1203 is switchable between the used state in which the user can hold the terminal case 1201 as shown in FIG. 42, and the retracted state in which the little finger holding portion 1233 is stored. When the holding portion 1203 is in the used state, the moving portion 1232 is located downwardly and the hooked portion 1236 and the stopper portion 1226 are adjacent to to each other.

When switching from the used state to the retracted state, the user presses the little finger holding portion 1233 toward the main body 1202, causing the hooked portion 1236 to move upwardly in the terminal storage space 902a along the moving direction D while being guided by the relief portion 1225. The cross-sectional area of the little finger insertion space 1233a gradually decreases as the hooked portion 1236 moves upwardly, and eventually the little finger insertion space 1233a disappears when the little finger holding portion 1233 and the back portion 1224 come into contact with each other. This causes the holding portion 1203 to be in the retracted state, and the user is unable to insert the little finger into the little finger insertion space 1233a. To return the holding portion 1203 to the used state again, the little finger holding portion 1233 is plucked and pulled in the direction (backward) away from the back portion 1224. This causes the moving portion 1232 to be guided by the relief portion 1225 and move downward along the moving direction D, increasing the cross-sectional area of the little finger insertion space 1233a and placing the holding portion 1203 in the used state as shown in FIGS. 42 and 43.

The user can hold the terminal case 1201 similarly to the eleventh embodiment by inserting the little finger into the little finger insertion space 1233a, and can perform other tasks by rotating the terminal case 1201 around the little finger 15. The first and second notches 1221a and 1221b are arranged in the vertical direction, but are not limited to this configuration, and may be arranged in the horizontal direction. In this case, the little finger holding portion 1233 is arranged to extend in the left-right direction. That is, the holding portion 1203 is attached to the main body 1202 with an abbreviated 90° rotation.

With this configuration, since the cross-sectional area of the little finger insertion space 1233a is configured to be changed by moving the moving portion 1232 with respect to the main body 1202, the little finger holding portion 1233 can be placed in the retracted state by moving the moving portion 1232 with respect to the main body 1202 to minimize the cross-sectional area of the little finger insertion space 1233a when the holding portion 1203 is not used.

The fifteenth embodiment will be described with reference to FIG. 44. The same configuration as in the above-described embodiment is appended to the same numeral and explanation will be omitted.

The terminal case 1301 includes a main body 1302 and a holding portion 1303. The main body 1302 may be made from hard synthetic resin such as polyethylene, polypropylene, polystyrene, polyvinyl chloride, polyester, or the like, or it may be flexible, such as silicon. The main body 1302 has a flat portion 1321 and a side portion 1322, wherein the flat portion 1321 and the side portion 1322 form a terminal storage space in which the mobile terminal is accommodated. The flat portion 1321 has a back portion 1324 opposite to the display of the mobile terminal when the mobile terminal is accommodated in the terminal storage space.

The side portion 1322 has a lower side 1323 formed with a first moving groove 1325 and a second moving groove 1326 located on the opposite side of the first moving groove 1325 with respect to the terminal hole 922b. The first moving groove 1325 is formed with a first groove 1325a extending in the left-right direction, in which one end of the holding portion 1303 is inserted. The first moving groove 1325 is provided with a first engaging protrusion 1325A at its both ends in the lateral direction, protruding downwardly from its top. The first engaging protrusion 1325A is configured to fix the position of the holding portion 1303. The second moving groove 1326 is formed with a second groove 1326a extending in the left-right direction, in which the other end of the holding portion 1303 is inserted. The second moving grove 1326 is provided with a second engaging protrusion 1326A at its both ends in the lateral direction, protruding downwardly from its top. The second engaging protrusion 1326A is configured to fix the position of the holding portion 1303. As shown in the chain line of FIG. 44, when the main body 1302 is divided evenly into three regions, the upper region 902A, the middle region 902B, and the lower region 902C, the first moving groove 1325 and the second moving groove 1326 are both located in the lower region 902C.

The holding portion 1303 includes a first slide portion 1331, a second slide portion 1332, and a little finger holding portion 1333. The first slide portion 1331, the second slide portion 1332, and the little finger holding portion 1333 are integrally formed of a synthetic resin such as polyethylene, polypropylene, polystyrene, polyvinyl chloride, polyester, and the like.

The first slide portion 1331 is detachably and pivotally connected to the right end of the little finger holding portion 1333. The first slide portion 1331 has a first groove moving portion 1331A moving in the first groove 1325a in the left-right direction. The first groove moving portion 1331A has a tip end larger than the vertical length of the first groove 1325a to avoid falling out from the first groove 1325a. The first groove moving portion 1331A is configured to move in the first groove 1325a in the moving direction D (left-right direction), but its lateral movement is restricted by engaging the first engaging protrusion 1325A.

The second slide portion 1332 is detachably and pivotally connected to the left end of the little finger holding portion 1333. The second slide portion 1332 has a second groove moving portion 1332A moving in the second moving groove 1326a in the left-right direction. The second groove moving portion 1332A has a tip end larger than the vertical length of the second groove 1326a to avoid falling out from the second groove 1326a. The second groove portion 1332A is configured to move in the second groove 1326a in the moving direction D (left-right direction), but its lateral movement is restricted by engaging the second engaging protrusion 1326A.

The little finger holding portion 1333 has an abbreviated circular cross-section and is flexible. As shown in the diagonal line of FIG. 44, the terminal case 1301 has a little finger insertion space 1333a demarcated by the little finger holding portion 1333 and the main body 1302. The holding portion 1303 is located in the lower region 902C, and the little finger holding portion 1333 is provided at a position where the little finger is naturally placed upon holding the terminal case 1301. By separating the little finger holding portion 1333 from the first slide portion 1331 and the second slide portion 1332 and attaching the little finger holding portion 1333 having different lengths to the first slide portion 1331 and the second slide portion 1332, the little finger holding portion 1333 can be adjusted to the size of the little finger of the user.

The holding portion 1303 is switchable between the used state in which the user can hold the terminal case 1301 as shown in FIG. 44 and the retracted state in which the little finger holding portion 1333 is stored. When the holding portion 1303 is in the used state, the first slide portion 1331 is located at the left end of the first groove 1325a and movement in the moving direction D is restricted by the first engaging protrusion 1325A, and the second slide portion 1332 is located at the right end of the second groove 1326a and movement in the moving direction D is restricted by the second mooring protrusion 1326A. In other words, the first engaging protrusion 1325A is located at the right of the first groove movement portion 1331A to prevent the first slide portion 1331 from moving in the right direction, and the second engaging protrusion 1326A is located at the left of the second groove movement portion 1332A to prevent the second slide portion 1332 from moving in the left direction.

When switching from the used state to the retracted state, the user grasps and moves the first slide portion 1331 to the right in the first groove 1325a, and grasps and moves the second slide portion 1332 to the left in the second moving groove 1326a. At this time, the first groove moving portion 1331A passes one first engaging protrusion 1325A, and at the same time, the second groove moving portion 1332A passes one second engaging protrusion 1326A. The cross-sectional area of the little finger insertion space 1333a gradually decreases as the first and second slide portions 1331 and 1332 move in the moving direction D. The first groove moving portion 1331A passes another first engaging protrusion 1325A and the second groove moving portion 1332A passes another second engaging protrusion 1326A, causing the holding portion 1303 to be in retracted state. In the retracted state, the user is unable to insert the little finger into the little finger insertion space 1333a. At this time, the first engaging protrusion 1325A is located at the left in the first groove moving portion 1331A to prevent the first slide portion 1331 from moving in the left direction, and the second engaging protrusion 1326A is located at the right in the second groove moving portion 1332A to prevent the second slide portion 1332 from moving in the right direction.

To return the holding portion 1303 to the used state again, the user grasps and moves the first slide portion 1331 to the left in the first groove 1325a, and grasps and moves the second slide portion 1332 to the right in the second groove 1326a. This increases the cross-sectional area of the little finger insertion space 1333a and causes the holding portion 1303 to be in the used state as shown in FIG. 44.

The user can hold the terminal case 1301 similarly to the first embodiment by inserting the little finger into the little finger insertion space 1333a, and can perform other tasks by rotating the terminal case 1301 around the little finger.

With this configuration, since the cross-sectional area of the little finger insertion space 1333a is changed. When the holding portion 1303 is not in use, the first groove moving portion 1331A moves in the first groove 1325a in the right direction and the second groove moving portion 1332A moves in the second groove 1326a in the left direction so that the cross-sectional area of the little finger insertion space 1333a is minimized, thus allowing the holding portion 1303 to be in the retracted state in a non-obstacle manner The sixteenth embodiment will be described with reference to FIG. 45. The same configuration as in the above-described embodiment is appended to the same numeral and explanation will be omitted. As to a terminal case 1401 of the sixteenth embodiment, grooves are formed in the terminal case 1001 of the twelfth embodiment for guiding the moving portion to adjust the size of the little finger holding portion.

The terminal case 1401 includes the main body 1002 and a holding portion 1403. The holding portion 1403 includes a first moving portion 1431, a second moving portion 1432, and a little finger holding portion 1433. The first moving portion 1431, the second moving portion 1432, and the little finger holding portion 1433 are integrally formed of a synthetic resin such as polyethylene, polypropylene, polystyrene, polyvinyl chloride, polyester, and the like. The first and second moving portions 1431 and 1432 correspond to the pinched portions of the present invention. The main body 1002 is formed with a slide groove 1424a extending vertically.

Four through-holes 1421c are formed at the flat portion 1021. Two through holes 1421c are formed at a position corresponding to the first guide portion 1434 and vertically spaced to each other, and the other two through holes 1421c are formed at a position corresponding to the second guide portion 1435 and vertically spaced to each other.

The first moving portion 1431 has a first guide portion 1434 extending in the vertical direction and a second guide portion 1435 located to the left of the first guide portion 1434 and extending parallel to the first guide portion 1434. The first moving portion 1431 is located in the terminal storage space, and when the mobile terminal is accommodated in the terminal storage space, the first moving portion 1431 is sandwiched between the main body 1002 and the mobile terminal. The first moving portion 1431 is immovable with respect to the main body 1002 while being sandwiched between the mobile terminal and the main body 1402. The first guide portion 1434 has a first protrusion 1434A protruding backwardly, and the second guide portion 1435 has a second protrusion 1435A protruding backwardly. The first protrusion 1434A is configured to be inserted into either of the two through holes 1421c formed at a position corresponding to the first guide portion 1434. The second protrusion 1435A is configured to be inserted into either one of the two through holes 1421c formed in a position corresponding to the second guide portion 1435. By inserting the first protrusion 1434A into the lower through hole 1421c and the second protrusion 1435A into the lower through hole 1421c, the little finger holding portion 1433 is lengthened. By inserting the first protrusion 1434A into the upper through hole 1421c and the second protrusion 1435A into the upper through hole 1421c, the little finger holding portion 1433 is shortened.

The second moving portion 1432 has a hooked portion 1436, which has the same thickness as the first moving portion 1431 and is wider than the second notch 1021b, and a gripping portion 1437. The hooked portion 1436 is caught on the second notch 1021b, preventing the second moving portion 1432 from falling out from the second notch 1021b. The gripping portion 1437 protrudes upwardly from the hooked portion 1436 and has an abbreviated circular shape at the tip end with enlarged diameter. The gripping portion 1437 is movable through the slide groove 1424a in the moving direction D. The second moving portion 1432 is located at the terminal storage space and is sandwiched between the main body 1002 and the mobile terminal when the mobile terminal is accommodated in the terminal storage space. The second moving portion 1432 moves through the space between the mobile terminal and the main body 1002 formed by the thickness of the first guide portion 1434 and the second guide portion 1435. The second moving portion 1432 is sandwiched between the main body 1002 and the mobile terminal stored in the terminal storage space and is configured to move along the moving direction D with little resistance. Since the first guide portion 1434 is located on the right of the second moving portion 1432 and the second guide portion 1435 is located on the left of the second moving portion 1432, the second moving portion 1432 is guided by the first and second guide portions 1434 and 1435 and the gripping portion 1437 is guided by the slide groove 1424$a$, the second moving portion 1432 is configured to move in the terminal storage space along the moving direction D. The shape of the gripping portion 1437 is not limited to this configuration and may be a thin and wide disk shape.

The little finger holding portion 1433 is of a short flat shape and has flexibility. The little finger holding portion 1433 has one end connected to the first moving portion 1431 and the other end connected to the second moving portion 1432, and is exposed externally from the terminal storage space via the first and second notches 1021$a$ and 1021$b$. In other words, the first and second moving portions 1431 and 1432 are located at the terminal storage space, and a portion of the holding portion 1403 that is not located in the terminal storage space serves as the little finger holding portion 1433. As shown in the diagonal line of FIG. 45, the terminal case 1401 has a little finger insertion space 1433$a$ demarcated by the little finger holding portion 1433 and the back portion 1424. The little finger holding portion 1433 is located at the lower region 902C, and the little finger holding portion 1433 is provided at a position where the little finger is naturally placed upon holding the terminal case 1401.

The holding portion 1403 is switchable between the used state in which the user can hold the terminal case 1401 as shown in FIG. 45 and the retracted state in which the little finger holding portion 1433 is stored. When the holding portion 1403 is in the used state, the second moving portion 1432 is positioned downward and the gripping portion 1437 is located at the lower end of the slide groove 1424$a$, and the hooking portion 1436 and the second notch 1021$b$ are adjacent to each other.

When switching from the used state to the retracted state, the user grasps the gripping portion 1437 and moves it upward, so that the hooked portion 1436 is guided between the first guide section 1434 and the second guide section 1435, and the gripping portion 1437 is guided by the slide groove 1424$a$ and moves upwardly in the terminal storage space along the moving direction D. The cross-sectional area of the little finger insertion space 1433$a$ gradually decreases as the hooked portion 1436 moves upward, and eventually the little finger holding portion 1433 and the back portion 1424 come into contact with each other, and at the same time the gripping portion 1437 is positioned at the upper end of the slide groove 1424$a$, and the little finger insertion space 1433$a$ disappears. As a result, the holding portion 1403 is in the retracted state and the user is unable to insert the little finger into the little finger insertion space 1433$a$. To return the used state again, the user grasps the gripping portion 1437 and moves it downward. The second moving portion 1432 is guided between the first and second guide portions 1434 and 1435, and the gripping portion 1437 is guided by the slide groove 1424$a$ to move downward along the moving direction D. Then, the cross-sectional area of the little finger insertion space 1433$a$ is increased and the holding portion 1403 is in the used state as shown in FIG. 45. When the user desires to retract the little finger holding portion 1433, the user grasps the gripping portion 1437 and moves the second moving portion 1432 along the moving direction D. When the user desires to change the size of the little finger holding portion 1433, the through hole 1421$c$ into which the first and second protrusions 1434A and 1435A are inserted is changed. In other words, the first moving portion 1431 moves with respect to the main body 1002 to change the size of the little finger holding portion 1433, and the second moving portion 1432 moves with respect to the main body 1002 to place the little finger holding portion 1433 in the retracted state.

The user can hold the terminal case 1401 similarly to the eleventh embodiment by inserting the little finger into the little finger insertion space 1433$a$, and can perform other tasks by rotating the terminal case 1401 around the little finger. The first and second notches 1021$a$ and 1021$b$ are arranged in the vertical direction, but are not limited to this configuration, and may be arranged in the horizontal direction. In this case, the little finger holding portion 1433 is arranged to extend in the left-right direction. In other words, the holding portion 1403 is attached to the main body 1002 with an abbreviated 90° rotation.

The seventeenth embodiment will be described with reference to FIG. 46. The same configuration as in the above-described embodiment is appended to the same numeral and explanation will be omitted. The configuration of the terminal case 1501 is identical to that of the eleventh embodiment, but there is a difference in that the terminal case 1501 is held by the medicinal finger 14 instead of the little finger 15.

The holding portion of the terminal case 1501 is provided with a medicinal finger holding portion 1533 into which the medicinal finger 14 is inserted, and a medicinal finger insertion space 1533$a$ is defined between the medicinal finger holding portion 1533 and the main body 902. The user can hold the terminal case 1501 in the same manner as in the eleventh embodiment by inserting only the medicinal finger into the medicinal finger insertion space 1533$a$, and can perform other operations by rotating the terminal case 1501 around the medicinal finger.

With this configuration, since at least a portion of the medicinal finger holding portion 1533 holding the medicinal finger 14 is located at the lower region of the main body 902, the user can hold the terminal case 1501 by inserting the medicinal finger 14 only into the medicinal finger insertion space 1533$a$. When the user desires to perform other tasks while holding the terminal case 1501, the terminal case 1501 can be held while separating the terminal case 1501 from the palm by releasing the grasp of the terminal case 1501 and rotating the terminal case 1501 around the medicinal finger holding portion 1533.

The eighteenth embodiment will be described with reference to FIGS. 47 and 48. The same configuration as in the above-described embodiment is appended to the same numeral and explanation will be omitted. The terminal case 1601 of the eighteenth embodiment includes the holding portion 903 in the eleventh embodiment replaceable with an alternative holding portion 1603 shown in FIG. 38.

The terminal case 1601 includes the main body 902, the holding portion 903, and the alternative holding portion 1603. The flat portion 921 of the main body 902 is formed with a fifth through hole 1621$e$, a sixth through hole 1621$f$, a first notch 1621$g$, a second notch 1621$h$, a third notch 1621$i$, and a fourth notch 1621$j$.

The fifth through hole 1621$e$ is located near the center of the lower region 902C in the left-right direction, and the sixth through hole 1621$f$ is located above the fifth through hole 1621$e$ with a gap therebetween. The first notch 1621$g$ and the second notch 1621$h$ extending in the lateral direction are roughly the same shape and located at the bottom portion of the lower region 902C. The fourth notch 1621$j$ is spaced below the fifth through hole 1621$e$ and is narrower than the first notch 1621$g$. The third notch 1621$i$ is spaced below the fourth notch 1621$j$. As shown in the chain line of FIG. 47, when the main body 902 is divided evenly in the vertical direction into three regions, the upper region 902A, the middle region 902B, and the lower region 902C, the first through hole 921a to the sixth through hole 1621f and the first notch 1621g to the fourth notch 1621j are all formed in the lower region 902C. The first through hole 921a to the sixth through hole 1621f corresponds to the through holes of the present invention.

The little finger holding portion 933 is of an abbreviated circular cross-sectional shape and has flexibility. The little finger holding portion 933 has one end connected to the first base portion 931 and the other end connected to the second base portion 932, and is exposed externally from the terminal storage space 902a via the first and second notches 1621g and 1621h. The holding portion 903 is switchable between the used state in which the user can hold the terminal case 1601 and the retracted state in which the little finger holding portion 933 is folded, similarly to the eleventh embodiment.

The state of the alternative holding portion 1603 attached to the main body 902 will be described with reference to FIG. 48. The alternative holding portion 1603 includes a first base portion 1631, a second base portion 1632, and a little finger holding portion 1633. The first base portion 1631, the second base portion 1632, and the little finger holding portion 1633 are integrally formed of a synthetic resin such as polyethylene, polypropylene, polystyrene, polyvinyl chloride, polyester, and the like. The first base portion 1631 and the second base portion 1632 correspond to the pincered portion of the present invention.

The first base portion 1631 is located at the terminal storage space and is laterally wider than the third notch 1621i and narrower than the distance in the lateral direction between the first through hole 921a and the second through hole 921b. The first base portion 1631 is sandwiched between the main body 902 and the mobile terminal when the mobile terminal is accommodated in the terminal storage space.

The second base portion 1632 has a protrusion 1632A inserted into the fifth through hole 1621e or the sixth through hole 1621f. The tip of the protrusion 1632A has an enlarged diameter slightly larger than the inner diameter of the fifth through hole 1621e or the sixth through hole 1621f. The second base portion 1632 is of rectangular shape, located at the terminal storage space, and sandwiched between the main body 902 and the mobile terminal when the mobile terminal is accommodated in the terminal storage space. The size of the little finger holding portion 1633 is configured to be changed by switching the through hole into which the protrusion 1632A is inserted.

The little finger holding portion 1633 is of a short flat shape and has flexibility. The little finger holding portion 1633 has one end connected to the first base portion 1631 and the other end connected to the second base portion 1632 and is exposed externally from the terminal storage space via the third and fourth notches 1621i and 1621j. As shown in the diagonal line of FIG. 48, the terminal case 1601 has a little finger insertion space 1633a defined in the terminal case 1601. The little finger insertion space 1633a is demarcated by the little finger holding portion 1633 and the main body 902. The little finger holding portion 1633 is located in the lower region 902C and is provided at a position where the little finger is naturally placed when the terminal case 1601 is grasped.

The user can hold the terminal case 1601 similarly to the eleventh embodiment by inserting the little finger into the little finger insertion space 933a, and can perform other tasks by rotating the terminal case 1601 around the little finger.

The terminal holder and terminal case according to the present invention are not limited to the above-described embodiments, and can be modified in various ways within the spirit of the invention described in the claims.

In the above-described embodiment, the holding portion is composed of a plurality of layers, but the material and shape are not limited thereto. For example, the holding portion may be made from a synthetic resin such as polyethylene, polypropylene, polystyrene, polyvinyl chloride, polyester and the like, and may be flexible, such as silicon. The holding portion may also be ring, string, cylindrical, or flat-shaped, and may be made of rubber, leather, silicone, or the like.

In the above-described embodiment, the terminal holder 1 holds the mobile terminal 10 by fixing the fixed portion 2 to the mobile terminal 10, but is not limited to this configuration. For example, the terminal holder 1 may be fixed to the back of the terminal case 110.

In the above-described embodiment, the fixed portion 2 is attached to the mobile terminal 10 in the terminal holder 1 but is not limited to this configuration. The pinched portion may be provided in addition to the fixed portion, and the pinched portion may be inserted into the inner space of the terminal case from a step of the terminal case and sandwiched between the terminal case and the mobile terminal.

In the above-described embodiment, the holding portion is of an abbreviated thin circle shape, but is not limited to this configuration. The holding portion may be shaped so long as the first and second holding areas are defined, and may be in the shape of an abbreviated rectangle, abbreviated cruciform, or abbreviated triangle, or a polygon, as viewed from rear.

In the tenth embodiment, the holding portion 803 and the contact portion 304 are fixed to each other, but is not limited to this configuration. For example, the holding portion may be detachable to the contact portion similarly to the seventh embodiment.

The terminal holder of the tenth embodiment is based on the terminal holder 301 of the fifth embodiment, but is not limited to this configuration. For example, the terminal case may be combined with the configuration of the holding and contact portions of the sixth and ninth embodiments.

In the eleventh embodiment, the main body 902 and the holding portion 903 are pivotally fixed by the first through hole 921a, the first protrusion 931A, the second through hole 921b, and the second protrusion 932A, but this is not limited to this configuration. For example, the protrusion is provided on the main body side and a through hole is formed with the holding portion 903 side, provided that the holding portion is pivotable. The same is true in the eighteenth embodiment.

In the twelfth embodiment, the fixed portion 1031 is sandwiched between the main body 1002 and the mobile terminal, but may be welded to the back surface of the main body 1002, or may be engaged with a hook and loop fastener. The same configuration can be applied to the fixed portions 1131 of the thirteenth embodiment and 1231 of the fourteenth embodiment.

In the fifteenth embodiment, the first moving groove portion 1325 and the second groove 1326 extends in the lateral direction, but are not limited to this configuration. For example, the first slide portion and the second slide portion may extend vertically in the lower region 902C. The first and second slide portions extend vertically may be formed with the lower region 902C of the first movement groove 1325 instead of the lower side 1323.

In the seventeenth embodiment, the terminal case 901 in the eleventh embodiment is held by the medicinal finger 14, but the terminal case in the twelfth embodiment to the sixteenth embodiment and the eighteenth embodiment may be held by the medicinal finger, obtaining the same advantageous effect as the terminal case 1501 in the seventeenth embodiment.

In the above-described embodiment, the terminal case covers a side and a back of the mobile terminal, but is not limited to this configuration. For example, a flap may be provided to cover an opening in the terminal storage space of the terminal case. Applying the present invention to a terminal case with the flap, the flap can be readily opened with the finger to hold the terminal case by only supporting the little finger holding portion with the little finger.

In the above-described embodiment, the pinched portion is directly sandwiched between the main body and the mobile terminal, but is not limited to this configuration. For example, another member may be provided between the pinched portion and the mobile terminal and indirectly sandwich the pinched portion. This is desirable in terms of appearance because the pinched portion is invisible when the mobile terminal is removed from the terminal case.

In the above-described embodiment, the holding portion and the little finger holding portion are made of a synthetic resin, but the material and shape are not limited to this configuration. For example, the holding portion and the little finger holding portion may be in the shape of a ring, string, cylindrical, or flat shape, and may be made of rubber, leather, silicone, or the like.

REFERENCE SIGNS LIST 1,101,201,301,401,501,601,701,801,901,1001,1101, 1201,1301,1401,1501,1601 terminal holder
2,102,202 fixed portion
3,103,203,303,403,503,603,703,803,903,103,1103,1203, 1303,1403 holding portion
3a,103a,403a,503a,703a finger insertion space
10 mobile terminal
21,121,221 first fixed portion
22,122,222 second fixed portion
23,123,223 surface member
31,131,231 one end
32,132,232 finger support portion
33,133,233 other end
100,110,800,901,1001,1101,1201,1301,1401,1501,1601 terminal case
111,801,902,1002,1102,1202,1302,1402 main body
933a, 1033a, 1133a, 1233a, 1333a, 1433a, 1633a little finger insertion spaces

The invention claimed is:

1. A terminal holder for holding a mobile terminal or a terminal case covering the mobile terminal comprising:
   a fixed portion having a fixed surface fixed to the mobile terminal or the terminal case;
   a holding portion composed of a flexible material extending in an extending direction from the fixed portion, the holding portion being configured to be pinched between fingers when the mobile terminal or terminal storage case is held; and
   a contact portion having a contact surface intersecting in the extending direction and configured to be in contact with a finger when the holding portion is gripped,
   wherein the contact surface has a first holding area partially that overlaps with the holding portion in the extending direction, and a second holding area that fails to overlap with the holding portion in the extending direction,
   wherein the contact surface is configured such that the finger is in contact with the first holding area when the holding portion is pinched by the finger extending in a first direction, while the finger is in contact with the second holding area when the holding portion is pinched by the finger extending in a second direction intersecting the first direction,
   wherein the holding portion is located between the first holding area and the second holding area as viewed from the extending direction, and the holding portion and the contact portion fails to overlap with the fixed portion as viewed from a direction orthogonal to the fixed surface.

2. The terminal holder according to claim 1, wherein the holding portion has a finger insertion space configured such that a medicinal finger or a little finger is inserted, and the contact portion is detachable to the holding portion.

3. The terminal holder according to claim 2, wherein the holding portion is of looped shape, and the finger insertion space is defined by connecting one end portion and a second end portion to the fixed portion, and the one end portion and the second end portion is displaced from each other as viewed from a direction orthogonal to the fixed surface.

4. The terminal holder according to claim 1, wherein the holding portion is located on a same plane as the fixed surface, and the contact surface is orthogonal to the extending direction, the first direction is to the fixed surface, and the second direction is orthogonal to the first direction and the extending direction.

5. A terminal storage case for protecting a mobile terminal, the terminal storage case comprising:
   a main body;
   a holding portion extending from the main body in an extending direction and configured to be pinched between fingers when the main body is held; and
   a contact portion having a contact surface intersecting in the extending direction and configured to be in contact with a finger when the holding portion is pinched between fingers,
   wherein the contact surface has a first holding area that overlaps with the main body as viewed from the extending direction and a second holding area that fails to overlap with the main body as viewed from the extending direction,
   wherein the contact surface is configured such that the first holding area is in contact with the finger when the holding portion is pinched by the fingers in a first direction, and the second holding area is in contact with the finger when the holding portion is pinched by the fingers in a second direction different from the first direction,
   wherein the holding portion is located between the first holding area and between the second holding area as viewed from the extending direction, and the holding portion and the contact portion fail to overlap with the main body as viewed from a direction perpendicular to a display of the mobile terminal.

6. The terminal storage case according to claim 5, wherein the holding portion is of a string shape, and the main body is formed with a through hole through which a charger for charging the mobile terminal is inserted, and the holding portion is inserted into the through hole to form a loop, wherein the holding portion is detachably fixed to the main body by passing the contact portion and holding portion through the loop.

\* \* \* \* \*